US012394372B2

(12) United States Patent
Wang et al.

(10) Patent No.: US 12,394,372 B2
(45) Date of Patent: Aug. 19, 2025

(54) PIXEL CIRCUIT, DRIVING METHOD THEREFOR, AND DISPLAY APPARATUS FOR ADJUSTING A GATE-SOURCE VOLTAGE OF A DRIVE TRANSISTOR USING RESET SIGNALS

(71) Applicants: Chengdu BOE Optoelectronics Technology Co., Ltd., Sichuan (CN); BOE Technology Group Co., Ltd., Beijing (CN)

(72) Inventors: Binyan Wang, Beijing (CN); Yao Huang, Beijing (CN); Meng Li, Beijing (CN); Tianyi Cheng, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/777,287

(22) PCT Filed: Jul. 30, 2021

(86) PCT No.: PCT/CN2021/109884
§ 371 (c)(1),
(2) Date: May 17, 2022

(87) PCT Pub. No.: WO2023/004810
PCT Pub. Date: Feb. 2, 2023

(65) Prior Publication Data

US 2024/0169906 A1 May 23, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
CPC ......... G09G 3/3233; G09G 2300/0819; G09G 2300/0852; G09G 2320/0233; G09G 2320/0247; G09G 2320/0252
See application file for complete search history.

(56) References Cited

U.S. PATENT DOCUMENTS 11,211,011 B2 * 12/2021 Kim .................... H10K 59/131
11,404,003 B2 * 8/2022 Jeong .................. G09G 3/3266
(Continued)

FOREIGN PATENT DOCUMENTS

CN 107256695 A 10/2017
CN 107274830 A 10/2017
(Continued)

OTHER PUBLICATIONS

European Search Report for 21951400.7 Mailed Feb. 6, 2024.
(Continued)

*Primary Examiner* — David D Davis
(74) *Attorney, Agent, or Firm* — Ling Wu; Stephen Yang; Ling and Yang Intellectual Property

(57) ABSTRACT

A pixel circuit includes a drive sub-circuit, a first reset sub-circuit, a second reset sub-circuit, and a light emitting element. The drive sub-circuit is configured to generate a drive current between a first electrode and a second electrode of the drive sub-circuit in response to a control signal of a first node. The first reset sub-circuit is configured to write a first reset signal to an anode terminal of the light emitting element in response to a signal of a first light emitting control signal line or a second reset control signal line. The second reset sub-circuit is configured to write a second reset signal to the first electrode or second electrode of the drive sub-circuit in response to a signal of a first reset control signal line. The second reset signal is greater than the first reset signal.

20 Claims, 48 Drawing Sheets

(52) U.S. Cl.
CPC ... *G09G 2310/061* (2013.01); *G09G 2310/08* (2013.01); *G09G 2320/0233* (2013.01); *G09G 2320/0247* (2013.01); *G09G 2320/0252* (2013.01)

(56) References Cited

U.S. PATENT DOCUMENTS

| | | | |
|---|---|---|---|
| 2013/0057532 A1 | 3/2013 | Lee et al. | |
| 2014/0139566 A1 | 5/2014 | Han | |
| 2018/0130410 A1 | 5/2018 | Gao et al. | |
| 2019/0371238 A1 | 12/2019 | Gao et al. | |
| 2020/0160787 A1 | 5/2020 | Wang et al. | |
| 2020/0273411 A1 | 8/2020 | Gao et al. | |
| 2021/0110771 A1 | 4/2021 | Lee et al. | |
| 2021/0125543 A1* | 4/2021 | Kim | G09G 3/3225 |
| 2021/0183312 A1 | 6/2021 | Kim et al. | |
| 2021/0225282 A1 | 7/2021 | Cho et al. | |
| 2021/0407386 A1 | 12/2021 | Li et al. | |

FOREIGN PATENT DOCUMENTS

| | | | |
|---|---|---|---|
| CN | 107610651 | A | 1/2018 |
| CN | 108492782 | A | 9/2018 |
| CN | 108735155 | A | 11/2018 |
| CN | 109285500 | A | 1/2019 |
| CN | 109599062 | A | 4/2019 |
| CN | 109637440 | A | 4/2019 |
| CN | 110047432 | A | 7/2019 |
| CN | 110517639 | A | 11/2019 |
| CN | 110867162 | A | 3/2020 |
| CN | 111462694 | A | 7/2020 |
| CN | 111508426 | A | 8/2020 |
| CN | 111739470 | A | 10/2020 |
| CN | 111862890 | A | 10/2020 |
| CN | 113112955 | A | 7/2021 |
| CN | 113160740 | A | 7/2021 |
| CN | 113178170 | A | 7/2021 |
| JP | 2017223955 | A | 12/2017 |
| JP | 2019-74729 | A | 5/2019 |
| KR | 10-2013-0026338 | A | 3/2013 |
| KR | 10-2015-0064543 | A | 6/2015 |
| WO | 2020052287 | A1 | 3/2020 |

OTHER PUBLICATIONS

Office Action dated Mar. 8, 2024 for U.S. Appl. No. 18/273,788.
Office Action dated May 6, 2022 for Chinese Patent Application No. 202180002058.8 and English Translation.
Notice of Reasons for Refusal dated Jul. 1, 2025 for JP 2023-560151 and English Translation.

* cited by examiner

PIXEL CIRCUIT, DRIVING METHOD THEREFOR, AND DISPLAY APPARATUS FOR ADJUSTING A GATE-SOURCE VOLTAGE OF A DRIVE TRANSISTOR USING RESET SIGNALS

CROSS-REFERENCE TO RELATED APPLICATION

The present application is a U.S. National Phase Entry of International Application No. PCT/CN2021/109884, having an international filing date of Jul. 30, 2021, the entire content of which is hereby incorporated by reference.

TECHNICAL FIELD

Embodiments of the present disclosure relate to, but are not limited to, the field of display technologies, and in particular to a pixel circuit, a driving method therefor, and a display apparatus.

BACKGROUND

An Organic Light Emitting Diode (OLED) and a Quantum dot Light Emitting Diode (QLED) are active light emitting display devices and have advantages of self-illumination, a wide angle of view, a high contrast ratio, low power consumption, an extremely high reaction speed, lightness and thinness, bendability, and a low cost, etc. With continuous development of the display technologies, a flexible display apparatus (Flexible Display) with an OLED or a QLED as a light emitting device and a Thin Film Transistor (TFT) for performing signal controlling has become a mainstream product in the current display field.

SUMMARY

The following is a summary of subject matters described in detail herein. This summary is not intended to limit the scope of protection of claims.

An embodiment of the present disclosure provides a pixel circuit, the pixel circuit including a drive sub-circuit, a first reset sub-circuit, a second reset sub-circuit, and a light emitting element. The drive sub-circuit is configured to generate a drive current between a first electrode and a second electrode of the drive sub-circuit in response to a control signal of a first node. The first reset sub-circuit is configured to write a first reset signal to an anode terminal of the light emitting element in response to a signal of a first light emitting control signal line or a second reset control signal line. The second reset sub-circuit is configured to write a second reset signal to the first electrode or the second electrode of the drive sub-circuit in response to a signal of a first reset control signal line, and the second reset signal is greater than the first reset signal.

In some exemplary implementations, an absolute value of the second reset signal is greater than 1.5 times of a threshold voltage of the drive sub-circuit.

In some exemplary implementations, an amplitude of the second reset signal is greater than 0.

In some exemplary implementations, the pixel circuit further includes: a write sub-circuit, a compensation sub-circuit, a first light emitting control sub-circuit, and a second light emitting control sub-circuit. The write sub-circuit is configured to write a data signal to a second node in response to a signal of a second scan signal line. The compensation sub-circuit is configured to write a first reset signal or a second reset signal of a third node to the first node in response to a signal of a first scan signal line, and the compensation sub-circuit is further configured to compensate the first node in response to the signal of the first scan signal line. The first light emitting control sub-circuit is configured to provide a signal of a first power supply line to the second node in response to the signal of the first light emitting control signal line. The second light emitting control sub-circuit is configured to write a first reset signal of a fourth node to the third node in response to a signal of a second light emitting control signal line, and the second light emitting control sub-circuit is further configured to allow a drive current to flow between the third node and the fourth node in response to the signal of the second light emitting control signal line.

In some exemplary implementations, the second reset signal is derived from at least one of following signal lines: the first power supply line, the first light emitting control signal line, the second light emitting control signal line, or a third power supply line.

In some exemplary implementations, a pulse width of the signal of the first reset control signal line is substantially the same as a pulse width of the signal of the second scan signal line.

In some exemplary implementations, a signal pulse of the first light emitting control signal line differs from a signal pulse of the second light emitting control signal line by one or two time units, and one of the time units is scan time of one row of sub-pixels.

In some exemplary implementations, the first reset sub-circuit includes a first transistor, wherein a control electrode of the first transistor is connected with the first light emitting control signal line or the second reset control signal line, a first electrode of the first transistor is connected with a first reset signal line, and a second electrode of the first transistor is connected with the fourth node.

In some exemplary implementations, the compensation sub-circuit includes a second transistor and a first capacitor, wherein a control electrode of the second transistor is connected with the first scan signal line, a first electrode of the second transistor is connected with the third node, and a second electrode of the second transistor is connected with the first node; and one terminal of the first capacitor is connected with the first node, and the other terminal of the first capacitor is connected with the first power supply line.

In some exemplary implementations, the drive sub-circuit includes a third transistor, wherein a control electrode of the third transistor is connected with the first node, a first electrode of the third transistor is connected with the second node, and a second electrode of the third transistor is connected with the third node.

In some exemplary implementations, the write sub-circuit includes a fourth transistor, wherein a control electrode of the fourth transistor is connected with the second scan signal line, a first electrode of the fourth transistor is connected with a data signal line, and a second electrode of the fourth transistor is connected with the second node.

In some exemplary implementations, the first light emitting control sub-circuit includes a fifth transistor, wherein a control electrode of the fifth transistor is connected with the first light emitting control signal line, a first electrode of the fifth transistor is connected with the first power supply line, and a second electrode of the fifth transistor is connected with the second node.

In some exemplary implementations, the second light emitting control sub-circuit includes a sixth transistor, wherein a control electrode of the sixth transistor is connected with the second light emitting control signal line, a first electrode of the sixth transistor is connected with the third node, and a second electrode of the sixth transistor is connected with the fourth node.

In some exemplary implementations, the second reset sub-circuit includes a seventh transistor, wherein a control electrode of the seventh transistor is connected with the first reset control signal line, a first electrode of the seventh transistor is connected with a second reset signal line, and a second electrode of the seventh transistor is connected with the second node or the third node.

In some exemplary implementations, the first reset sub-circuit includes a first transistor. The compensation sub-circuit includes a second transistor and a first capacitor. The drive sub-circuit includes a third transistor. The write sub-circuit includes a fourth transistor. The first light emitting control sub-circuit includes a fifth transistor. The second light emitting control sub-circuit includes a sixth transistor, and the second reset sub-circuit includes a seventh transistor. A control electrode of the first transistor is connected with the first light emitting control signal line or the second reset control signal line, a first electrode of the first transistor is connected with a first reset signal line, and a second electrode of the first transistor is connected with the fourth node. A control electrode of the second transistor is connected with the first scan signal line, a first electrode of the second transistor is connected with the third node, and a second electrode of the second transistor is connected with the first node. One terminal of the first capacitor is connected with the first node, and the other terminal of the first capacitor is connected with the first power supply line. A control electrode of the third transistor is connected with the first node, a first electrode of the third transistor is connected with the second node, and a second electrode of the third transistor is connected with the third node. A control electrode of the fourth transistor is connected with the second scan signal line, a first electrode of the fourth transistor is connected with a data signal line, and a second electrode of the fourth transistor is connected with the second node. A control electrode of the fifth transistor is connected with the first light emitting control signal line, a first electrode of the fifth transistor is connected with the first power supply line, and a second electrode of the fifth transistor is connected with the second node. A control electrode of the sixth transistor is connected with the second light emitting control signal line, a first electrode of the sixth transistor is connected with the third node, and a second electrode of the sixth transistor is connected with the fourth node. And a control electrode of the seventh transistor is connected with the first reset control signal line, a first electrode of the seventh transistor is connected with a second reset signal line, and a second electrode of the seventh transistor is connected with the second node or the third node.

In some exemplary implementations, at least one of the first transistor, the second transistor, and the seventh transistor is a first-type transistor, the third transistor to the sixth transistor are all second-type transistors, and the first-type transistor has a different transistor type from a second-type transistor.

In some exemplary implementations, the first-type transistor is an N-type transistor and the second-type transistor is a P-type transistor.

In some exemplary implementations, at least one of the first transistor, the second transistor, and the seventh transistor is an indium gallium zinc oxide thin film transistor, and the third transistor to the sixth transistor are all low temperature poly silicon thin film transistors.

An embodiment of the present disclosure further provides a display apparatus, including the pixel circuit as described in any one of the above embodiments.

An embodiment of the present disclosure further provides a driving method of a pixel circuit, for driving the pixel circuit as described above. The pixel circuit has multiple scan periods. In one scan period, the driving method includes: 1) in a reset phase, writing, by a first reset sub-circuit, a first reset signal to an anode terminal of a light emitting element in response to a signal of a first light emitting control signal line or a second reset control signal line; 2) in a reposition phase, writing, by a second reset sub-circuit, a second reset signal to a first electrode or a second electrode of a drive sub-circuit in response to a signal of a first reset control signal line, wherein the second reset signal is greater than the first reset signal; and 3) in a light emitting phase, generating, by the drive sub-circuit, a drive current between a first electrode and a second electrode of the drive sub-circuit in response to a control signal of a first node.

Other aspects will become apparent upon reading and understanding accompanying drawings and the detailed description.

BRIEF DESCRIPTION OF DRAWINGS

The accompanying drawings are used for providing further understanding of technical solutions of the present disclosure, constitute a part of the specification, and are used for explaining the technical solutions of the present disclosure together with the embodiments of the present disclosure, but not to constitute limitations on the technical solutions of the present disclosure. Shapes and sizes of various components in the accompanying drawings do not reflect actual scales and are only intended to illustrate contents of the present disclosure.

DETAILED DESCRIPTION

Figure 1:
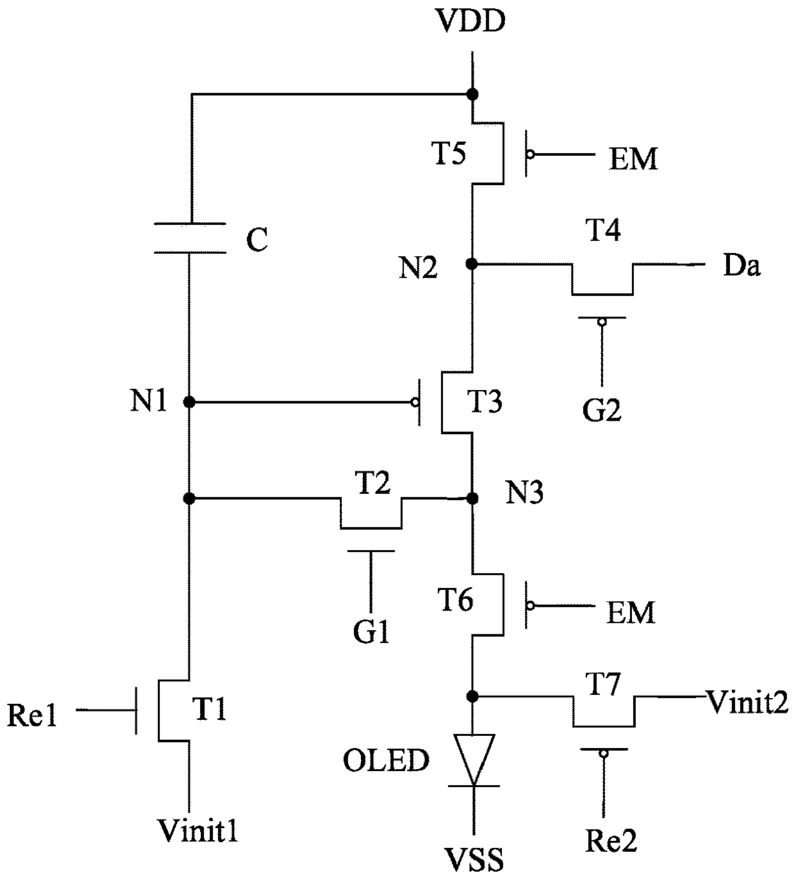
FIG. 1 is a schematic diagram of a circuit structure of a pixel drive circuit in the related art.

Example embodiments will now be described more fully with reference to the accompanying drawings. However, example embodiments can be implemented in a variety of forms and should not be construed as being limited to the examples set forth herein. Rather, these embodiments are provided so that the present disclosure will be more comprehensive and complete and concepts of example embodiments will be fully conveyed to those of skills in the art. Same reference numerals in the drawings represent identical or similar structures and thus their detailed description will be omitted.

Terms "an", "a", and "the" are used for indicating existence of one or more elements/components/etc. Terms "include" and "have" are used for indicating an open-ended inclusive meaning and mean that additional elements/components/etc. may exist in addition to listed elements/components/etc.

As shown in FIG. 1, FIG. 1 is a schematic diagram of a circuit structure of a pixel drive circuit in the related art. The pixel drive circuit may include: a drive transistor T3, a first transistor T1, a second transistor T2, a fourth transistor T4, a fifth transistor T5, a sixth transistor T6, a seventh transistor T7, and a capacitor C. The drive transistor T3 has a gate connected with a first node N1, a first electrode connected with a second node N2, and a second electrode connected with a third node N3. The fourth transistor T4 has a first electrode connected with a data signal terminal Da, a second electrode connected with the second node N2, and a gate connected with a gate drive signal terminal G2. The fifth transistor T5 has a first electrode connected with a first power supply terminal VDD, a second electrode connected with the second node N2, and a gate connected with an enable signal terminal EM. The second transistor T2 has a first electrode connected with the first node N1, a second electrode connected with the third node N3, and a gate connected with a gate drive signal terminal G1. The sixth transistor T6 has a first electrode connected with the third node N3, a second electrode connected with a first electrode of the seventh transistor T7, a gate connected with the enable signal terminal EM. The seventh transistor T7 has a second electrode connected with a second initial signal terminal Vinit2, and a gate connected with a second reset signal terminal Re2. The first transistor T1 has a first electrode connected with the first node N1, a second electrode connected with the first initial signal terminal Vinit1, a gate connected with a first reset signal terminal Re1. The capacitor C is connected between the first power supply terminal VDD and the first node N1. The pixel drive circuit may be connected with a light emitting unit OLED, and used for driving the light emitting unit OLED to emit light, and the light emitting unit OLED may be connected between the second electrode of the sixth transistor T6 and a power supply terminal VSS. The first transistor T1 and the second transistor T2 may be an N-type transistor, for example, the first transistor T1 and the second transistor T2 may be an N-type metal oxide transistors, and an N-type metal oxide transistor has a small leakage current so that leakage of electricity of a node N through the first transistor T1 and the second transistor T2 in a light emitting phase may be avoided. Meanwhile, the drive transistor T3, the fourth transistor T4, the fifth transistor T5, the sixth transistor T6, and the seventh transistor T7 may be P-type transistors. For example, the drive transistor T3, the fourth transistor T4, the fifth transistor T5, the sixth transistor T6, and the seventh transistor T7 may be P-type low-temperature polycrystalline silicon transistors having a relatively high carrier mobility, thereby facilitating achievement of a display panel with a high resolution, a high reaction speed, a high pixel density, and a high aperture ratio. The first initial signal terminal and the second initial signal terminal may output a same voltage signal or different voltage signals according to an actual situation.

Figure 2:
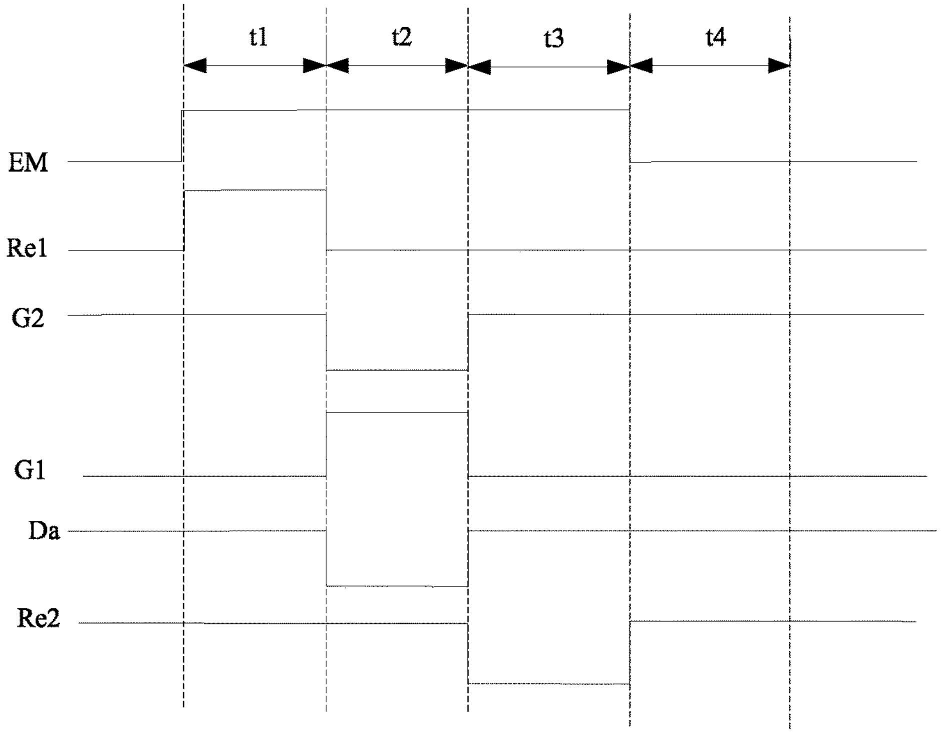
FIG. 2 is a timing diagram of each node of a pixel drive circuit in FIG. 1 in a driving method.

FIG. 2 is a timing diagram of each node of the pixel drive circuit of FIG. 1 in a driving method. G1 represents a timing of the gate drive signal terminal G1, G2 represents a timing of the gate drive signal terminal G2, Re1 represents a timing of the first reset signal terminal Re1, Re2 represents a timing of the second reset signal terminal Re2, EM represents a timing of the enable signal terminal EM, Da represents a timing of the data signal terminal Da, and N1 represents a timing of the first node N1. The driving method of the pixel drive circuit may include a first reset phase t1, a threshold compensation phase t2, a second reset phase t3, and a light emitting phase t4. In the first reset phase t1, the first reset signal terminal Re1 outputs a high-level signal, the first transistor T1 is turned on, and the first initial signal terminal Vinit1 inputs an initial signal to the first node N1. In the threshold compensation phase t2, the gate drive signal terminal G1 outputs a high-level signal, the gate drive signal terminal G2 outputs a low-level signal, the fourth transistor T4 and the second transistor T2 are turned on. At the same time, the data signal terminal Da outputs a drive signal to write a voltage Vdata+Vth to the node N. Vdata is a voltage of the drive signal and Vth is a threshold voltage of the drive transistor T3. In the second reset phase t3, the second reset signal terminal Re2 outputs a low-level signal, the seventh transistor T7 is turned on, and the second initial signal terminal Vinit2 inputs an initial signal to the second electrode of the sixth transistor T6. In the light emitting phase t4, the enable signal terminal EM outputs a low-level signal, the sixth transistor T6 and the fifth transistor T5 are turned on, and the drive transistor T3 emits light under an action of the voltage Vdata+Vth stored in the capacitor C. According to a formula $I=(\mu WCox/2L)(Vgs-Vth)^2$ of an output current of a drive transistor, wherein is a carrier mobility; Cox is a gate capacitance per unit area, W is a channel width of the drive transistor, L is a channel length of the drive transistor, Vgs is a gate-source voltage difference of the drive transistor, and Vth is a threshold voltage of the drive transistor. An output current of a drive transistor in the pixel drive circuit of the present disclosure is $I=(\mu WCox/2L)(Vdata+Vth-Vdd-Vth)^2$. The pixel drive circuit can avoid influence of a threshold of the drive transistor on its output current.

Figure 3:
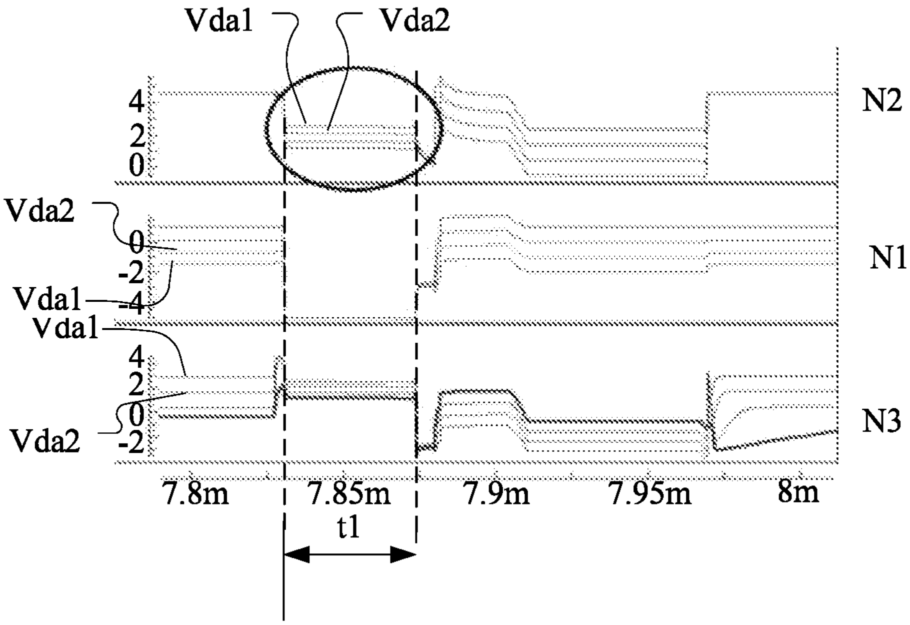
FIG. 3 is a simulation timing diagram of a first node, a second node, and a third node of the pixel drive circuit in FIG. 1 in the driving method shown in FIG. 2.

In a related technology, there is a parasitic capacitance between a gate and a source of a drive transistor in a pixel drive circuit. In a reset phase of the pixel drive circuit, a gate voltage of the drive transistor is initialized to an initial voltage, and a source voltage of the drive transistor is changed correspondingly under a coupling action of the above parasitic capacitance. In the reset phase, when different gray scales are reset, the gate voltage of the drive transistor changes in different amounts, so that the source voltage of the drive transistor also changes in different amounts, which leads to Vgs (gate-source voltage difference) of the drive transistor is different after the reset phase is completed. As shown in FIG. 3, FIG. 3 is a simulation timing diagram of a first node, a second node, and a third node of the pixel drive circuit in FIG. 1 in the driving method shown in FIG. 2. N1 represents a timing diagram of the first node N1, N2 represents a timing diagram of the second node N2, and N3 represents a timing diagram of the third node N3. FIG. 3 specifically shows the timing diagram of each node of the pixel drive circuit shown in FIG. 1 under four data signals, in FIG. 3, in a reset phase t1, the first node N1 needs to be reset under the four data signals, and an exemplary embodiment is explained with the timing of each node under two data signals. As shown in FIG. 3, a timing of each node under a first data signal is shown as a curve Vda1, and a timing of each node under a second data signal is shown as a curve Vda2. Since voltages of the first data signal and the second data signal are different, before the reset phase t1, voltages at the first node N1 are different, and voltages at the third node N3 are also different, and voltages at the second node are all a voltage of the first power supply terminal VDD. In the reset phase t1, voltages at the first node N1 under the two data signals are pulled down to an initial voltage. Since a pull-down variation amount of the first node N1 under the first data signal is less than a pull-down variation amount of the first node N1 under the second data signal, a pull-down variation amount of the second node under the first data signal is less than a pull-down variation amount of the second node N2 under the second data signal. That is, in the reset phase, a voltage at the second node N2 under the first data signal is less than a voltage at the second node N2 under the second data signal, so that the Vgs (gate-source voltage difference) of the drive transistor is different under different data signals. At the same time, since the Vgs of the drive transistor will affect its threshold voltage, a display panel will have afterimage and flicker problems. For example, when the display panel is converted from a black-and-white picture to a picture with a same gray scale, since threshold voltages of the drive transistor in pixels corresponding to the black-and-white picture are different, after the conversion to the picture with the same gray scale, a region where a black-and-white picture of a previous frame is located will display different gray scales respectively, that is, an afterimage problem occurs.

Figure 4:
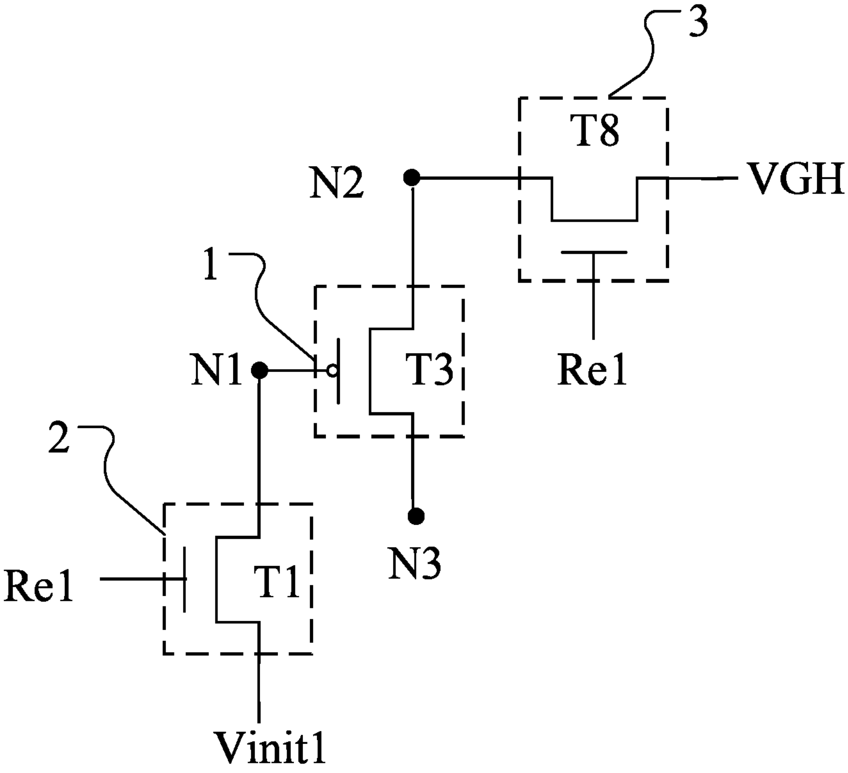
FIG. 4 is a schematic diagram of a structure of a pixel drive circuit according to an exemplary embodiment of the present disclosure.

Based on this, an exemplary embodiment provides a pixel drive circuit, as shown in FIG. 4, FIG. 4 is a schematic diagram of a structure of a pixel drive circuit according to an exemplary embodiment of the present disclosure. The pixel drive circuit may include: a drive circuit 1, a first reset circuit 2, and a second reset circuit 3, the drive circuit 1 is connected with a first node N1 and a second node N2, and configured to output a drive current according to a voltage difference between the first node N1 and the second node N2. The first reset circuit 2 is connected with the first node N1, a first initial signal terminal Vinit1, and a first reset signal terminal Re1, and configured to transmit a signal of the first initial signal terminal Vinit1 to the first node N1 in response to a signal of the first reset signal terminal Re1. The second reset circuit 3 is connected with the second node N2 and a first power supply terminal VGH, and configured to transmit a signal of the first power supply terminal VGH to the second node N2 in response to a control signal.

In the exemplary embodiment, in a reset phase, the pixel drive circuit may transmit the signal of the first initial signal terminal Vinit1 to the first node N1 by using the first reset circuit 2, at the same time, transmit the signal of the first power supply terminal VGH to the second node N2 by using the second reset circuit 3, so that the pixel drive circuit may reset a gate-source voltage difference of a drive transistor to a same value under different data signals, thereby improving problems of afterimage and flicker of a display panel.

In the exemplary embodiment, as shown in FIG. 4, the drive circuit 1 may also be connected with a third node N3, and may include a drive transistor T3 having a gate connected with the first node N1, a first electrode connected with the second node N2, and a second electrode connected with the third node N3. The drive transistor T3 may be a P-type transistor, for example, the drive transistor T3 may be a P-type low-temperature poly silicon transistor, and the drive transistor T3 may input a drive current to the third node according to a voltage difference between the first node N1 and the second node N2. It should be understood that in another exemplary embodiment, the drive transistor T3 may be an N-type transistor, and when the drive transistor T3 is the N-type transistor, the drive transistor may input a drive current to the second node according to a voltage difference between the first node N1 and the second node N2. In addition, the drive circuit 1 may also include multiple drive transistors which may be connected in parallel between the second node and the third node.

In the exemplary embodiment, as shown in FIG. 4, the first reset circuit 2 may include a first transistor T1 having a gate connected with the first reset signal terminal Re1, a first electrode connected with the first initial signal terminal Vinit1, and a second electrode connected with the first node N1. A turn-on level of the second reset circuit 3 may have a same polarity as a turn-on level of the first reset circuit 2, the second reset circuit 3 may also be connected with the first reset signal terminal Re1, and may be configured to transmit a signal of the first power supply terminal VGH to the second node N2 in response to a signal of the first reset signal terminal Re1. As shown in FIG. 4, the second reset circuit 3 may include an eighth transistor T8 having a gate connected with the first reset signal terminal Re1, a first electrode connected with the first power supply terminal VGH, and a second electrode connected with the second node N2.

It should be noted that the pixel drive circuit needs to turn on the drive transistor T3 in a threshold compensation phase, so a voltage difference Vinit1−Vgh between the first initial signal terminal Vinit1 and the first power supply terminal VGH needs to be less than a threshold voltage of the drive transistor T3, wherein Vinit1 is a voltage of the first initial signal terminal and Vgh is a voltage of the first power supply terminal VGH. In addition, in another exemplary embodiment, the second reset circuit 3 may also transmit a signal of another signal terminal to the second node in response to a control signal, to reset the second node.

In the exemplary embodiment, each of the first transistor T1 and the eighth transistor T8 may be an oxide transistor, for example, semiconductor materials of the first transistor T1 and the eighth transistor T8 may be indium gallium zinc oxide, and correspondingly, the first transistor T1 and the eighth transistor T8 may be N-type transistors. The oxide transistor has a relatively small turn-off leakage current, so that a leakage current of the first node N1 flowing through the first transistor T1 and a leakage current of the second node N2 flowing through the eighth transistor T8 may be reduced.

Figure 5:
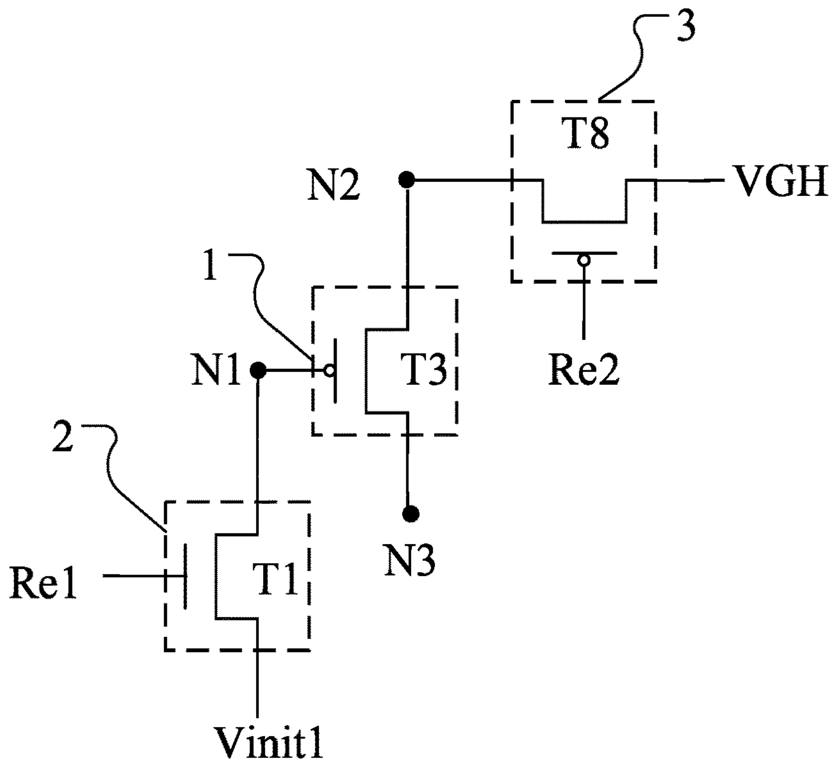
FIG. 5 is a schematic diagram of a structure of a pixel drive circuit according to another exemplary embodiment of the present disclosure.

It should be understood that in another exemplary embodiment, a turn-on level of the second reset circuit 3 may also have an opposite polarity to a turn-on level of the first reset circuit 2. For example, FIG. 5 is a schematic diagram of a structure of a pixel drive circuit according to another exemplary embodiment of the present disclosure. The second reset circuit 3 may also be connected with the second reset signal terminal Re2, and the second reset circuit 3 may be configured to transmit a signal of the first power supply terminal VGH to the second node N2 in response to a signal of the second reset signal terminal Re2. The signal of the second reset signal terminal Re2 has an opposite polarity to a signal of the first reset signal terminal Re1. The first reset circuit 2 may include an N-type first transistor T1 having a gate connected with the first reset signal terminal Re1, a first electrode connected with the first initial signal terminal Vinit1, and a second electrode connected with the first node N1. The second reset circuit 3 may include a P-type eighth transistor T8 having a gate connected with the second reset signal terminal Re2, a first electrode connected with the first power supply terminal VGH, and a second electrode connected with the second node N2.

Figure 6:
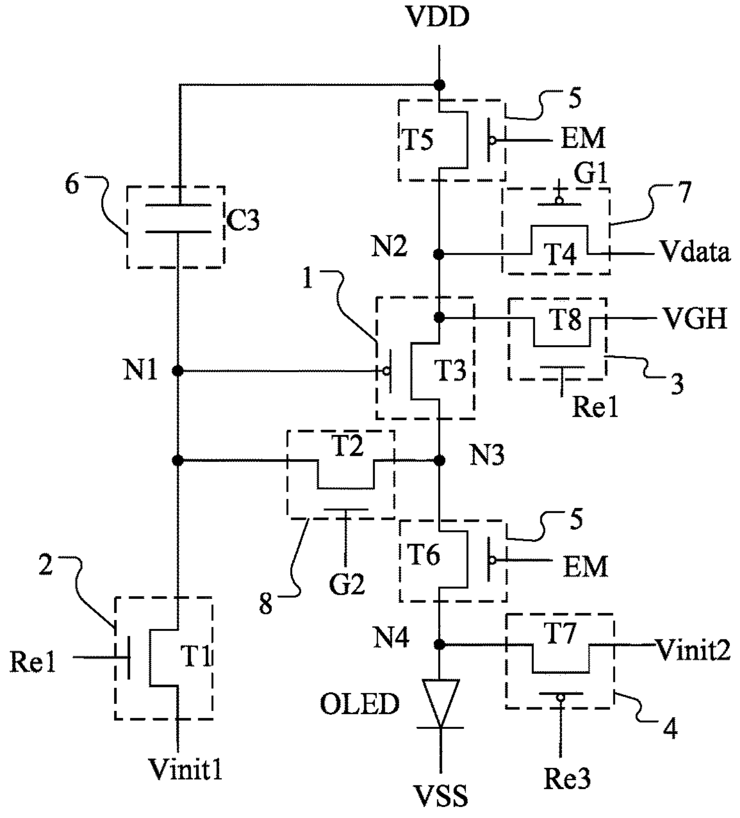
FIG. 6 is a schematic diagram of a structure of a pixel drive circuit according to another exemplary embodiment of the present disclosure.

In the exemplary embodiment, as shown in FIG. 6 which is a schematic diagram of a structure of a pixel drive circuit according to another exemplary embodiment of the present disclosure. The pixel drive circuit may further include: a control circuit 5, and a coupling circuit 6. The control circuit 5 is connected with a second power supply terminal VDD, a second node N2, a third node N3, a fourth node N4, an enable signal terminal EM, and configured to transmit a signal of the second power supply terminal VDD to the second node N2 in response to a signal of the enable signal terminal EM, and configured to connect the third node N3 and the fourth node N4 in response to the signal of the enable signal terminal EM. The coupling circuit 6 is connected between the second power supply terminal VDD and the first node N1.

In the exemplary embodiment, as shown in FIG. 6, the pixel drive circuit may further include: a data write circuit 7 and a threshold compensation circuit 8. The data write circuit is connected with the second node N2, a data signal terminal Vdata, and a first gate drive signal terminal G1, and configured to transmit a signal of the data signal terminal Vdata to the second node N2 in response to a signal of the first gate drive signal terminal G1. The threshold compensation circuit 8 may be connected with the first node N1 and the third node N3, and configured to connect the first node N1 and the third node N3 in response to a control signal. The data write circuit 7 and the threshold compensation circuit 8 are turned on in a threshold compensation phase to write a compensation voltage Vdata+Vth to the first node N1, wherein Vdata is a voltage of the data signal terminal and Vth is a threshold voltage of a drive transistor. It should be understood that, in another exemplary embodiment, there is another way to write the compensation voltage to the first node N1. For example, the data write circuit may be connected with the third node N3, the data signal terminal Vdata, the first gate drive signal terminal G1, and is configured to transmit a signal of the data signal terminal Vdata to the third node N3 in response to a signal of the first gate drive signal terminal G1, at the same time, the threshold compensation circuit 8 may be connected with the first node N1 and the second node N2, and the threshold compensation circuit 8 may be configured to connect the first node N1 and the second node N2 in response to a control signal. When the data write circuit 7 and the threshold compensation circuit 8 are turned on, the pixel drive circuit may also write the compensation voltage Vdata+Vth to the first node N1.

In the exemplary embodiment, as shown in FIG. 6, the fourth node N4 may be configured to be connected with a light emitting unit OLED, the light emitting unit OLED may be a light emitting diode, another electrode of the light emitting unit OLED may be connected with a fourth power supply terminal VSS, and a voltage of the fourth power supply terminal VSS is less than a voltage of the second power supply terminal VDD. The pixel drive circuit may further include a third reset circuit 4 connected with the fourth node N4 and a second initial signal terminal Vinit2, and is configured to transmit a signal of the second initial signal terminal Vinit2 to the fourth node N4 in response to a control signal. Writing an initial signal to the fourth node N4 may eliminate carriers that are not recombined on an internal light emitting interface of the light emitting diode and alleviate aging of the light emitting diode.

In the exemplary embodiment, as shown in FIG. 6, the control circuit 5 may include a fifth transistor T5 and a sixth transistor T6. The fifth transistor T5 has a gate connected with the enable signal terminal EM, a first electrode connected with the second power supply terminal VDD, and a second electrode connected with the second node N2. The sixth transistor T6 has a gate connected with the enable signal terminal EM, a first electrode connected with the third node N3, and a second electrode connected with the fourth node N4. The coupling circuit 6 may include a third capacitor C3 connected between the second power supply terminal VDD and the first node N1.

In the exemplary embodiment, as shown in FIG. 6, a turn-on level of the threshold compensation circuit 8 may have an opposite polarity to a turn-on level of the data write circuit 7. The threshold compensation circuit 8 may also be connected with a second gate drive signal terminal G2, and the threshold compensation circuit 8 is configured to connect the first node N1 and the third node N3 in response to a signal of the second gate drive signal terminal G2. The signal of the first gate drive signal terminal G1 may have an opposite polarity to the signal of the second gate drive signal terminal G2. The data write circuit 7 may include: a fourth transistor T4 having a gate connected with the first gate drive signal terminal G1, a first electrode connected with the data signal terminal Vdata, and a second electrode connected with the second node N2. The threshold compensation circuit 8 may include a second transistor T2 having a gate connected with the second gate drive signal terminal G2, a first electrode connected with the first node N1, and a second electrode connected with the third node N3. The fourth transistor T4 may be a P-type transistor, for example, the fourth transistor T4 may be a P-type low-temperature polycrystalline silicon transistor, a low-temperature polycrystalline silicon transistor has a relatively high carrier mobility, thereby may improve a response speed of the fourth transistor T4. The second transistor T2 may be an N-type transistor, for example, the second transistor T2 may be an oxide transistor, and a semiconductor material of the second transistor T2 may be indium gallium zinc oxide. Setting the second transistor T2 as the oxide transistor may reduce a leakage current of the pixel drive circuit flowing through the second transistor at the first node N1 of a light emitting node.

It should be understood that, in another exemplary embodiment, both the fourth transistor T4 and the second transistor T2 may also be N-type transistors or P-type transistors, and correspondingly, the fourth transistor T4 and the second transistor T2 may also share a same gate drive signal terminal.

In the exemplary embodiment, as shown in FIG. 6, the third reset circuit 4 may also be connected with a third reset signal terminal Re3, and may be configured to transmit a signal of the second initial signal terminal Vinit2 to the fourth node N4 in response to a signal of the third reset signal terminal Re3. The third reset circuit 4 may include a seventh transistor T7 having a gate connected with the third reset signal terminal Re3, a first electrode connected with the second initial signal terminal Vinit2, and a second electrode connected with the fourth node N4. The seventh transistor T7 may be a P-type transistor, for example, the seventh transistor T7 may be a P-type low-temperature polycrystalline silicon transistor, a low-temperature polycrystalline silicon transistor has a relatively high carrier mobility, so that the seventh transistor T7 has a relatively fast response speed.

Figure 7:
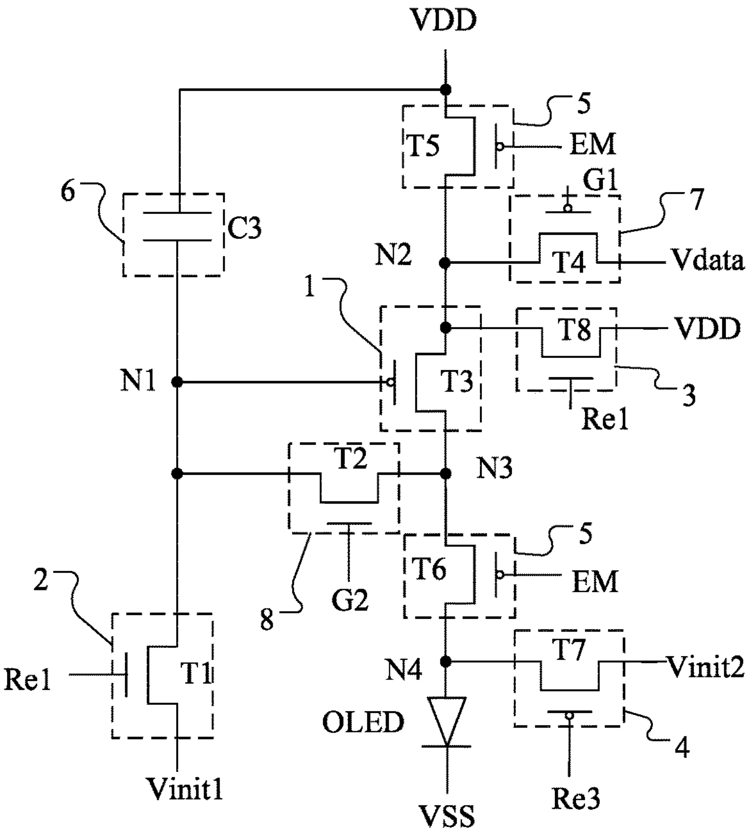
FIG. 7 is a schematic diagram of a structure of a pixel drive circuit according to another exemplary embodiment of the present disclosure.

In the exemplary embodiment, as shown in FIG. 6, the first electrode of the eighth transistor T8 and the first electrode of the fifth transistor T5 are respectively connected with different power supply terminals, It should be understood that, in another exemplary embodiment, FIG. 7 is a schematic diagram of a structure of a pixel drive circuit according to another exemplary embodiment of the present disclosure, the first electrode of the eighth transistor T8 and the first electrode of the fifth transistor T5 may be connected with a same power supply terminal, that is, the second power supply terminal VDD may share the first power supply terminal VGH.

Figure 8:
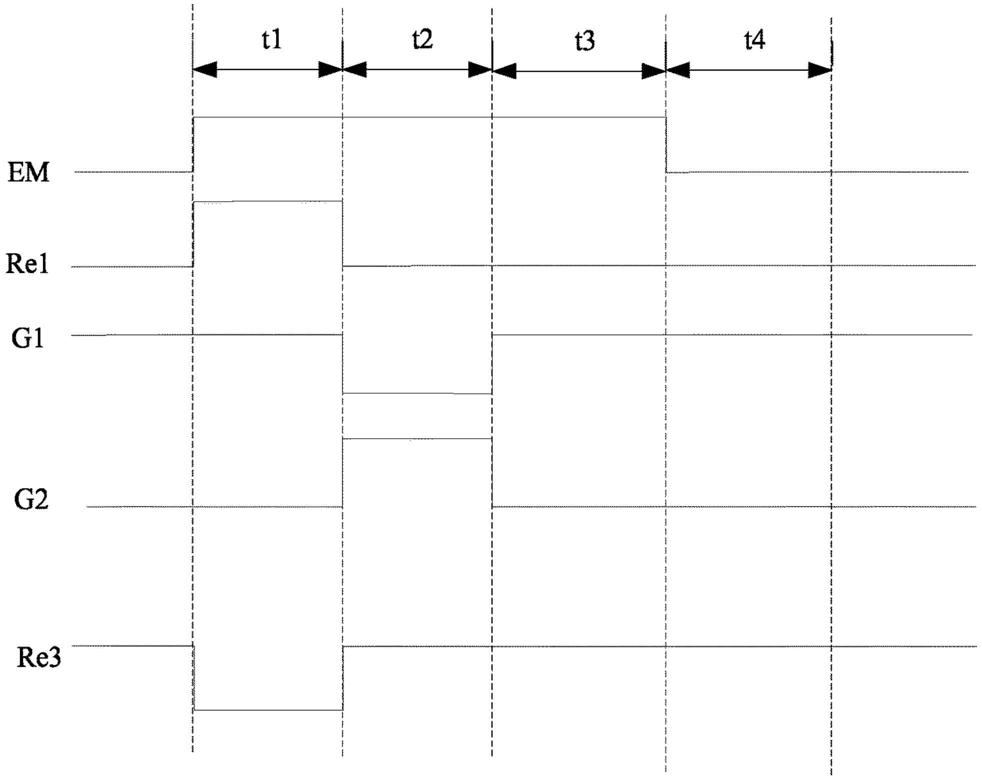
FIG. 8 is a timing diagram of each node of the pixel drive circuit in FIG. 7 in a driving method.

FIG. 8 is a timing diagram of each node of the pixel drive circuit in FIG. 7 in a driving method, wherein G1 represents a timing of a first gate drive signal terminal, G2 represents a timing of a second gate drive signal terminal, Re1 represents a timing of a first reset signal terminal, Re3 represents a timing of a third reset signal terminal, and EM represents a timing of an enable signal terminal. The driving method of the pixel drive circuit may include four phases: a reset phase t1, a threshold compensation phase t2, a buffering phase t3, and a light emitting phase t4. In the reset phase t1, the enable signal terminal EM, the first reset signal terminal Re1, and the first gate drive signal terminal output a high-level signal, the second gate drive signal terminal G2 and the third reset signal terminal Re3 output a low-level signal, the first transistor T1, the seventh transistor T7, and the eighth transistor T8 are turned on, the first initial signal terminal Vinit1 inputs a first initial signal to the first node N1, the first power supply terminal VDD inputs a power supply signal to the second node N2, and the second initial signal terminal Vinit2 inputs a second initial signal to the fourth node, voltages of the first initial signal and the second initial signal may be the same or different. In the threshold compensation phase t2, the enable signal terminal EM, the second gate drive signal terminal G2, the third reset signal terminal output a high-level signal, the first reset signal terminal Re1 and the first gate drive signal terminal G1 output a low-level signal, the second transistor T2 and the fourth transistor T4 are turned on, and the data signal terminal Vdata writes a compensation voltage Vdata+Vth to the first node N1, wherein Vdata is a voltage of the data signal terminal and Vth is a threshold voltage of a drive transistor. In the buffering phase t3, the enable signal terminal EM, the third reset signal terminal Re3, and the first gate drive signal terminal G1 output a high-level signal, the second gate drive signal terminal G2 and the first reset signal terminal Re1 output a low-level signal, and all transistors are turned off. In the light emitting phase t4, the third reset signal terminal Re3 and the first gate drive signal terminal G1 output a high-level signal, the enable signal terminal EM, the second gate drive signal terminal G2, and the first reset signal terminal Re1 output a low-level signal, the fifth transistor T5 and the sixth transistor T6 are turned on, and the drive transistor T3 emits light under an action of the voltage Vdata+Vth stored in the third capacitor C3. It should be understood that, in another exemplary embodiment, the driving method may also not include the buffering phase, the first transistor T1 and the seventh transistor T7 may also be turned on in different phases. In the threshold compensation phase t2, a duration of a valid level (low level) of the first gate drive signal terminal G1 may be less than a duration of a valid level (high level) of the second gate drive signal terminal G2. In this threshold compensation phase t2, the first gate drive signal terminal G1 may scan a row of pixel drive circuits, and the second gate drive signal terminal G2 may scan multiple rows of pixel drive circuits, for example two rows of pixel drive circuits, row by row.

Figure 9:
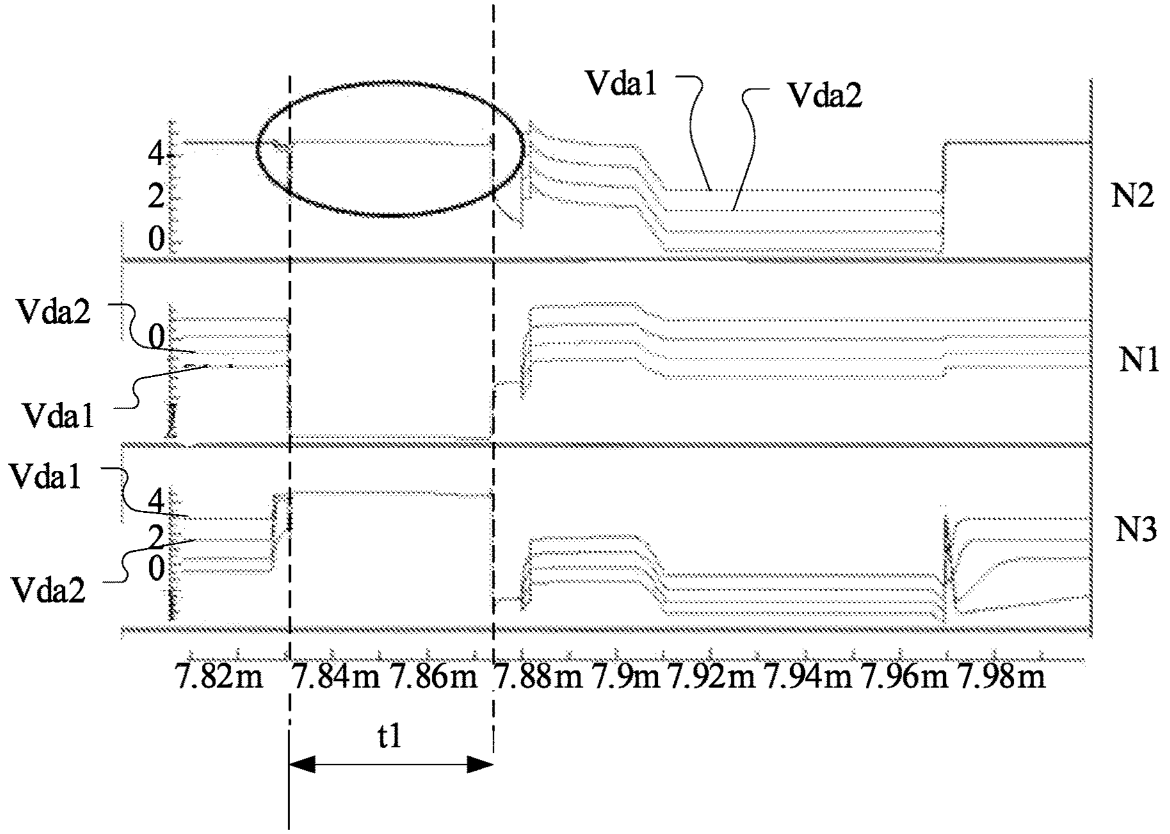
FIG. 9 is a simulation timing diagram of a first node, a second node, and a third node of the pixel drive circuit in FIG. 7 in the driving method shown in FIG. 8.

FIG. 9 is a simulation timing diagram of a first node, a second node, and a third node of the pixel drive circuit in FIG. 7 in the driving method shown in FIG. 8. N1 represents a timing diagram of the first node N1, N2 represents a timing diagram of the second node N2, N3 represents a timing diagram of the third node N3, FIG. 9 specifically illustrates the timing diagram of each node of the pixel drive circuit shown in FIG. 7 under four data signals, a reset phase t1 in FIG. 9 needs to reset the first node N1 under the four data signals, and the exemplary embodiment is explained with a timing of each node under the two data signals. As shown in FIG. 9, a timing of each node under a first data signal is shown as a curve Vda1 and a timing of each node under a second data signal is shown as a curve Vda2. As shown in FIG. 9, since voltages of the first data signal and the second data signal are different, before the reset phase t1, voltages at the first node N1 are different and voltages at the third node N3 are also different, and voltages at the second node are all a voltage of the first power supply terminal VDD. In the reset phase t1, voltages at the first node N1 under the two data signals are all pulled down to a voltage of a first initial signal, at the same time, voltages at the second node N2 are also initialized to the voltage of the first power supply terminal VDD. Thereby, at the end of the reset phase, a gate-source voltage difference of a drive transistor under the first data signal is equal to a gate-source voltage difference of the drive transistor under the second data signal, so that the pixel drive circuit can improve an afterimage problem caused by difference gate-source voltage differences of the drive transistor under different data signals.

An exemplary embodiment of the present disclosure also provides a driving method of a pixel drive circuit, which is used for driving the above pixel drive circuit. The method includes: in a reset phase, a signal of the first initial signal terminal Vinit1 is transmitted to the first node N1 by using the first reset circuit 2, at the same time, a signal of the first power supply terminal VGH is transmitted to the second node N2 by using the second reset circuit 3. The pixel driving method has been described in detail in the above contents and will not be repeated here.

An exemplary embodiment also provides a display panel which may include the above pixel drive circuit. The display panel may be applied to a display apparatus such as a mobile phone, a tablet computer, and a television.

As shown in FIG. 1, in the related technology, there is a parasitic capacitance between the first node N1 and the gate drive signal terminal G1. As shown in FIG. 2, at the end of the threshold compensation phase t2, a signal of the gate drive signal terminal G1 changes from a high level to a low level, under a coupling action of this parasitic capacitance, a voltage of the first node N1 is pulled down by the gate drive signal terminal G1, so that a maximum voltage of the data signal terminal cannot achieve display of 0 gray scale (a black picture), or if 0 gray scale needs to be displayed normally, the data signal terminal needs to provide a larger voltage signal.

Figure 10:
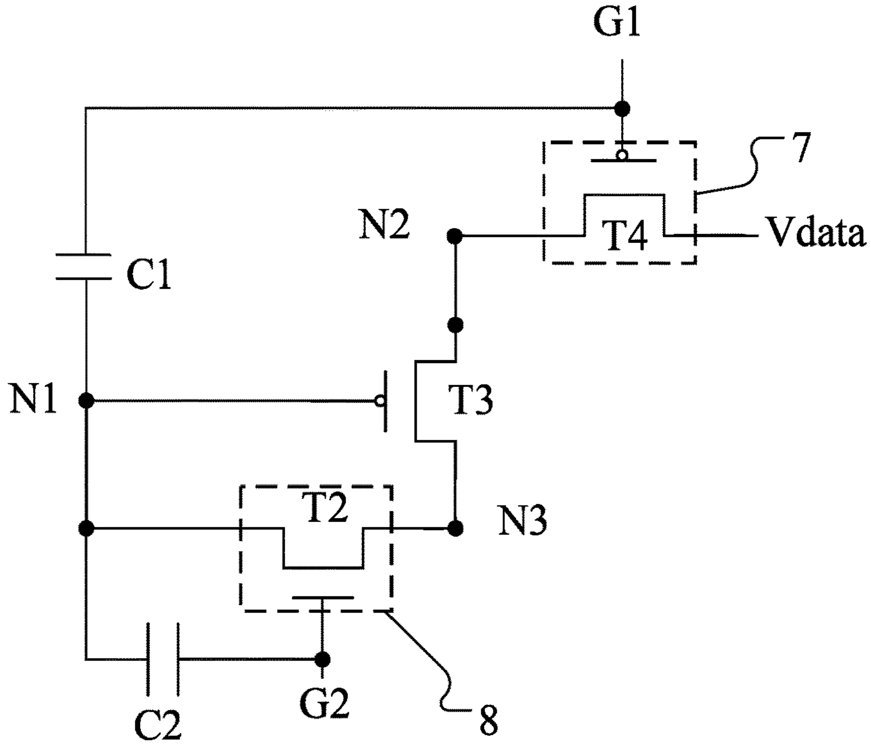
FIG. 10 is a schematic diagram of a structure of a pixel drive circuit according to an exemplary embodiment of the present disclosure.

Based on this, an exemplary embodiment provides a pixel drive circuit, as shown in FIG. 10 which is a schematic diagram of a structure of a pixel drive circuit according to an exemplary embodiment of the present disclosure. The pixel drive circuit may include a drive transistor T3, a data write circuit 7, a threshold compensation circuit 8, a first capacitor C1, and a second capacitor C2. The drive transistor T3 has a gate connected with a first node N1, a first electrode connected with a second node N2, and a second electrode connected with a third node N3. The data write circuit 7 is connected with the second node N2 and a data signal terminal Vdata, and configured to transmit a signal of the data signal terminal Vdata to the second node N2 in response to a signal of a first gate drive signal terminal G1. The threshold compensation circuit 8 is connected with the first node N1, the third node N3, and a second gate drive signal terminal G2, and configured to connect the first node N1 and the third node N3 in response to a signal of the second gate drive signal terminal G2. The first capacitor C1 is connected between the first node N1 and the first gate drive signal terminal G1. The second capacitor C2 is connected between the first node N1 and the second gate drive signal terminal G2. A turn-on level of the data write circuit 7 is a low level, a turn-on level of the threshold compensation circuit 8 is a high level, and a capacitance value of the first capacitor C1 is greater than a capacitance value of the second capacitor C2.

In the exemplary embodiment, in a threshold compensation phase, the first gate drive signal terminal G1 may output a low-level signal and the second gate drive signal terminal G2 may output a high-level signal, thereby achieving writing of a compensation voltage Vdata+Vth to the first node N1, Vdata is a voltage of the data signal terminal and Vth is a threshold voltage of the drive transistor T3. After the threshold compensation phase ends, a signal of the first gate drive signal terminal G1 changes from a low level to a high level, and under a coupling action of the first capacitor C1, the first node N1 is pulled up by the first gate drive signal terminal G1. A signal of the second gate drive signal terminal G2 changes from a high level to a low level, and under a coupling action of the second capacitor C2, the first node N1 is pulled down by the second gate drive signal terminal G2. Since the capacitance value of the first capacitor C1 is greater than the capacitance value of the second capacitor C2, the first node N1 is generally pulled up. Therefore, a source drive circuit provided corresponding to the pixel drive circuit only needs to provide a relatively small voltage signal to the data signal terminal to achieve display of a limit gray scale (a minimum gray scale or a maximum gray scale) of the pixel drive circuit, that is, a display panel to which the pixel drive circuit is applied may have a relatively small power consumption.

In the exemplary embodiment, the drive transistor T3 may be a P-type transistor, for example, the drive transistor may be a P-type low-temperature poly silicon transistor. When the drive transistor T3 is the P-type transistor, the larger a voltage at the first node N1 is, the smaller an output current of the drive transistor T3 is, that is, the pixel drive circuit can reduce a data signal voltage output by the source drive circuit at 0 gray scale. It should be understood that, in another exemplary embodiment, the drive transistor T3 may be an N-type transistor, and when the drive transistor T3 is the N-type transistor, the larger the voltage at the first node N1 is, the larger the output current of the drive transistor T3 is, that is, the pixel drive circuit can reduce a data signal voltage output by the source drive circuit at the maximum gray scale.

In the exemplary embodiment, the capacitance value of the first capacitor C1 is C1, the capacitance value of the second capacitor C2 is C2, and C1/C2 may be greater than or equal to 1.5 and less than or equal to 4, for example, C1/C2 may be 1.5, 2, 2.3, 2.5, 3, 3.5, and 4. The larger a value of C1/C2 is, the more obvious an effect that the first node N1 is pulled up is.

| | | | Vdata-L0 (V) | | | |
|---|---|---|---|---|---|---|
| C1/C2 | C1 (fF) | C2 (fF) | R | G | B | ΔV |
| 2.2 | 5.48 | 2.46 | | 6.2 | | |
| 1.35 | 5.8 | 4.31 | 6.72 | 6.77 | 6.51 | 0.12 |
| 1.73 | 6.94 | 4.02 | 6.51 | 6.58 | 6.32 | 0.31 |

-continued

| | | | Vdata-L0 (V) | | | |
|---|---|---|---|---|---|---|
| C1/C2 | C1 (fF) | C2 (fF) | R | G | B | ΔV |
| 2.05 | 6.94 | 3.39 | 6.42 | 6.46 | 6.2 | 0.43 |
| 2.3 | 7.92 | 3.44 | 6.29 | 6.36 | 6.09 | 0.53 |

As shown in the above table, Vdata-L0 represents a voltage of a data signal required for each color sub-pixel at 0 gray scale, and ΔV represents a difference between a maximum output voltage of the source drive circuit and a voltage of a maximum data signal required at 0 gray scale, wherein the maximum output voltage of the source drive circuit is 6.89 V. Multiple sets of data corresponding to C1/C2 being 1.35, 1.73, 2.05, and 2.3 are multiple sets of data under a same design structure (except C1/C2 is different, other structures are the same). Data corresponding to C1/C2 being 2.2 is data under another design structure. According to this table, it may be seen that under the same design structure, the larger C1/C2 is, the more obvious an effect that the first node N1 is pulled up is, so the smaller a voltage of a data signal required at 0 gray scale is.

In the exemplary embodiment, as shown in FIG. 10, the data write circuit 7 may include: a P-type fourth transistor T4, for example, the fourth transistor T4 may be a P-type low-temperature polycrystalline silicon transistor, the fourth transistor T4 has a gate connected with the first gate drive signal terminal G1, a first electrode connected with the second node N2, and a second electrode connected with the data signal terminal Vdata. The threshold compensation circuit 8 may include: an N-type second transistor T2, for example, the second transistor T2 may be an N-type oxide transistor, a semiconductor material of the oxide transistor may be indium gallium zinc oxide, the second transistor T2 has a gate connected with the second gate drive signal terminal G2, a first electrode connected with the first node N1, and a second electrode connected with the third node N3.

Figure 11:
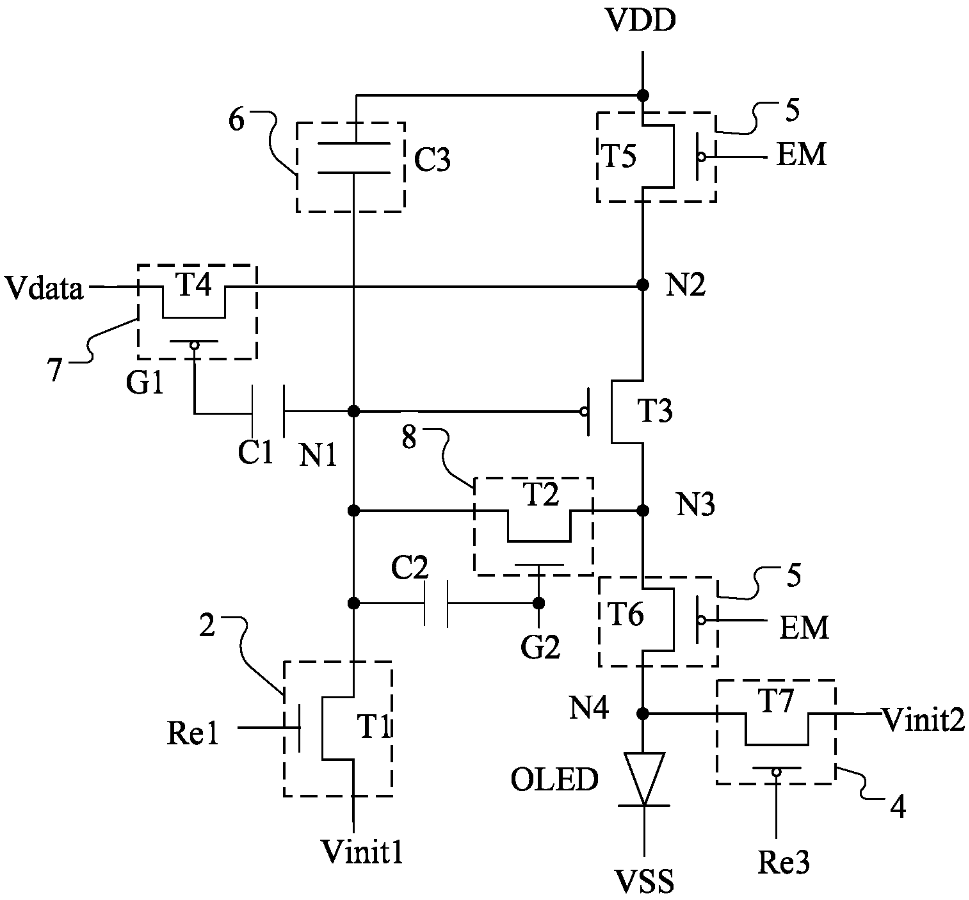
FIG. 11 is a schematic diagram of a structure of a pixel drive circuit according to another exemplary embodiment of the present disclosure.

In the exemplary embodiment, as shown in FIG. 11 which is a schematic diagram of a structure of a pixel drive circuit according to another exemplary embodiment of the present disclosure. The pixel drive circuit may further include: a control circuit 5, a coupling circuit 6. The control circuit 5 may be connected with a second power supply terminal VDD, a second node N2, a third node N3, a fourth node N4, an enable signal terminal EM, and may be configured to transmit a signal of the second power supply terminal VDD to the second node N2 in response to a signal of the enable signal terminal EM, and configured to connect the third node N3 and the fourth node N4 in response to the signal of the enable signal terminal EM. The coupling circuit 6 may be connected between the first node N1 and the second power supply terminal VDD. It should be understood that, in another exemplary embodiment, the control circuit 5 may also be configured to transmit a signal of the second power supply terminal VDD to the third node N3 in response to a signal of the enable signal terminal EM, and configured to connect the second node N2 and the fourth node N4 in response to the signal of the enable signal terminal EM.

In the exemplary embodiment, as shown in FIG. 11, the pixel drive circuit may further include a first reset circuit 2, which may be connected with the first node N1, a first initial signal terminal Vinit1, and a first reset signal terminal Re1. The first reset circuit 2 may be configured to transmit a signal of the first initial signal terminal Vinit1 to the first node N1 in response to a signal of the first reset signal terminal Re1.

In the exemplary embodiment, as shown in FIG. 11, the fourth node N4 may be configured to be connected with a light emitting unit OLED. The pixel drive circuit may further include a third reset circuit 4 connected with the fourth node N4, a second initial signal terminal Vinit2, and a third reset signal terminal Re3, and the third reset circuit 4 may be configured to transmit a signal of the second initial signal terminal Vinit2 to the fourth node N4 in response to a signal of the third reset signal terminal Re3. Another terminal of the light emitting unit OLED may be connected with a third power supply terminal VSS, and the light emitting unit OLED may be a light emitting diode. Writing an initial signal to the fourth node N4 may eliminate carriers that are not recombined on an internal light emitting interface of the light emitting diode and alleviate aging of the light emitting diode.

In the exemplary embodiment, as shown in FIG. 11, the coupling circuit 6 may include a third capacitor C3 connected between the first node N1 and the second power supply terminal VDD. A capacitance value of the third capacitor C3 may be greater than a capacitance value of the first capacitor C1, and the capacitance value of the third capacitor C3 may be greater than a capacitance value of the second capacitor C2. Setting the capacitance value of the third capacitor C3 to a relatively large value may increase a charge storage capability of the third capacitor C3, thereby increasing a maximum duration of a light emitting phase. The control circuit 5 may include a fifth transistor T5 and a sixth transistor T6. The fifth transistor T5 has a gate connected with the enable signal terminal EM, a first electrode connected with the second power supply terminal VDD, and a second electrode connected with the second node N2. The sixth transistor T6 has a gate connected with the enable signal terminal EM, a first electrode connected with the third node N3, and a second electrode connected with the fourth node N4. The first reset circuit 2 may include: a first transistor T1, the first transistor T1 has a gate connected with the first reset signal terminal Re1, a first electrode connected with the first initial signal terminal Vinit1, and a second electrode connected with the first node N1. The third reset circuit 4 may include a seventh transistor T7, the seventh transistor T7 has a gate connected with the third reset signal terminal Re3, a first electrode connected with the second initial signal terminal Vinit2, and a second electrode connected with the fourth node N4. The first transistor T1 and the second transistor T2 may be N-type transistors, a semiconductor material of the N-type transistors may be indium gallium zinc oxide, and an oxide transistor has a relatively small turn-off leakage current, so that a leakage current of the first node N1 flowing through the first transistor T1 and the second transistor T2 in the light emitting phase may be reduced. The fourth transistor T4, the fifth transistor T5, the sixth transistor T6, and the seventh transistor T7 may be P-type transistors, for example, the fourth transistor T4, the fifth transistor T5, the sixth transistor T6, and the seventh transistor T7 may be P-type low-temperature polycrystalline silicon transistors, which have a relatively high carrier mobility, thereby facilitating achievement of a display panel with a high resolution, a high reaction speed, a high pixel density, and a high aperture ratio.

Figure 12:
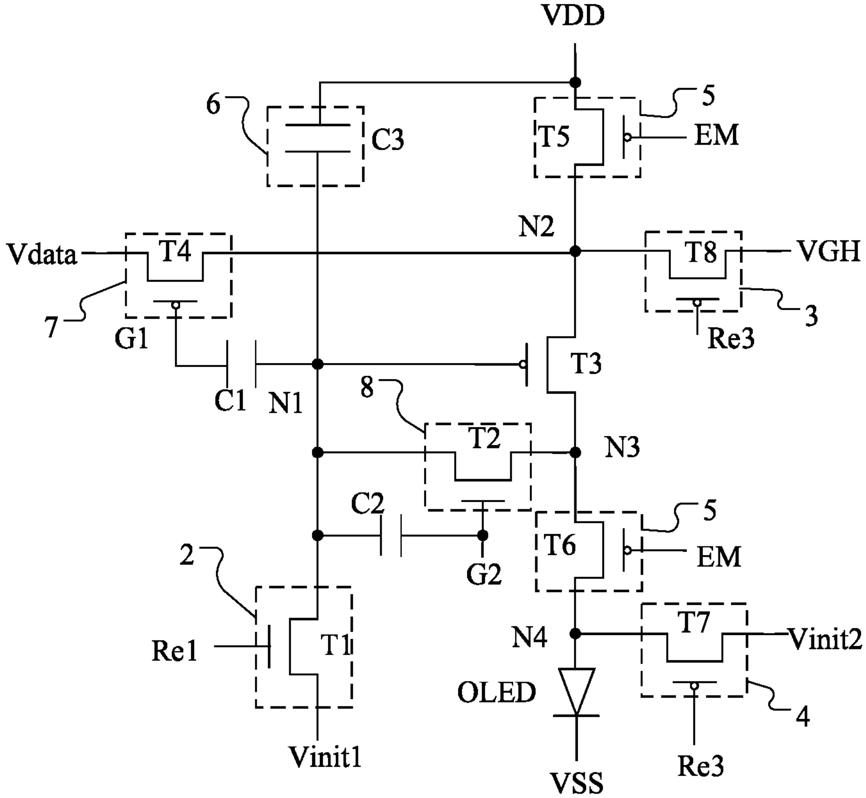
FIG. 12 is a schematic diagram of a structure of a pixel drive circuit according to another exemplary embodiment of the present disclosure.

FIG. 12 is a schematic diagram of a structure of a pixel drive circuit according to another exemplary embodiment of the present disclosure. The pixel drive circuit may also include a second reset circuit 3. The second reset circuit 3 may be connected with the second node N2 and a first power supply terminal VGH, and may be configured to transmit a signal of the first power supply terminal VGH to the second node N2 in response to a control signal. In the exemplary embodiment, a turn-on level of a first reset circuit may have an opposite polarity to a turn-on level of a third reset circuit, a signal of a first reset signal terminal Re1 may have an opposite polarity to a signal of a third reset signal terminal Re3, and a turn-on level of the second reset circuit 3 may have an opposite polarity to a turn-on level of the first reset circuit 2. The second reset circuit 3 may also be connected with the third reset signal terminal Re3, and configured to transmit a signal of the first power supply terminal VGH to the second node N2 in response to a signal of the third reset signal terminal Re3.

In the exemplary embodiment, there is a parasitic capacitance between a gate and a source of a drive transistor in the pixel drive circuit. In a reset phase of the pixel drive circuit, a gate voltage of the drive transistor is initialized to an initial voltage, and under a coupling action of the above parasitic capacitance, a source voltage of the drive transistor is correspondingly changed. When different gray scales are reset in the reset phase, the gate voltage of the drive transistor changes in different amounts, so that the source voltage of the drive transistor also changes in different amounts, which in turn causes Vgs (gate-source voltage difference) of the drive transistor to be different after the reset phase is completed. At the same time, since the Vgs of the drive transistor will affect its threshold voltage, a display panel will have an afterimage problem. For example, when the display panel is converted from a black-and-white picture to a picture with a same gray scale, since threshold voltages of the drive transistor in pixels corresponding to the black-and-white picture are different, after the conversion to the picture with the same gray scale, a region where a black-and-white picture of a previous frame is located will display different gray scales respectively, that is, the afterimage problem occurs. In the exemplary embodiment, the pixel drive circuit may transmit a signal of the first initial signal terminal Vinit1 to the first node N1 by using the first reset circuit 2 in the reset phase, at the same time, transmit a signal of the first power supply terminal VGH to the second node N2 by using the second reset circuit 3, so that the pixel drive circuit may reset a gate-source voltage difference of the drive transistor to a same value under different data signals, thereby improving the problem of the afterimage of the display panel.

In the exemplary embodiment, the second reset circuit 3 may include: an eighth transistor T8. The eighth transistor T8 has a gate connected with the third reset signal terminal Re3, a first electrode connected with the first power supply terminal VGH, and a second electrode connected with the second node N2. The eighth transistor T8 may be a P-type transistor. It should be understood that, in another exemplary embodiment, a turn-on level of a second reset circuit may have a same polarity as a turn-on level of a first reset circuit, the second reset circuit may be connected with a first reset signal terminal, and the second reset circuit may be configured to transmit a signal of a first power supply terminal VGH to a second node in response to a signal of the first reset signal terminal. Accordingly, the eighth transistor may be an N-type transistor, a semiconductor material of the N-type transistor may be indium gallium zinc oxide. The first power supply terminal VGH may also share the second power supply terminal VDD, for example, a second reset circuit may be connected with a second power supply terminal VDD.

Figure 13:
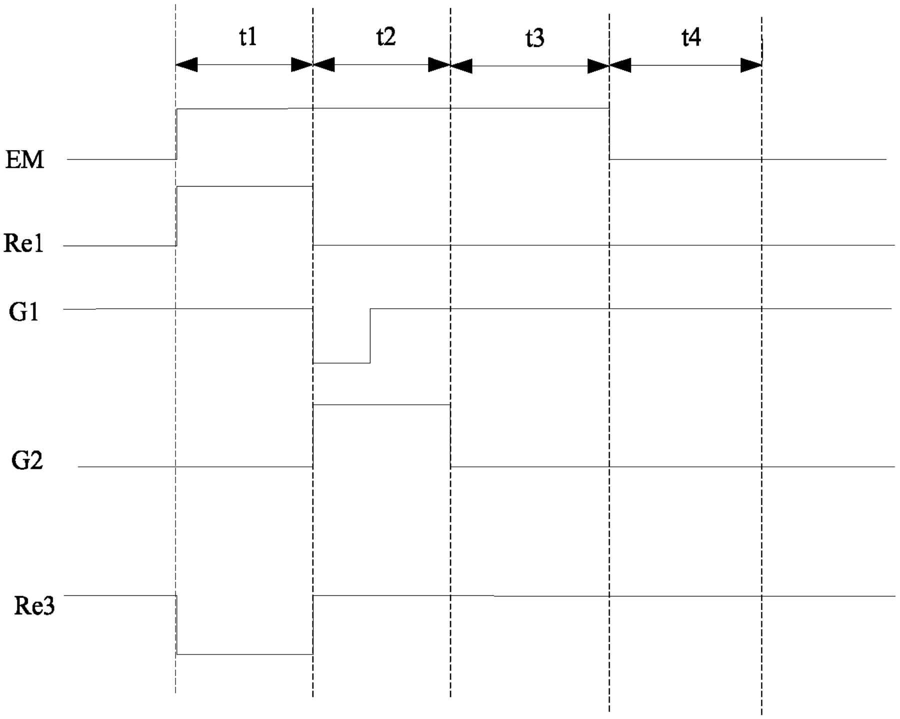
FIG. 13 is a timing diagram of each node of the pixel drive circuit in FIG. 12 in a driving method.

As shown in FIG. 13, FIG. 13 is a timing diagram of each node of the pixel drive circuit in FIG. 12 in a driving method. G1 represents a timing of a first gate drive signal terminal, G2 represents a timing of a second gate drive signal terminal, Re1 represents a timing of a first reset signal terminal, Re3 represents a timing of a third reset signal terminal, and EM represents a timing of an enable signal terminal. The driving method of the pixel drive circuit may include four phases: a reset phase t1, a threshold compensation phase t2, a buffering phase t3, and a light emitting phase t4. In the reset phase t1, the enable signal terminal EM, the first reset signal terminal Re1, and the first gate drive signal terminal output a high-level signal, the second gate drive signal terminal G2 and the third reset signal terminal Re3 output a low-level signal, a first transistor T1, a seventh transistor T7, and an eighth transistor T8 are turned on, a first initial signal terminal Vinit1 inputs a first initial signal to a first node N1, a first power supply terminal VDD inputs a power supply signal to a second node N2, and a second initial signal terminal Vinit2 inputs a second initial signal to a fourth node, wherein voltages of the first initial signal and the second initial signal may be the same or different. In the threshold compensation phase t2, the enable signal terminal EM, the second gate drive signal terminal G2, and the third reset signal terminal output a high-level signal, the first reset signal terminal Re1 outputs a low-level signal, the first gate drive signal terminal G1 outputs a low-level signal during at least part of the threshold compensation phase t2, a second transistor T2 and a fourth transistor T4 are turned on, and a data signal terminal Vdata writes a compensation voltage Vdata+Vth to the first node N1, wherein Vdata is a voltage of the data signal terminal and Vth is a threshold voltage of a drive transistor. In the buffering phase t3, the enable signal terminal EM, the third reset signal terminal Re3, and the first gate drive signal terminal G1 output a high-level signal, the second gate drive signal terminal G2 and the first reset signal terminal Re1 output a low-level signal, and all transistors are turned off. In the light emitting phase t4, the third reset signal terminal Re3 and the first gate drive signal terminal G1 output a high-level signal, the enable signal terminal EM, the second gate drive signal terminal G2, and the first reset signal terminal Re1 output a low-level signal, a fifth transistor T5 and a sixth transistor T6 are turned on, and a drive transistor T3 emits light under an action of the voltage Vdata+Vth stored in a capacitor C. In the exemplary embodiment, in the threshold compensation phase t2, a duration of a valid level (low level) of the first gate drive signal terminal G1 may be less than a duration of a valid level (high level) of the second gate drive signal terminal G2. In the threshold compensation phase t2, the first gate drive signal terminal G1 may scan a row of pixel drive circuits, and the second gate drive signal terminal G2 may scan multiple rows of pixel drive circuits row by row, for example, the second gate drive signal terminal G2 may scan two rows of pixel drive circuits row by row. It should be understood that, in another exemplary embodiment, the driving method may also not include the buffering phase, and the first transistor T1 and the seventh transistor T7 may also be turned on at different phases. The duration of the valid level (low level) of the first gate drive signal terminal G1 may also be equal to the duration of the valid level (high level) of the second gate drive signal terminal G2.

Figure 14:
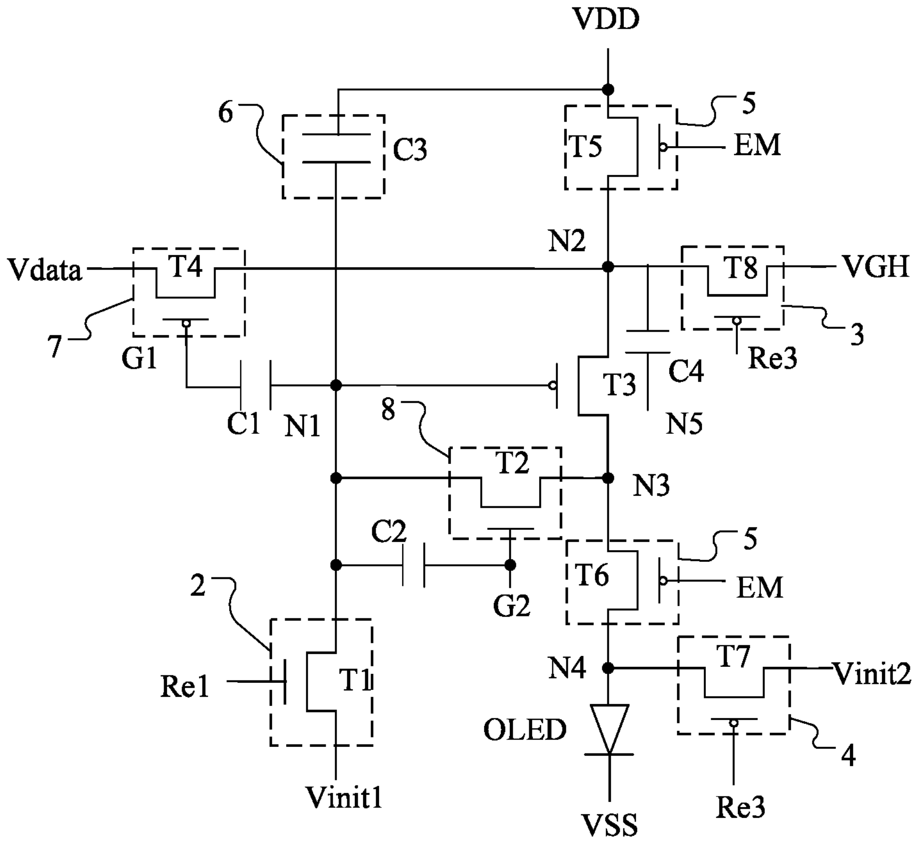
FIG. 14 is a schematic diagram of a structure of a pixel drive circuit according to another exemplary embodiment of the present disclosure.

FIG. 14 is a schematic diagram of a structure of a pixel drive circuit according to another exemplary embodiment of the present disclosure. The pixel drive circuit may also include a fourth capacitor C4. A first electrode of the fourth capacitor C4 may be connected with a second node N2, in a light emitting phase of the pixel drive circuit, a second power supply terminal VDD may charge the fourth capacitor C4, and at beginning time of a reset phase, the fourth capacitor C4 may maintain a high level of the second node N2, so that this setting may accelerate a speed of writing a high-level signal to the second node N2 by a first power supply terminal VGH in the reset phase. A second electrode of the fourth capacitor C4 may be connected with a fifth node N5. When an equipotential conductive part of the fifth node N5 has a pull-down action before a threshold compensation phase or at a beginning phase of the threshold compensation phase, the fifth node N5 will have a pull-down action on the second node N2, thus resulting in differences in a voltage of the second node N2 at different positions of a display panel. For example, the equipotential conductive part of the fifth node N5 may be a first gate line for providing a first gate drive signal terminal G1, the first gate line may be partially overlapped with an equipotential conductive part of the second node N2, so that a partial structure of the first gate line may be used for forming the second electrode of the fourth capacitor C4. The first gate line changes from a high level to a low level at a beginning phase of the threshold compensation phase, so that the first gate line will pull down the voltage of the second node N2. In the exemplary embodiment, an overlapping area of the equipotential conductive part of the second node N2 and the first gate line may be reduced as much as possible, so as to reduce a pull-down effect of the first gate line on the second node N2. Among them, a capacitance value C4 of the fourth capacitor C4 may be less than a capacitance value of a second capacitor C2, and the fourth capacitor C4 may be 0.5 fF to 4 fF, for example, 0.5 fF, 2 fF, 4 fF. The capacitance value C4 of the fourth capacitor C4 may also be less than half of a capacitance value of a first capacitor C1, for example, the capacitance value C4 of the fourth capacitor C4 may be ⅓, ¼, ⅕, etc. of the capacitance value of the first capacitor C1.

In the exemplary embodiment, as shown in FIG. 12 and FIG. 14, the pixel drive circuit needs to turn on the drive transistor T3 in the threshold compensation phase, so a voltage difference Vinit1−Vgh between the first initial signal terminal Vinit1 and the first power supply terminal VGH needs to be less than a threshold voltage Vth of the drive transistor T3, wherein Vinit1 is a voltage of the first initial signal terminal and Vgh is a voltage of the first power supply terminal VGH. Vinit1 may be −2 V to −6 V, for example, −2 V, −3 V, −4 V, −5 V, −6 V, etc. Vinit1−Vgh may be less than a*Vth, a may be 2 to 7, for example, a may be 2, 4, 6, and 7. Vth may be −2 V to −5 V, for example, −2 V, −3 V, −5 V, etc. Vgh may be greater than 1.5 times Vth, for example, Vgh may be 1.6 times, 1.8 times, 2 times of Vth, etc.

Figure 15:
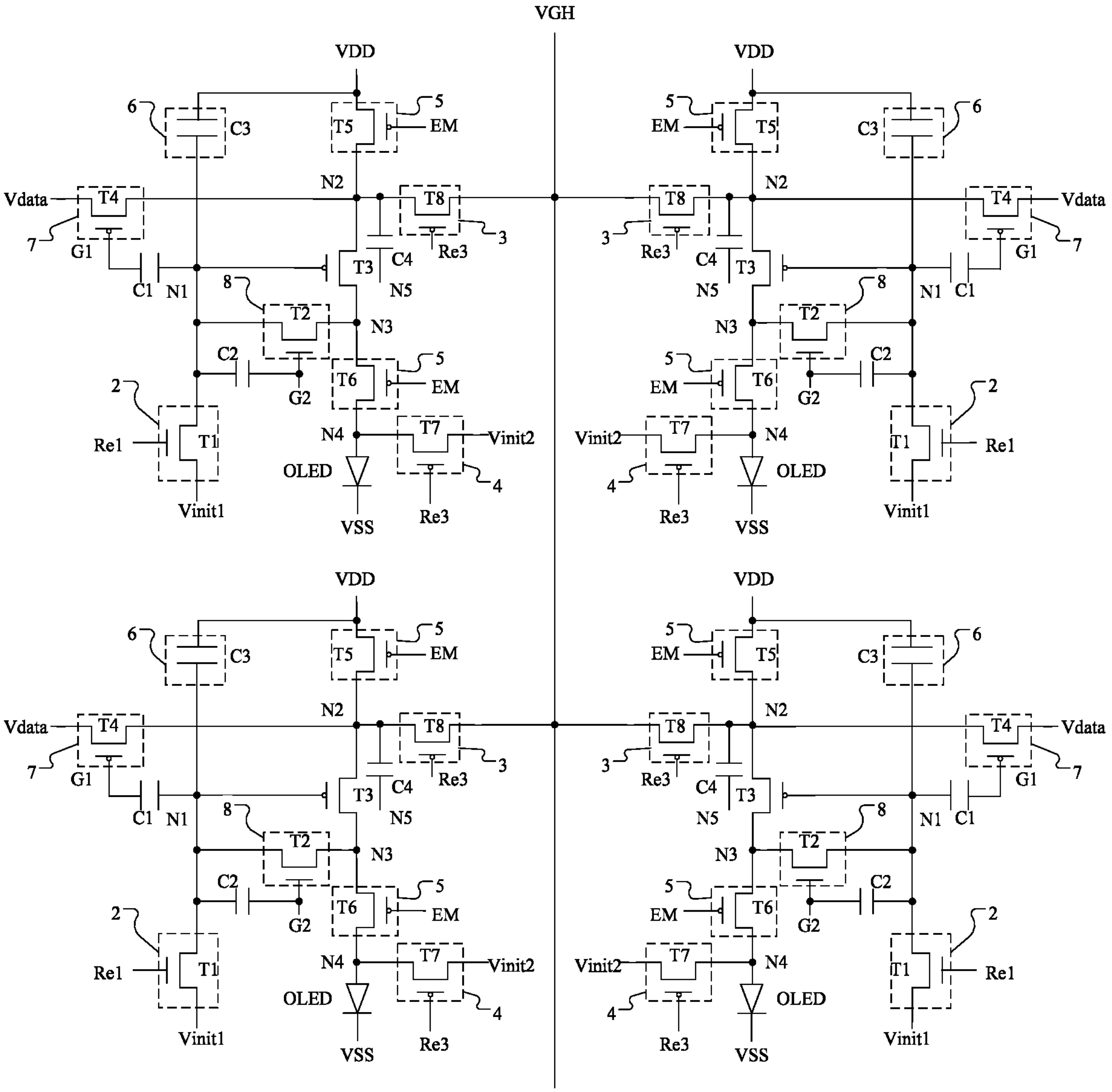
FIG. 15 is a distribution diagram of a pixel drive circuit in a display panel according to an exemplary embodiment of the present disclosure.

FIG. 15 is a distribution diagram of a pixel drive circuit in a display panel according to an exemplary embodiment of the present disclosure. Two adjacent columns of pixel circuits may be connected with a first power supply line VGH extending in a same column direction, the first power supply line VGH is configured to provide a first power supply terminal to the pixel drive circuit, and the first power supply line VGH may be located between the above adjacent two columns of pixel drive circuits. As shown in FIG. 15, in a same pixel row, two pixel circuits in adjacent columns may be mirrored to facilitate wiring.

Figure 16:
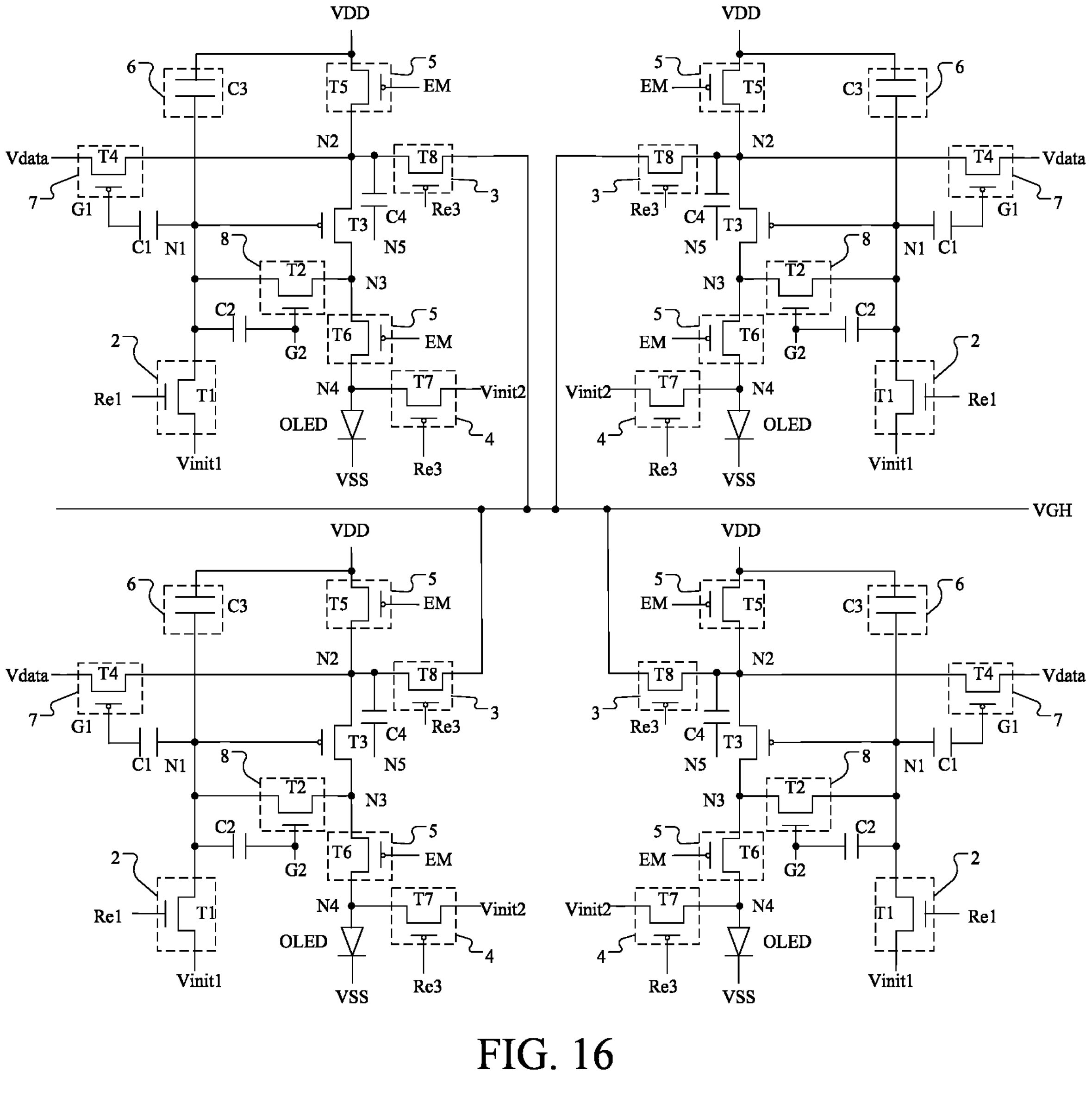
FIG. 16 is a distribution diagram of a pixel drive circuit in a display panel according to another exemplary embodiment of the present disclosure.

FIG. 16 is a distribution diagram of a pixel drive circuit in a display panel according to another exemplary embodiment of the present disclosure. Two adjacent rows of pixel circuits may be connected with a first power supply line VGH extending in a same row direction, the first power supply line VGH is configured to provide a first power supply terminal to the pixel drive circuit, and the first power supply line VGH may be located between the above two adjacent rows of pixel drive circuits. As shown in FIG. 16, in a same pixel row, two pixel circuits in adjacent columns may be mirrored to facilitate wiring.

Figure 17:
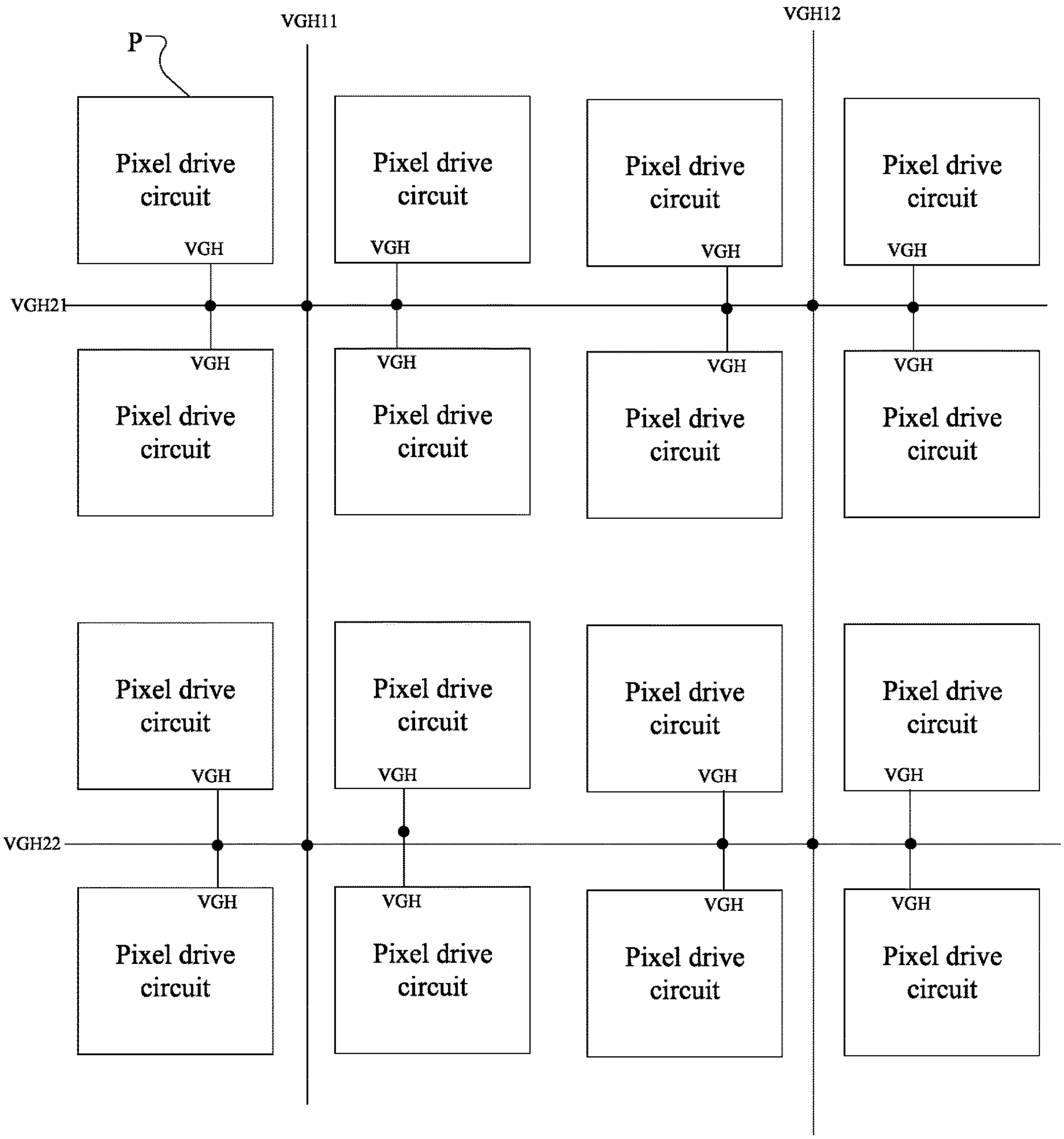
FIG. 17 is a distribution diagram of a pixel drive circuit in a display panel according to another exemplary embodiment of the present disclosure.

FIG. 17 is a distribution diagram of a pixel drive circuit in a display panel according to another exemplary embodiment of the present disclosure. The display panel may include multiple pixel drive circuits P distributed in an array, and multiple first power supply lines VGH11, VGH12, VGH21, and VGH22, each of which may be configured to provide a first power supply terminal. As shown in FIG. 17, the first power supply lines VGH11 and VGH12 extend in a column direction, the first power supply lines VGH21 and VGH22 extend in a row direction. Two adjacent rows of pixel circuits may be connected with a first power supply line extending in a same row direction, the first power supply line VGH may be located between the above two adjacent rows of pixel drive circuits, and the first power supply lines extending in the column direction may be connected with multiple first power supply lines extending in the row direction intersecting the first power supply lines, so that multiple power supply lines may form a grid structure. The first power supply lines extending in the column direction may be located in a region where a red pixel drive circuit is located. In addition, in a same pixel row, two pixel circuits in adjacent columns may be mirrored to facilitate wiring.

An embodiment of the present disclosure also provides a driving method of a pixel drive circuit, which is configured to drive the above pixel drive circuit. The method includes following contents.

In a reset phase, a high-level signal is inputted to the enable signal terminal EM, the first reset signal terminal Re1, and the first gate drive signal terminal G1, and a low-level signal is inputted to the second gate drive signal terminal G2 and the third reset signal terminal Re3.

In a threshold compensation phase, a high-level signal is inputted to the enable signal terminal EM, the second gate drive signal terminal G2, and the third reset signal terminal Re3, and a low-level signal is inputted to the first reset signal terminal Re1 and the first gate drive signal terminal G1.

In a light emitting phase, a high-level signal is inputted to the third reset signal terminal Re3 and the first gate drive signal terminal G1, and a low-level signal is inputted to the enable signal terminal EM, the second gate drive signal terminal G2, and the first reset signal terminal Re1.

The driving method has been described in detail in the above contents and will not be repeated here.

Figure 18:
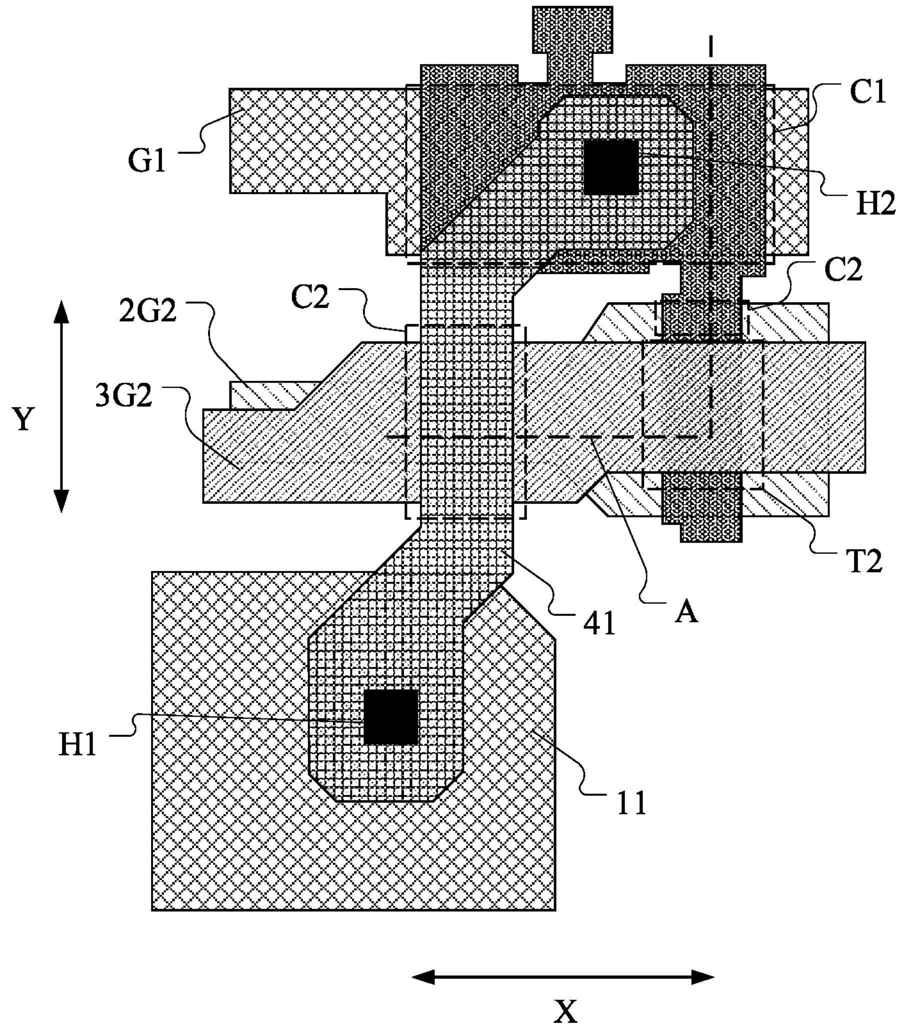
FIG. 18 is a partial structural layout of a display panel according to an exemplary embodiment of the present disclosure.
Figure 19:
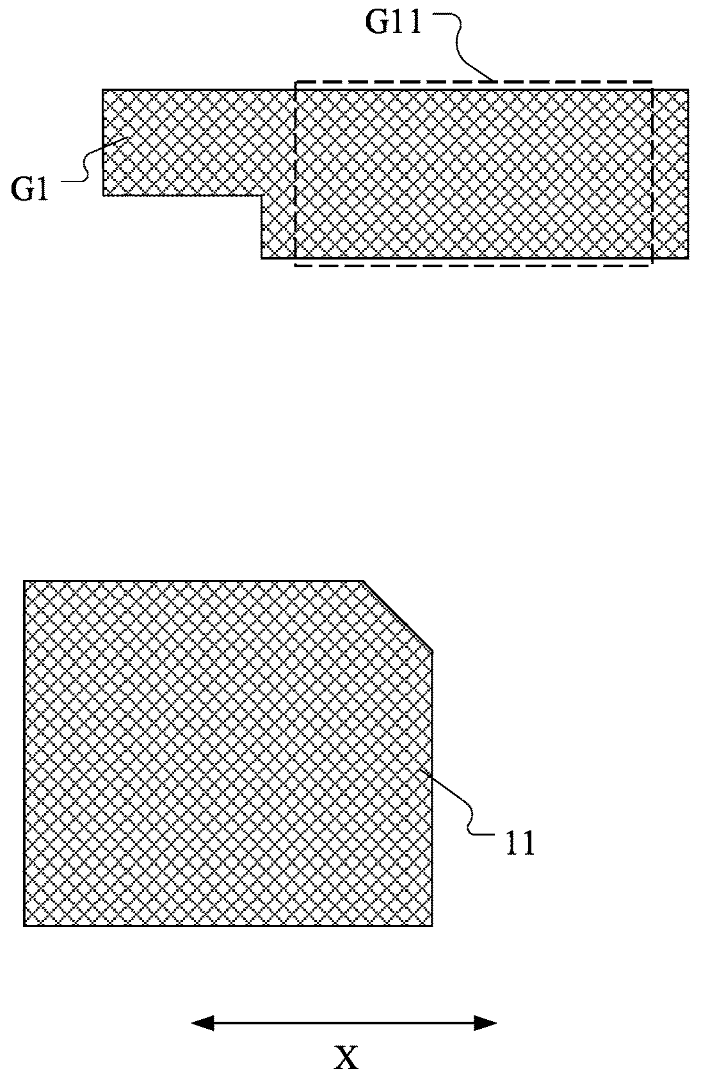
FIG. 19 is a structural layout of a first conductive layer in FIG. 18.
Figure 20:
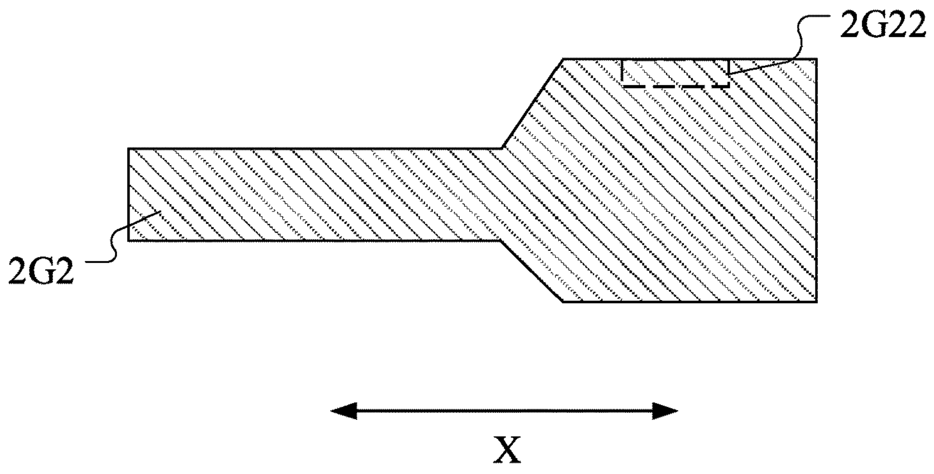
FIG. 20 is a structural layout of a second conductive layer in FIG. 18.
Figure 21:
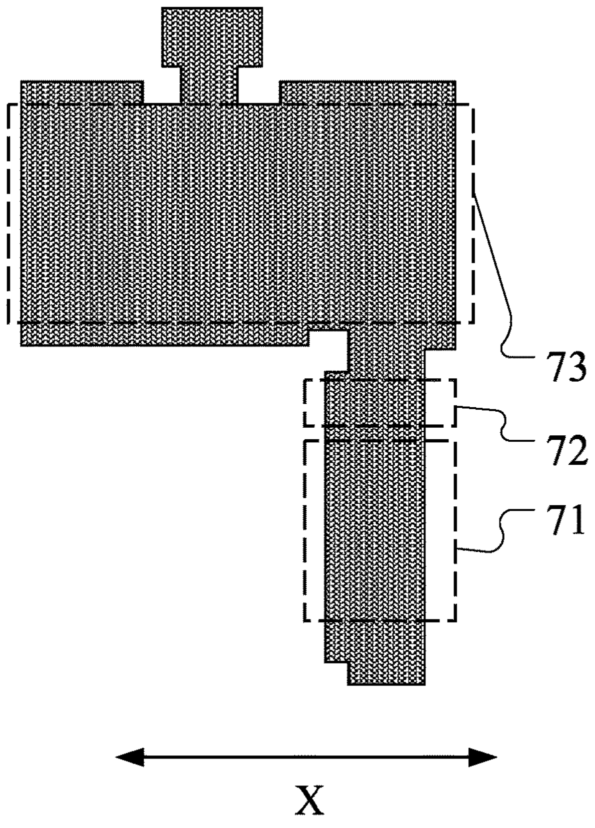
FIG. 21 is a structural layout of a second active layer in FIG. 18.
Figure 22:
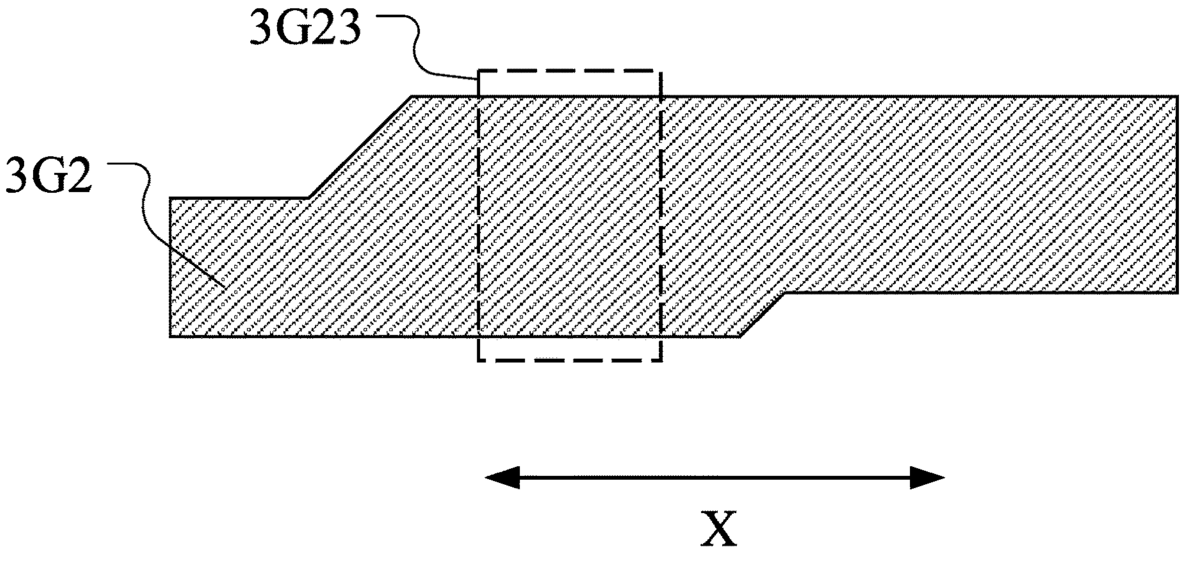
FIG. 22 is a structural layout of a third conductive layer in FIG. 18.

An exemplary embodiment also provides a display panel, wherein the display panel may include the above pixel drive circuit. The display panel may be applied to a display apparatus such as a mobile phone, a tablet computer, a television, etc. The pixel drive circuit in the display panel may be shown in FIG. 10, wherein the display panel may include a substrate, a first conductive layer, a second conductive layer, a second active layer, a third conductive layer, and a fourth conductive layer which are sequentially stacked, and an insulation layer may also be disposed between the above hierarchical structures. As shown in FIG. 18 to FIG. 25, FIG. 18 is a partial structural layout of a display panel according to an exemplary embodiment of the present disclosure, FIG. 19 is a structural layout of a first conductive layer in FIG. 18, FIG. 20 is a structural layout of a second conductive layer in FIG. 18, FIG. 21 is a structural layout of a second active layer in FIG. 18, FIG. 22 is a structural layout of a third conductive layer in FIG. 18, FIG.

Figure 24:
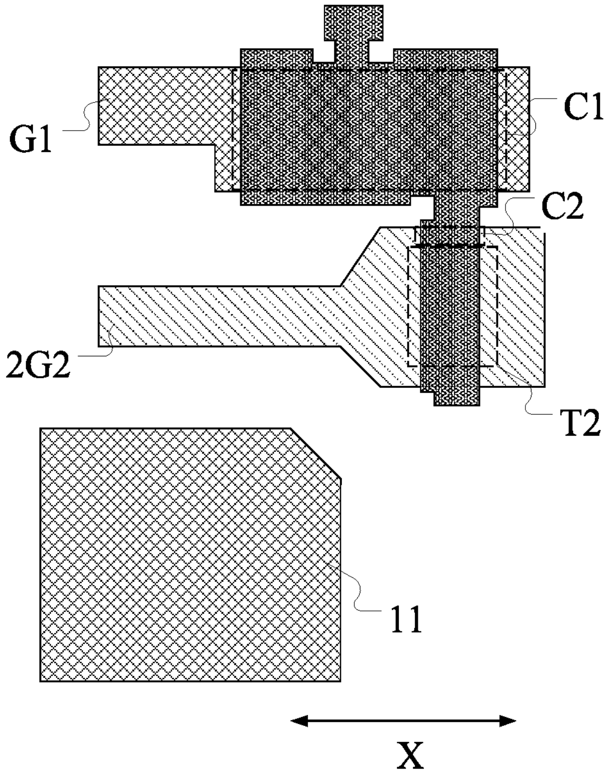
FIG. 24 is a structural layout of a first conductive layer, a second conductive layer, and a second active layer in FIG. 18.
Figure 25:
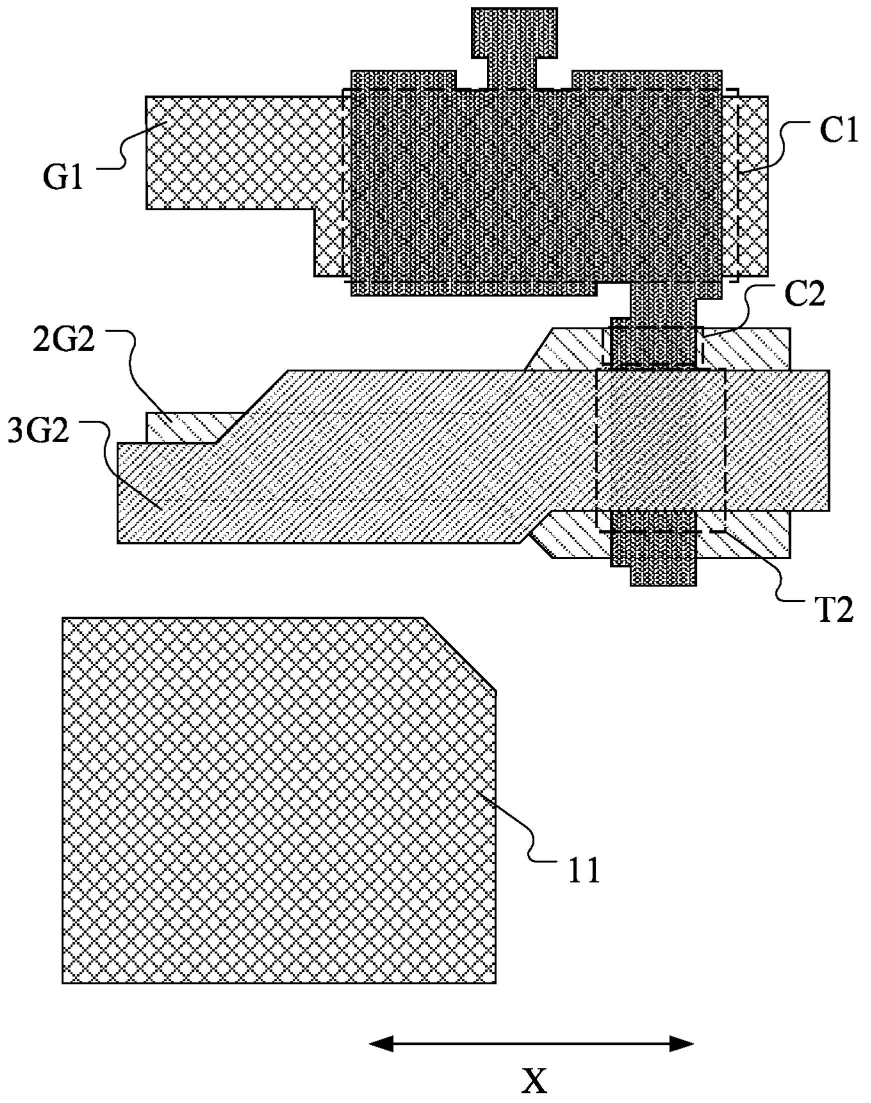
FIG. 25 is a structural layout of a first conductive layer, a second conductive layer, a second active layer, and a third conductive layer in FIG. 18.

23 is a structural layout of a fourth conductive layer in FIG. 18, FIG. 24 is a structural layout of a first conductive layer, a second conductive layer, and a second active layer in FIG. 18, and FIG. 25 is a structural layout of a first conductive layer, a second conductive layer, a second active layer, and a third conductive layer in FIG. 18.

As shown in FIG. 18, FIG. 19, and FIG. 24, the first conductive layer may include a first conductive part 11 and a first gate line G1. The first conductive part 11 may be configured to form a gate of the drive transistor T3, an orthographic projection of the first gate line G1 on the substrate may extend along a first direction X, the first gate line G1 may be connected with a gate of a fourth transistor T4, for example, a partial structure of the first gate line G1 may be used for forming the gate of the fourth transistor.

As shown in FIG. 18, FIG. 20, and FIG. 24, the second conductive layer may include a second gate line 2G2, an orthographic projection of the second gate line 2G2 on the substrate may extend along the first direction X, the second gate line 2G2 may be connected with a gate of a second transistor, for example, a partial structure of the second gate line 2G2 may be used for forming a bottom gate of the second transistor.

As shown in FIG. 18, FIG. 21, and FIG. 24, the second active layer may include a first active part 71, a second active part 72, and a third active part 73. The second active part 72 is connected between the first active part 71 and the third active part 73, the first active part 71 may be used for forming a channel region of the second transistor T2, and the orthographic projection of the second gate line 2G2 on the substrate may cover an orthographic projection of the first active part 71 on the substrate. A material of the second active layer may be indium gallium zinc oxide.

As shown in FIG. 18, FIG. 22, and FIG. 25, the third conductive layer may include a third gate line 3G2. An orthographic projection of the third gate line 3G2 on the substrate may extend along the first direction X, the orthographic projection of the third gate line 3G2 on the substrate may cover the orthographic projection of the first active part 71 on the substrate, and a partial structure of the third gate line 3G2 may be used for forming a top gate of the second transistor. The display panel may perform a conductorization processing on the second active layer by using a third conductive part as a mask, that is, a region of the second active layer covered by the third conductive layer forms a channel region of a transistor, and a region of the second active layer not covered by the third conductive layer forms a conductor structure.

Figure 23:
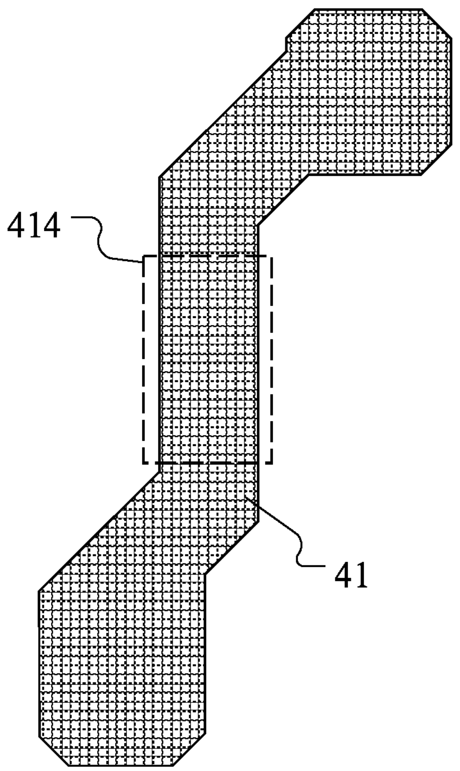
FIG. 23 is a structural layout of a fourth conductive layer in FIG. 18.

As shown in FIG. 18 and FIG. 23, the fourth conductive layer may include a connection part 41 which may be connected with the first conductive part 11 through a via H1 and connected with the third active part 73 through a via H2.

Figure 26:
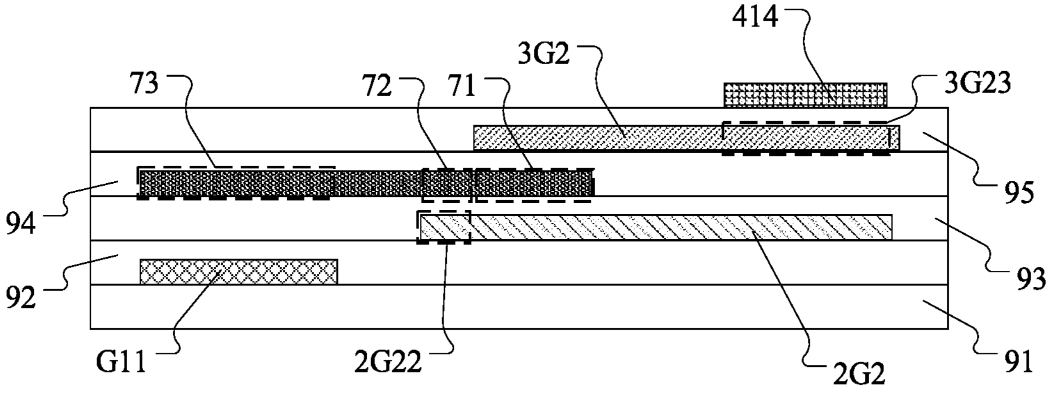
FIG. 26 is a partial sectional view taken along a dotted line A in FIG. 18.

As shown in FIG. 26, which is a partial sectional view taken along a dotted line A in FIG. 18, the display panel may further include a first insulation layer 92, a second insulation layer 93, a third insulation layer 94, and a dielectric layer 95. A substrate 91, the first conductive layer, the first insulation layer 92, the second conductive layer, the second insulation layer 93, the second active layer, the third insulation layer 94, the third conductive layer, the dielectric layer 95, and the fourth conductive layer are sequentially stacked. The first insulation layer 92, the second insulation layer 93, and the third insulation layer 94 may include a silicon oxide layer. The dielectric layer 95 may include a silicon nitride layer. A material of the fourth conductive layer may include a metallic material, such as molybdenum, aluminum, copper, titanium, niobium, one of them or an alloy, or a molybdenum/titanium alloy or a laminate or the like, or a titanium/aluminum/titanium laminate. Materials of the first conductive layer, the second conductive layer, and the third conductive layer may be molybdenum, aluminum, copper, titanium, niobium, one of them or an alloy, or a molybdenum/titanium alloy or a laminate or the like.

As shown in FIG. 18 to FIG. 26, the first gate line G1 may include a first extension part G11, an orthographic projection of the first extension part G11 on the substrate may be overlapped with an orthographic projection of the third active part 73 on the substrate. The first extension part G11 may be used for forming a first electrode of a first capacitor C1, and the third active part 73 may be used for forming a second electrode of the first capacitor C1. The second gate line 2G2 may include a second extension part 2G22, an orthographic projection of the second extension part 2G22 on the substrate may be overlapped with an orthographic projection of the second active part 72 on the substrate, and an orthographic projection of the third gate line 3G2 on the substrate is located on a side of an orthographic projection of the second active part 72 on the substrate. That is, the orthographic projection of the third gate line 3G2 on the substrate is not overlapped with the orthographic projection of the second active part 72 on the substrate. For example, as shown in FIG. 18, the orthographic projection of the third gate line 3G2 on the substrate may be located on a side of the orthographic projection of the second active part 72 on the substrate in a second direction Y, the second direction Y may intersect the first direction X, for example, the second direction Y may be perpendicular to the first direction X. The second extension part 2G22 may be used for forming a part of a first electrode of a second capacitor C2, and the second active part 72 may be used for forming a part of a second electrode of the second capacitor C2. The third gate line 3G2 may include a third extension part 3G23, and the connection part 41 may include a fourth extension part 414. An orthographic projection of the third extension part 3G23 on the substrate may be overlapped with an orthographic projection of the fourth extension part 414 on the substrate, the third extension part 3G23 may be used for forming a part of the first electrode of the second capacitor C2, and the fourth extension part 414 may be used for forming a part of the second electrode of the second capacitor C2. A size of the orthographic projection of the third active part 73 on the substrate in the first direction X may be greater than a size of the orthographic projection of the second active part 72 on the substrate in the first direction X, this setting may increase a capacitance value of the first capacitor C1. In the exemplary embodiment, the capacitance value of the first capacitor may be adjusted by adjusting the size of the orthographic projection of the third active part 73 on the substrate in the first direction X, and the size of the orthographic projection of the third active part 73 on the substrate in the first direction X may be 5 μm to 20 μm, for example, 5 μm, 9.7 μm, 12 μm, 15.55 μm, and 50 μm. In addition, in the exemplary embodiment, the capacitance value of the first capacitor C1 may also be adjusted by adjusting a thickness of the first insulation layer 92 and the second insulation layer 93 at the third active part 73, for example, in the exemplary embodiment, the thickness of the first insulation layer 92 and/or the second insulation layer 93 at the third active part 73 may be reduced to increase the capacitance value of the first capacitor C1. In the exemplary embodiment, a capacitance value of the second capacitor may also be adjusted by adjusting a size of the orthographic projection of the fourth extension part 414 on the substrate in the first direction X, the smaller the size of the orthographic projection of the fourth extension part 414 on the substrate in the first direction X is, the smaller the capacitance value of the second capacitor is, and the size of the orthographic projection of the fourth extension part 414 on the substrate in the first direction may be 2 μm to 4 μm, for example, 4 μm, 3.7 μm, 3.5 μm, 2.95 μm, 2.2 μm, and 2 μm. In addition, in the exemplary embodiment, the capacitance value of the second capacitor may also be adjusted by adjusting a size of the orthographic projection of the second extension part 2G22 on the substrate in the second direction Y, and the smaller the size of the orthographic projection of the second extension part 2G22 on the substrate in the second direction Y is, the smaller the capacitance value of the second capacitor is.

It should be noted that, as shown in FIG. 18 and FIG. 26, in a region where the fourth extension part 414 is located, the orthographic projection of the third gate line 3G2 on the substrate covers the orthographic projection of the second gate line 2G2 on the substrate. Although the orthographic projection of the second gate line 2G2 in this region on the substrate is overlapped with the orthographic projection of the fourth extension part 414 on the substrate, an area change of the orthographic projection of the second gate line 2G2 in this region on the substrate does not affect the capacitance value of the second capacitor due to a shielding effect of the third gate line 3G2. Similarly, in a region where the first extension part G11 is located, the orthographic projection of the third active part 73 on the substrate covers the orthographic projection of the connection part 41 on the substrate. Although the orthographic projection of the connection part 41 in this region on the substrate is overlapped with the orthographic projection of the first extension part G11 on the substrate, an area change of the orthographic projection of the connection part 41 in this region on the substrate does not affect the capacitance value of the first capacitor due to a shielding effect of the third active part 73.

As shown in FIG. 27 to FIG. 45, FIG. 27 to FIG. 45 are illustrative drawings of pixel drive circuits according to another set of exemplary embodiments of the present disclosure.

In the embodiments of the present disclosure, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

It may be understood by those of skills in the art that transistors used in all the embodiments of the present disclosure may be thin film transistors, or field-effect transistors, or other devices with a same characteristic. In the specification, a first electrode may be a drain electrode, and a second electrode may be a source electrode. Or, the first electrode may be the source electrode, and the second electrode may be the drain electrode. In a case that transistors with opposite polarities are used or that a direction of a current is changed during circuit operation, functions of the "source electrode" and the "drain electrode" may sometimes be exchanged. Therefore, the "source electrode" and the "drain electrode" may be exchanged in the specification.

In this specification, a "connection" includes a case where constitute elements are connected with each other through an element having some electrical effect. The "element having some electrical effect" is not particularly limited as long as it allows sending and receiving of electrical signals between the connected constituent elements. Examples of the "element having some electrical effect" include not only an electrode and wiring, but also a switch element such as a transistor, a resistor, an inductor, a capacitor, other elements with various functions, etc.

Figure 27:
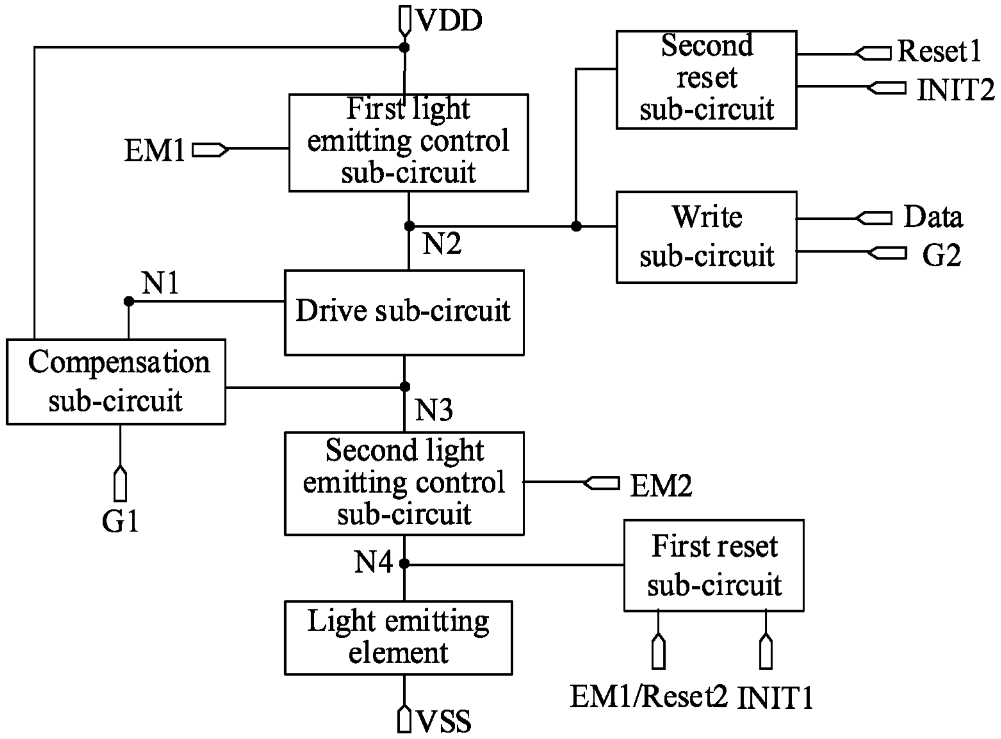
FIG. 27 is a first schematic diagram of a structure of a pixel circuit according to an embodiment of the present disclosure.
Figure 28:
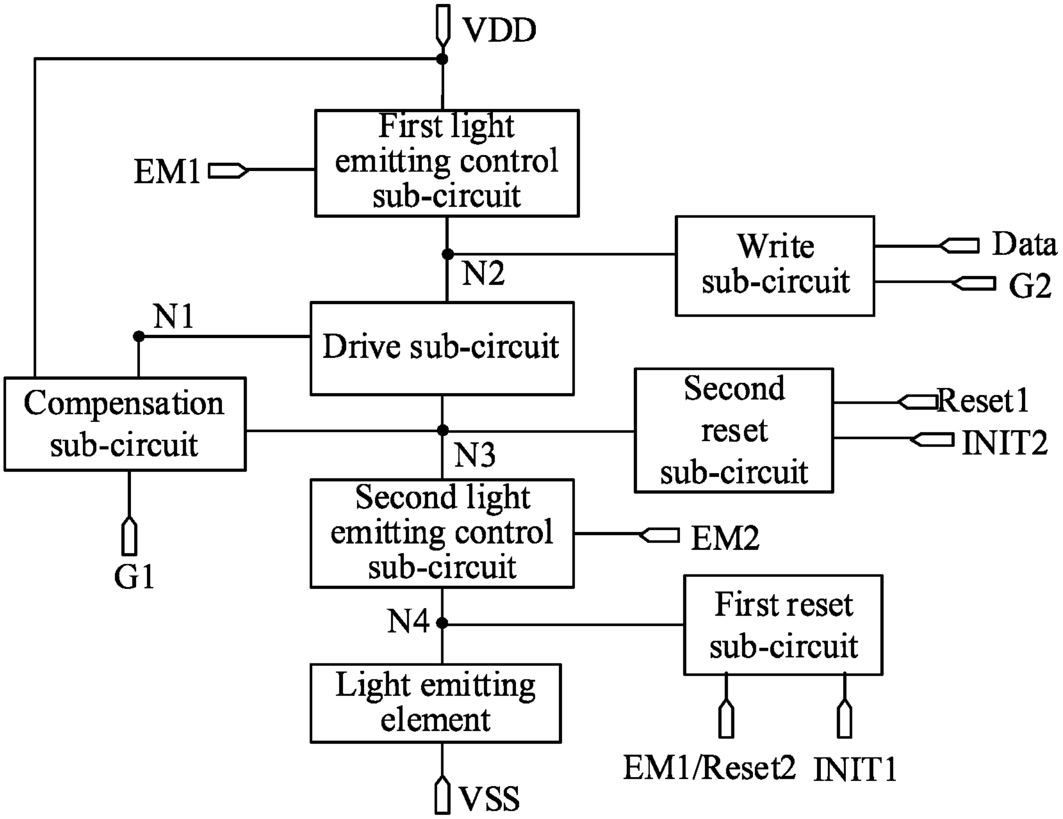
FIG. 28 is a second schematic diagram of a structure of a pixel circuit according to an embodiment of the present disclosure.

FIG. 27 and FIG. 28 are schematic diagrams of structures of two pixel circuits according to an exemplary embodiment of the present disclosure. As shown in FIG. 27 and FIG. 28, the pixel circuit provided by an embodiment of the present disclosure includes a drive sub-circuit, a first reset sub-circuit, a second reset sub-circuit, and a light emitting element.

The drive sub-circuit is connected with a first node N1, a second node N2, and a third node N3 respectively, and is configured to generate a drive current between the second node N2 and the third node N3 in response to a control signal of the first node N1.

The first reset sub-circuit is connected with a first reset signal line INIT1 and an anode terminal of the light emitting element respectively, is further connected with a first light emitting control signal line EM1 or a second reset control signal line Reset2, and is configured to write a first reset signal provided by the first reset signal line INIT1 to the anode terminal of the light emitting element in response to a signal of the first light emitting control signal line EM1 or the second reset control signal line Reset2.

The second reset sub-circuit is connected with a first reset control signal line Reset1 and a second reset signal line INIT2 respectively, is further connected with the second node N2 or the third node N3, and is configured to write a second reset signal provided by the second reset signal line INIT2 to a first electrode or a second electrode of the drive sub-circuit in response to a signal of the first reset control signal line Reset1; and the second reset signal is greater than the first reset signal.

In some exemplary implementations, an absolute value of the second reset signal is greater than 1.5 times of a threshold voltage of the drive sub-circuit.

In some exemplary implementations, an amplitude of the second reset signal is greater than 0.

Exemplarily, the second reset signal is generally a reset voltage of 4 V to 10 V, the first reset signal is generally a reset voltage of −2 V to −6 V, the threshold voltage of the drive sub-circuit is generally −5 V to −2 V, and optionally, the threshold voltage of the drive sub-circuit may be −3 V.

In some exemplary implementations, as shown in FIG. 27 and FIG. 28, the pixel circuit further includes a write sub-circuit, a compensation sub-circuit, a first light emitting control sub-circuit, and a second light emitting control sub-circuit.

The write sub-circuit is connected with a second scan signal line G2, a data signal line Data, and the second node N2 respectively, and is configured to write a data signal of the data signal line Data to the second node N2 in response to a signal of the second scan signal line G2.

The compensation sub-circuit is connected with a first power supply line VDD, a first scan signal line G1, the first node N1 and the third node N3 respectively, and is configured to write the first reset signal or the second reset signal of the third node N3 to the first node N1 in response to a signal of the first scan signal line G1, and is further configured to compensate the first node N1 in response to the signal of the first scan signal line G1.

The first light emitting control sub-circuit is connected with the first light emitting control signal line EM1, the first power supply line VDD, and the second node N2 respectively, and is configured to provide a signal of the first power supply line VDD to the second node N2 in response to a signal of the first light emitting control signal line EM1.

The second light emitting control sub-circuit is connected with the second light emitting control signal line EM2, the third node N3, and a fourth node respectively, and is configured to write the first reset signal of the fourth node N4 to the third node N3 in response to a signal of the second light emitting control signal line EM2, and is further configured to allow a drive current to flow between the third node N3 and the fourth node N4 in response to the signal of the second light emitting control signal line EM2.

In some exemplary implementations, when the second reset sub-circuit writes the second reset signal to the second node N2, the drive sub-circuit is further configured to write the second reset signal of the second node N2 to the third node N3 in response to a control signal of the first node N1.

In some exemplary implementations, as shown in FIG. 27 and FIG. 28, one terminal of the light emitting element is connected with the fourth node N4, and the other terminal of the light emitting element is connected with a second power supply line VSS.

Figure 29:
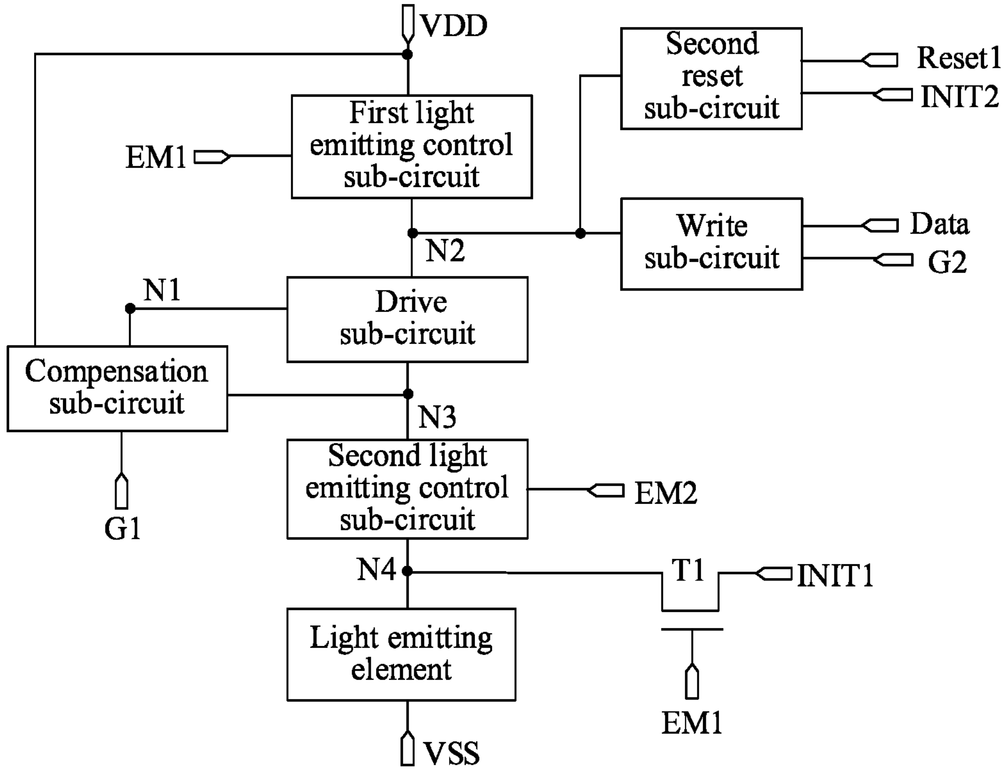
FIG. 29 is a schematic diagram of a structure of a first reset sub-circuit according to an embodiment of the present disclosure.

In some exemplary implementations, as shown in FIG. 29, a first reset sub-circuit includes a first transistor T1.

A control electrode of the first transistor T1 is connected with a first light emitting control signal line EM1 or a second reset control signal line Reset2 (not shown in the figure), a first electrode of the first transistor T1 is connected with a first reset signal line INIT1, and a second electrode of the first transistor T1 is connected with a fourth node N4.

FIG. 29 shows an exemplary structure of a first reset sub-circuit. Those of skills in the art can easily understand that an implementation of the first reset sub-circuit is not limited to this as long as a function thereof can be achieved.

Figure 30:
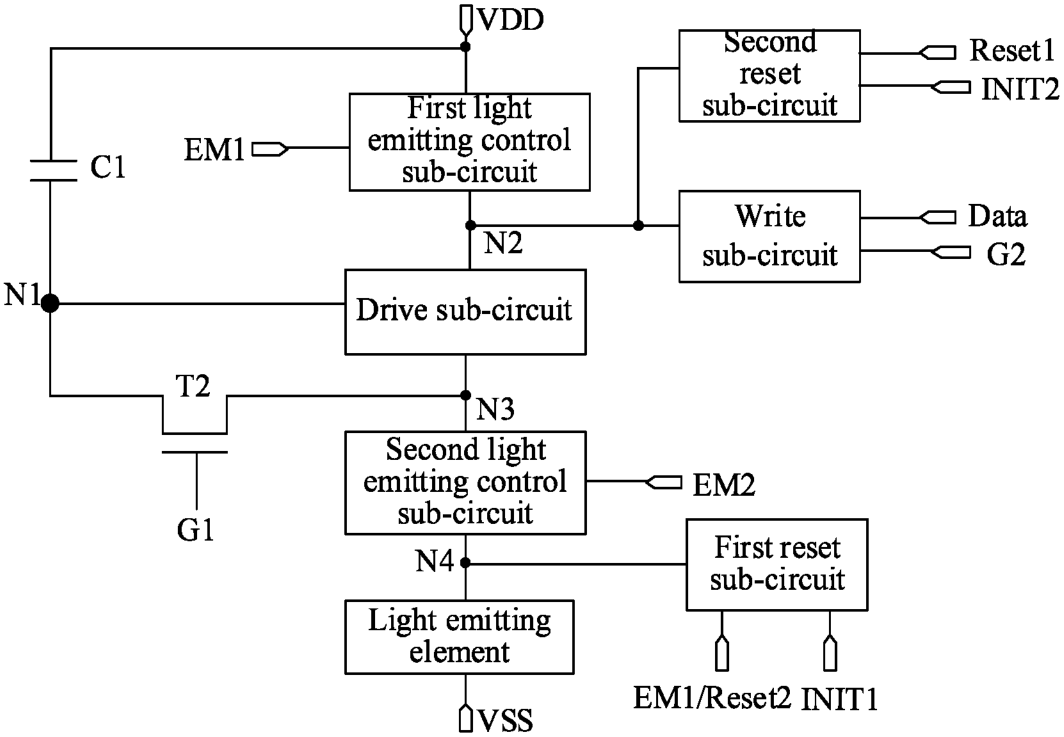
FIG. 30 is a schematic diagram of a structure of a compensation sub-circuit according to an embodiment of the present disclosure.

In some exemplary implementations, as shown in FIG. 30, a compensation sub-circuit includes a second transistor T2 and a first capacitor C1.

A control electrode of the second transistor T2 is connected with a first scan signal line G1, a first electrode of the second transistor T2 is connected with a third node N3, and a second electrode of the second transistor T2 is connected with a first node N1.

One terminal of the first capacitor C1 is connected with the first node N1, and the other terminal of the first capacitor C1 is connected with a first power supply line VDD.

FIG. 30 shows an exemplary structure of the compensation sub-circuit. Those of skills in the art can easily understand that an implementation of the compensation sub-circuit is not limited to this as long as a function thereof can be achieved.

Figure 31:
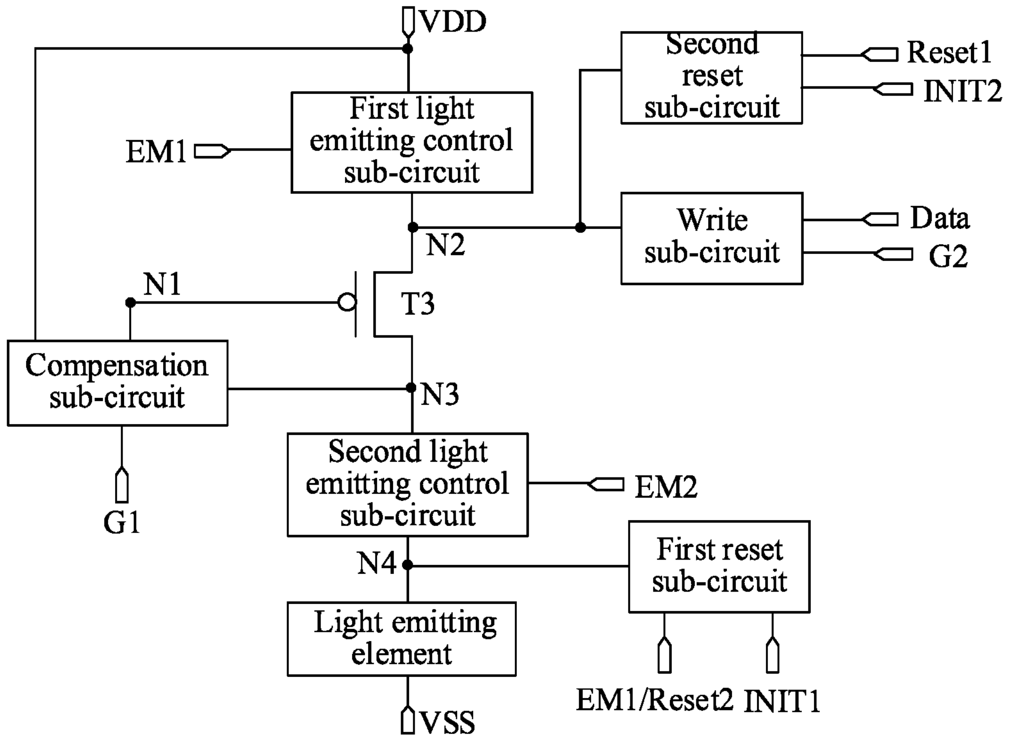
FIG. 31 is a schematic diagram of a structure of a drive sub-circuit according to an embodiment of the present disclosure.

In some exemplary implementations, as shown in FIG. 31, a drive sub-circuit includes a third transistor T3.

A control electrode of the third transistor T3 is connected with a first node N1, a first electrode of the third transistor T3 is connected with a second node N2, and a second electrode of the third transistor T3 is connected with a third node N3.

FIG. 31 shows an exemplary structure of the drive sub-circuit. Those of skills in the art can easily understand that an implementation of the drive sub-circuit is not limited to this as long as a function thereof can be achieved.

Figure 32:
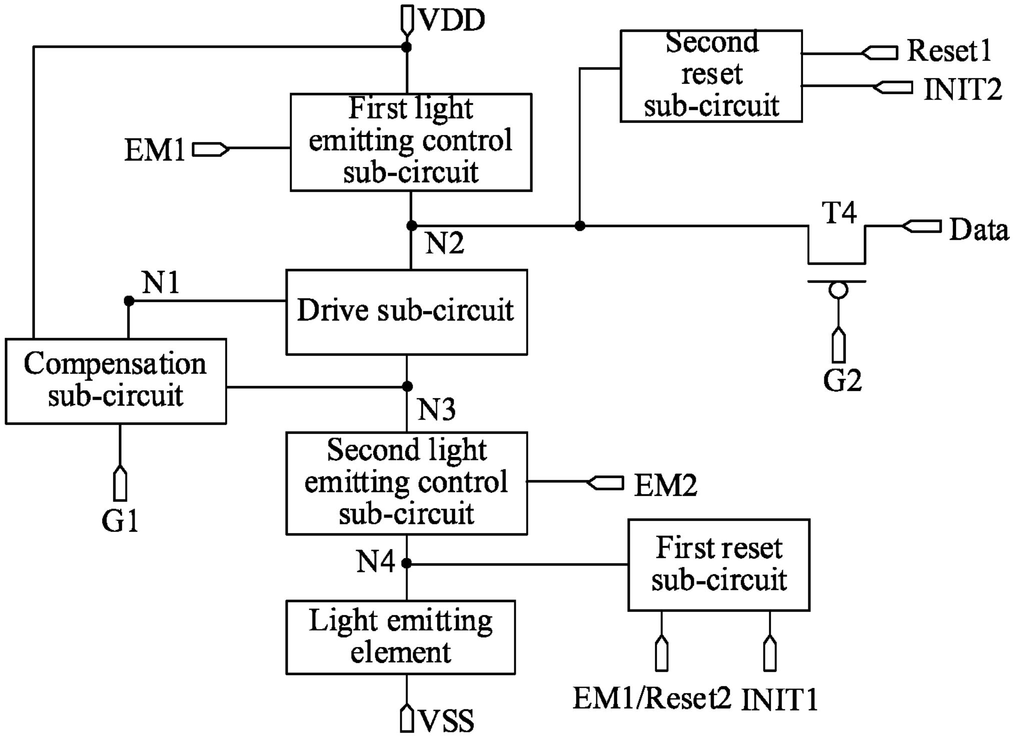
FIG. 32 is a schematic diagram of a structure of a write sub-circuit according to an embodiment of the present disclosure.

In some exemplary implementations, as shown in FIG. 32, a write sub-circuit includes a fourth transistor T4.

A control electrode of the fourth transistor T4 is connected with a second scan signal line G2, a first electrode of the fourth transistor T4 is connected with a data signal line Data, and a second electrode of the fourth transistor T4 is connected with a second node N2.

FIG. 32 shows an exemplary structure of the write sub-circuit. Those of skills in the art can easily understand that an implementation of the write sub-circuit is not limited to this as long as a function thereof can be achieved.

Figure 33:
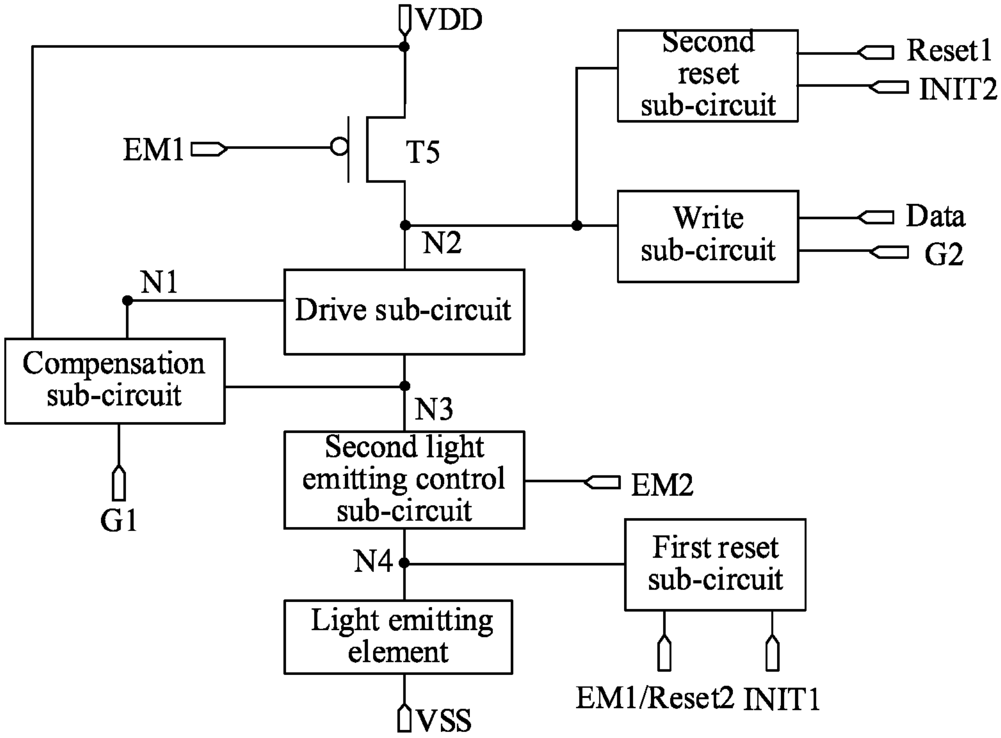
FIG. 33 is a schematic diagram of a structure of a first light emitting control sub-circuit according to an embodiment of the present disclosure.

In some exemplary implementations, as shown in FIG. 33, a first light emitting control sub-circuit includes a fifth transistor T5.

A control electrode of the fifth transistor T5 is connected with a first light emitting control signal line EM1, a first electrode of the fifth transistor T5 is connected with a first power supply line VDD, and a second electrode of the fifth transistor T5 is connected with a second node N2.

FIG. 33 shows an exemplary structure of the first light emitting control sub-circuit. Those of skills in the art can easily understand that an implementation of the first light emitting control sub-circuit is not limited to this as long as a function thereof can be achieved.

Figure 34:
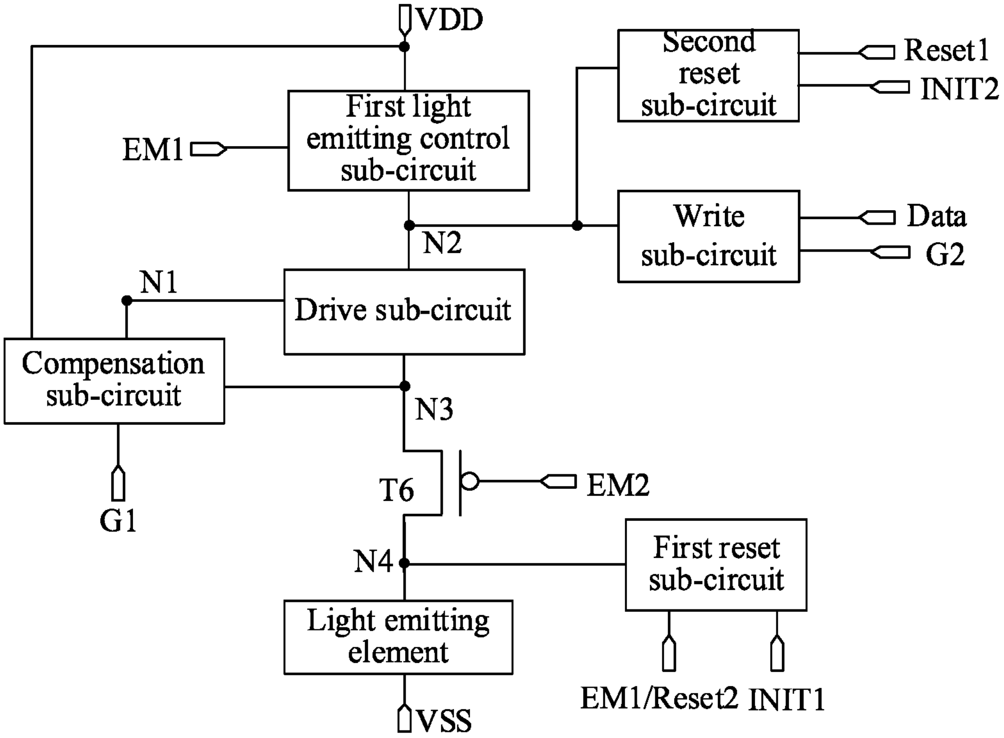
FIG. 34 is a schematic diagram of a structure of a second light emitting control sub-circuit according to an embodiment of the present disclosure.

In some exemplary implementations, as shown in FIG. 34, a second light emitting control sub-circuit includes a sixth transistor T6.

A control electrode of the sixth transistor T6 is connected with a second light emitting control signal line EM2, a first electrode of the sixth transistor T6 is connected with a third node N3, and a second electrode of the sixth transistor T6 is connected with a fourth node N4.

FIG. 34 shows an exemplary structure of the second light emitting control sub-circuit. Those of skills in the art can easily understand that an implementation of the second light emitting control sub-circuit is not limited to this as long as a function thereof can be achieved.

Figure 35:
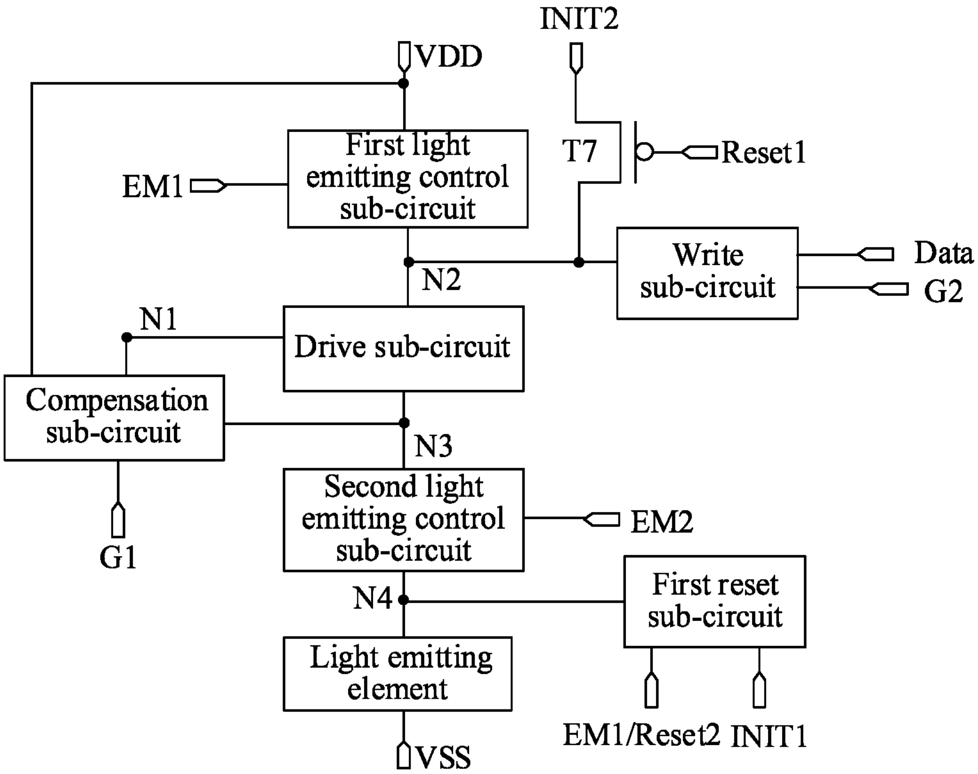
FIG. 35 is a first schematic diagram of a structure of a second reset sub-circuit according to an embodiment of the present disclosure.

In some exemplary implementations, as shown in FIG. 35, a second reset sub-circuit includes a seventh transistor T7.

A control electrode of the seventh transistor T7 is connected with a reset control signal line Reset, a first electrode of the seventh transistor T7 is connected with a second reset signal line INIT2, and a second electrode of the seventh transistor T7 is connected with a second node N2.

Figure 36:
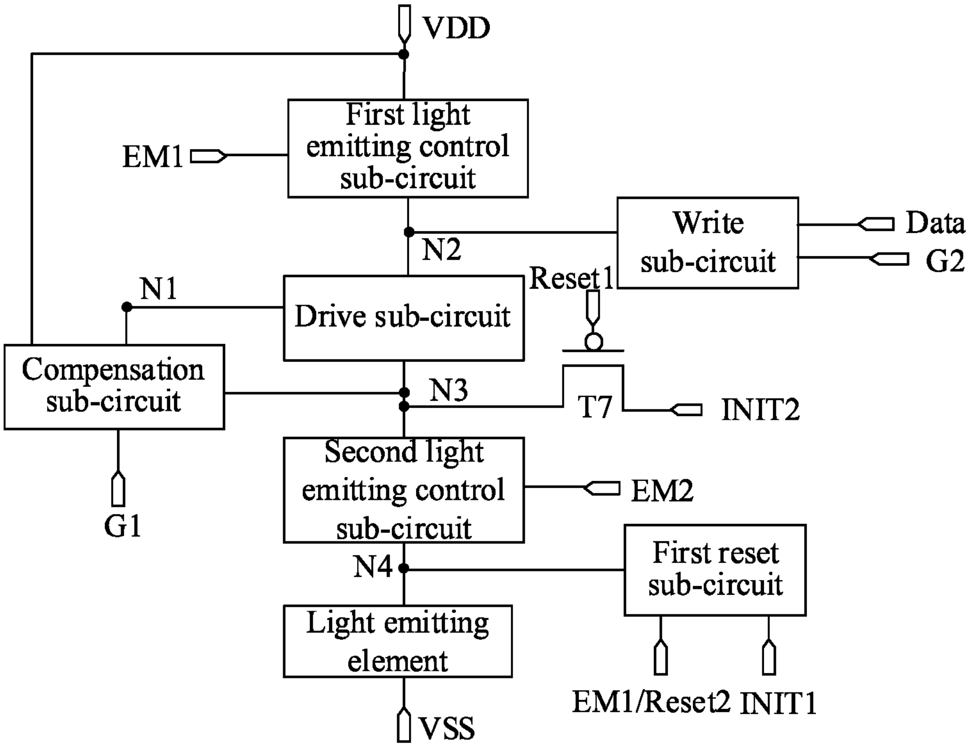
FIG. 36 is a second schematic diagram of a structure of a second reset sub-circuit according to an embodiment of the present disclosure.

In some exemplary implementations, as shown in FIG. 36, a second reset sub-circuit includes a seventh transistor T7.

A control electrode of the seventh transistor T7 is connected with a reset control signal line Reset, and a first electrode of the seventh transistor T7 is connected with a second reset signal line INIT2, and a second electrode of the seventh transistor T7 is connected with a third node N3.

FIG. 35 and FIG. 36 show two exemplary structures of a second reset sub-circuit. Those of skills in the art can easily understand that an implementation of the second reset sub-circuit is not limited to this as long as a function thereof can be achieved.

Figure 37A:
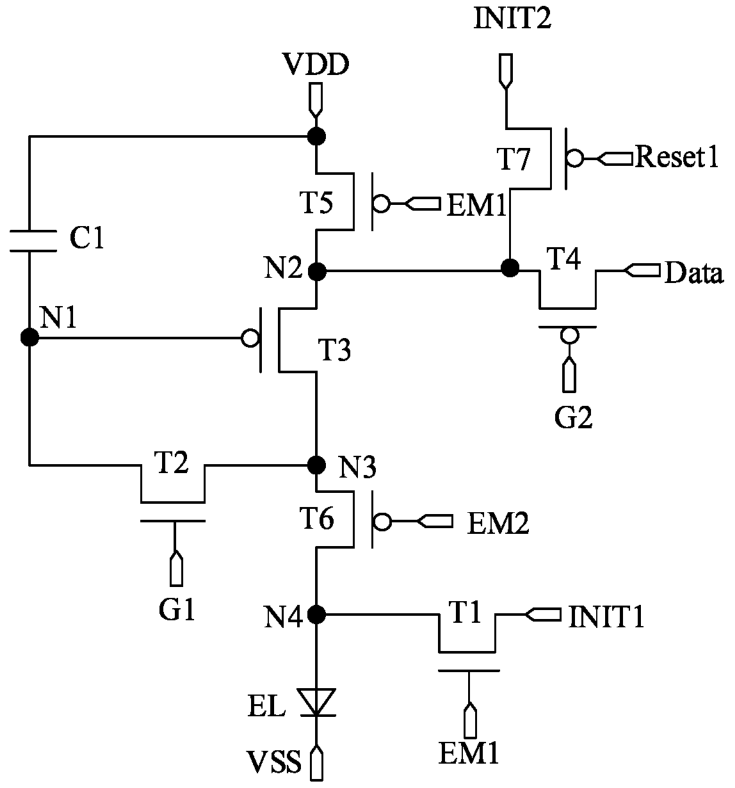
FIG. 37*a* is a first equivalent circuit diagram of a pixel circuit according to an embodiment of the present disclosure.
Figure 37B:
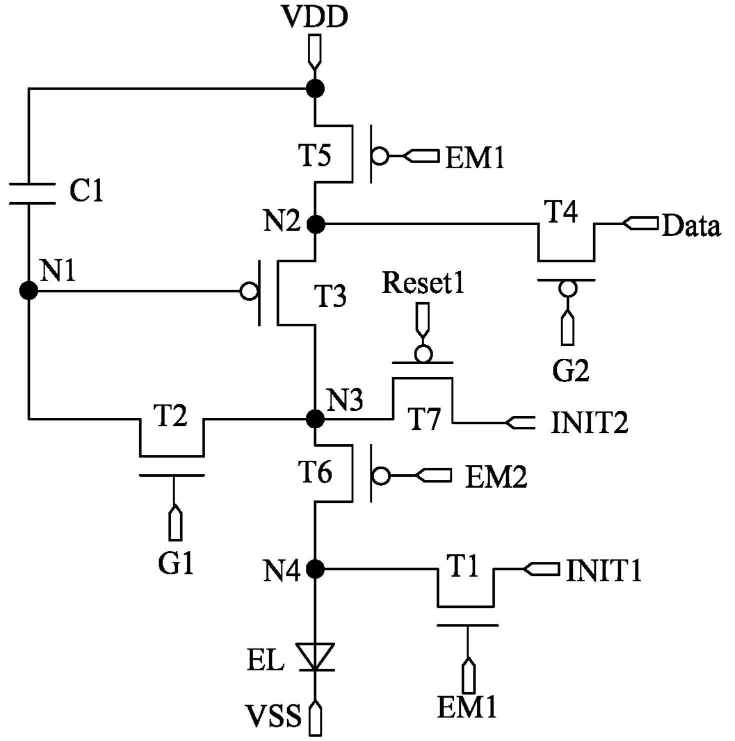
FIG. 37*b* is a second equivalent circuit diagram of a pixel circuit according to an embodiment of the present disclosure.

In some exemplary implementations, as shown in FIG. **37*a* or FIG. 37*b***, a first reset sub-circuit includes a first transistor T1, a compensation sub-circuit includes a second transistor T2 and a first capacitor C1, a drive sub-circuit includes a third transistor T3, a write sub-circuit includes a fourth transistor T4, a first light emitting control sub-circuit includes a fifth transistor T5, a second light emitting control sub-circuit includes a sixth transistor T6, and a second reset sub-circuit includes a seventh transistor T7.

A control electrode of the first transistor T1 is connected with a first light emitting control signal line EM1, a first electrode of the first transistor T1 is connected with a first reset signal line INIT1, and a second electrode of the first transistor T1 is connected with a fourth node N4.

A control electrode of the second transistor T2 is connected with a first scan signal line G1, a first electrode of the second transistor T2 is connected with a third node N3, and a second electrode of the second transistor T2 is connected with a first node N1.

One terminal of the first capacitor C1 is connected with the first node N1, and the other terminal of the first capacitor C1 is connected with a first power supply line VDD.

A control electrode of the third transistor T3 is connected with the first node N1, a first electrode of the third transistor T3 is connected with a second node N2, and a second electrode of the third transistor T3 is connected with the third node N3.

A control electrode of the fourth transistor T4 is connected with a second scan signal line G2, a first electrode of the fourth transistor T4 is connected with a data signal line Data, and a second electrode of the fourth transistor T4 is connected with the second node N2.

A control electrode of the fifth transistor T5 is connected with the first light emitting control signal line EM1, a first electrode of the fifth transistor T5 is connected with the first power supply line VDD, and a second electrode of the fifth transistor T5 is connected with the second node N2.

A control electrode of the sixth transistor T6 is connected with a second light emitting control signal line EM2, a first electrode of the sixth transistor T6 is connected with the third node N3, and a second electrode of the sixth transistor T6 is connected with the fourth node N4.

A control electrode of the seventh transistor T7 is connected with a first reset control signal line Reset1, a first electrode of the seventh transistor T7 is connected with a second reset signal line INIT2, and a second electrode of the seventh transistor T7 is connected with the second node N2 or the third node N3.

FIG. 37*a* and FIG. 37*b* show two exemplary structures of the first reset sub-circuit, the compensation sub-circuit, the drive sub-circuit, the write sub-circuit, the first light emitting control sub-circuit, the second light emitting control sub-circuit, and the second reset sub-circuit. Those of skills in the art can easily understand that an implementation of each of the above sub-circuits is not limited to this as long as functions thereof can be implemented. Since a quantity of transistors in the pixel circuit of the present disclosure is relatively small, the pixel circuit occupies less space, thereby improving a pixel resolution of a display apparatus.

In some exemplary implementations, the second reset signal line INIT2 may be a same voltage line as at least one of following: the first power supply line VDD, the first light emitting control signal line EM1, the second light emitting control signal line EM2, or a third power supply line. The third power supply line provides a third power supply voltage greater than a first reset voltage provided by the first reset signal line INIT1.

In some exemplary implementations, a pulse width of a signal of the reset control signal line Reset is substantially the same as a pulse width of a signal of the second scan signal line G2.

In some exemplary implementations, a signal pulse of the first light emitting control signal line EM1 differs from a signal pulse of the second light emitting control signal line EM2 by one or two time units h, one time unit h is scan time of one row of sub-pixels.

Figure 38A:
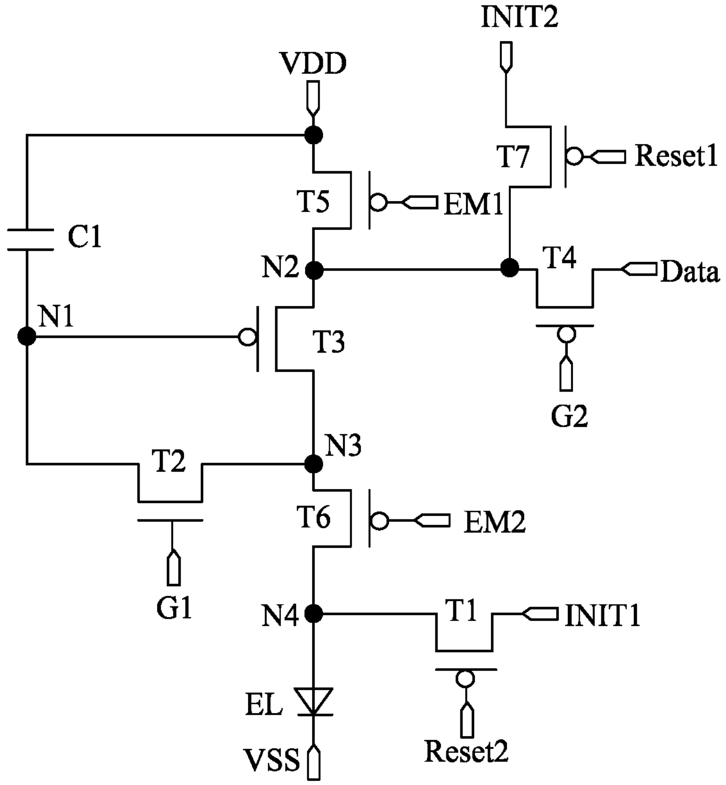
FIG. 38*a* is a third equivalent circuit diagram of a pixel circuit according to an embodiment of the present disclosure.
Figure 38B:
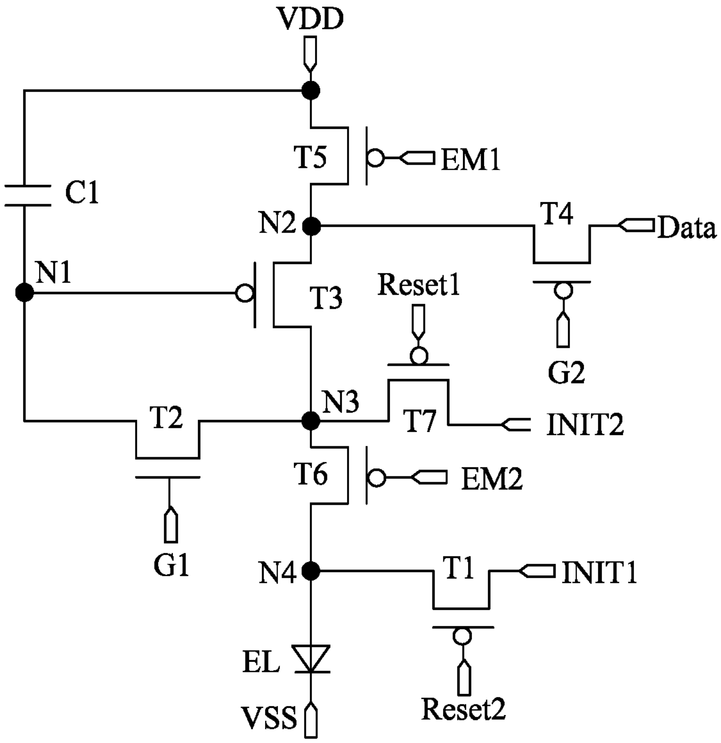
FIG. 38*b* is a fourth equivalent circuit diagram of a pixel circuit according to an embodiment of the present disclosure.

In some exemplary implementations, as shown in FIG. 38*a* and FIG. 38*b*, a first reset sub-circuit includes a first transistor T1, a compensation sub-circuit includes a second transistor T2 and a first capacitor C1, a drive sub-circuit includes a third transistor T3, a write sub-circuit includes a fourth transistor T4, a first light emitting control sub-circuit includes a fifth transistor T5, a second light emitting control sub-circuit includes a sixth transistor T6, and a second reset sub-circuit includes a seventh transistor T7.

A control electrode of the first transistor T1 is connected with a second reset control signal line Reset2, a first electrode of the first transistor T1 is connected with a first reset signal line INIT1, and a second electrode of the first transistor T1 is connected with a fourth node N4.

A control electrode of the second transistor T2 is connected with a first scan signal line G1, a first electrode of the second transistor T2 is connected with a third node N3, and a second electrode of the second transistor T2 is connected with a first node N1.

One terminal of the first capacitor C1 is connected with the first node N1, and the other terminal of the first capacitor C1 is connected with a first power supply line VDD.

A control electrode of the third transistor T3 is connected with the first node N1, a first electrode of the third transistor T3 is connected with a second node N2, and a second electrode of the third transistor T3 is connected with the third node N3.

A control electrode of the fourth transistor T4 is connected with a second scan signal line G2, a first electrode of the fourth transistor T4 is connected with a data signal line Data, and a second electrode of the fourth transistor T4 is connected with the second node N2.

A control electrode of the fifth transistor T5 is connected with a first light emitting control signal line EM1, a first electrode of the fifth transistor T5 is connected with the first power supply line VDD, and a second electrode of the fifth transistor T5 is connected with the second node N2.

A control electrode of the sixth transistor T6 is connected with a second light emitting control signal line EM2, a first electrode of the sixth transistor T6 is connected with the third node N3, and a second electrode of the sixth transistor T6 is connected with the fourth node N4.

A control electrode of the seventh transistor T7 is connected with a first reset control signal line Reset1, a first electrode of the seventh transistor T7 is connected with a second reset signal line INIT2, and a second electrode of the seventh transistor T7 is connected with the second node N2 or the third node N3.

FIG. 38*a* and FIG. 38*b* show two exemplary structures of the first reset sub-circuit, the compensation sub-circuit, the drive sub-circuit, the write sub-circuit, the first light emitting control sub-circuit, the second light emitting control sub-circuit, and the second reset sub-circuit.

Those of skills in the art can easily understand that an implementation of each of the above sub-circuits is not limited to this as long as functions thereof can be implemented.

In some exemplary implementations, a light emitting element EL may be an Organic Light Emitting Diode (OLED), or another type of light emitting diode such as a Mini Light Emitting Diode, a Micro Light Emitting Diode, and a Quantum dot Light Emitting Diode (QLED). In a practical application, a structure of the light emitting element EL needs to be designed and determined according to a practical application environment, and is not limited herein. Descriptions will be made below by taking a light emitting element EL being an organic light emitting diode as an example.

In some exemplary implementations, at least one of the first transistor T1, the second transistor T2, and the seventh transistor T7 is a first-type transistor. The first-type transistor includes an N-type transistor or a P-type transistor. The third transistor T3 to the sixth transistor T6 are all second-type transistors. A second-type transistor includes a P-type transistor or an N-type transistor, and a transistor type of the second-type transistor is different from that of the first-type transistor. That is, when the first-type transistor is an N-type transistor, the second-type transistor is a P-type transistor, and when the first-type transistor is a P-type transistor, the second-type transistor is an N-type transistor.

In some exemplary implementations, as shown in FIG. 37*a* and FIG. 37*b*, both the first transistor T1 and the second transistor T2 are N-type thin film transistors, and the third transistor T3 to the seventh transistor T7 are all P-type thin film transistors.

In some exemplary implementations, the first transistor T1, the second transistor T2, and the seventh transistor T7 are all N-type thin film transistors, and the third transistor T3 to the sixth transistor T6 are all P-type thin film transistors.

In some exemplary implementations, as shown in FIG. 38*a* and FIG. 38*b*, the second transistor T2 is an N-type thin film transistor, and the first transistor T1 and the third transistor T3 to the seventh transistor T7 are all P-type thin film transistors.

In an exemplary embodiment, the N-type thin film transistor may be a Low Temperature Poly Silicon (LTPS) Thin Film Transistor (TFT), and the P-type thin film transistor may be an Indium Gallium Zinc Oxide (IGZO) thin film transistor. Or, the N-type thin film transistor may be an IGZO thin film transistor, and the P-type thin film transistor may be an LTPS thin film transistor.

In some exemplary implementations, both the first transistor T1 and the second transistor T2 are IGZO thin film transistors, and the third transistor T3 to the seventh transistor T7 are all LTPS thin film transistors.

In the embodiment, compared with a low temperature poly silicon thin film transistor, an indium gallium zinc oxide thin film transistor produces less leakage current. Therefore, the first transistor T1 and the second transistor T2 are set as indium gallium zinc oxide thin film transistors, so that a leakage current of a control electrode of a drive transistor in a light emitting phase may be significantly reduced, thereby improving problems of a low frequency, a low brightness, and flicker of a display panel.

In some exemplary implementations, the first transistor T1, the second transistor T2, and the seventh transistor T7 are all IGZO thin film transistors, and the third transistor T3 to the sixth transistor T6 are all LTPS thin film transistors.

In some exemplary implementations, the second transistor T2 is an IGZO thin film transistor, and the first transistor T1 and the third transistor T3 to the seventh transistor T7 are all LTPS thin film transistors. In some exemplary implementations, the first capacitor C1 may be a liquid crystal capacitor composed of a pixel electrode and a common electrode, or may be liquid crystal capacitor composed of a pixel electrode and a common electrode and an equivalent capacitor composed of a storage capacitor, and the present disclosure is not limited to this.

Figure 39:
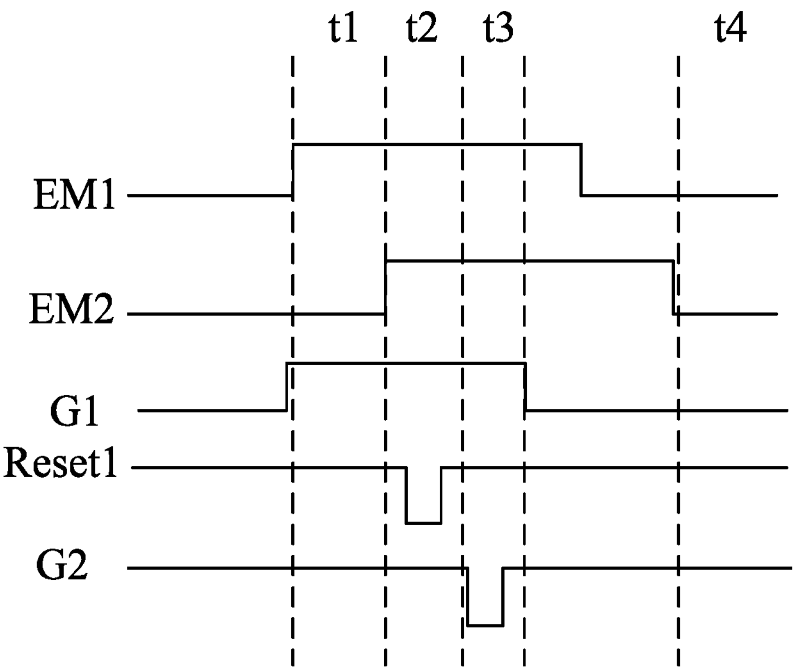
FIG. 39 is a working timing diagram of the pixel circuit shown in FIG. 37*a* or FIG. 37*b* in a scan period.

FIG. 39 is a working timing diagram of the pixel circuit shown in FIG. 37*a* or FIG. 37*b* in a scan period. A working process of a pixel circuit in a period of a frame will be described below in combination with the pixel circuit shown in FIG. 37*a* and the working timing diagram shown in FIG. 39 by taking the first transistor T1 and the second transistor T2 being N-type transistors, and the third transistor T3 to the seventh transistor T7 all being P-type transistors in the pixel circuit provided by the embodiment of the present disclosure as an example. As shown in FIG. 37*a*, the pixel circuit provided by the embodiment of the present disclosure includes seven transistor units (T1 to T7), one capacitor unit (C1), and three voltage lines (VDD, VSS, INIT1, since the second reset signal line INIT2 may be a same voltage line as any one of the first power supply line VDD, the first light emitting control signal line EM1, and the second light emitting control signal line EM2, the second reset signal line INIT2 is not contained in the above three voltage lines). The first power supply line VDD continuously provides a high-level signal, the second power supply line VSS continuously provides a low-level signal, and the first reset signal line INIT1 provides a first reset voltage (an initial voltage signal). As shown in FIG. 39, the working process may include following contents.

Figure 41:
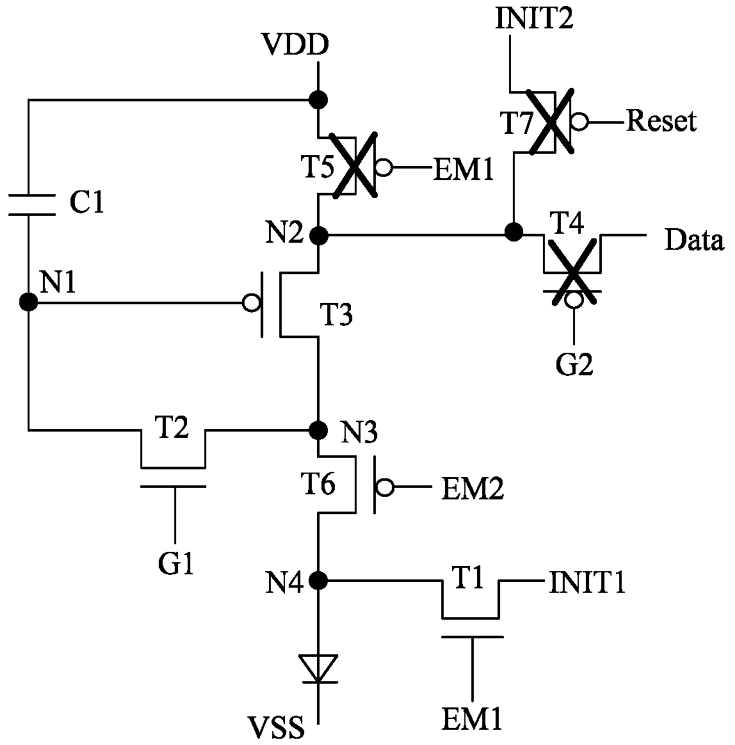
FIG. 41 is a schematic diagram of a working state of transistors of the pixel circuit shown in FIG. 37*a* in a reset phase.

In a first phase t1, that is, a reset phase, the first scan signal line G1, the second scan signal line G2, the first reset control signal line Reset1, and the first light emitting control signal line EM1 are at a high level, and the second light emitting control signal line EM2 is at a low level. The first light emitting control signal line EM1 is at a high level, so that the first transistor T1 is turned on, and the fourth node N4 (i.e., an anode terminal of a light emitting element EL) is reset to a first reset voltage of the first reset signal line INIT1. The second light emitting control signal line EM2 is at a low level, so that the sixth transistor T6 is turned on. The first scan signal line G1 is at a high level, so that the second transistor T2 is turned on, and the first node N1 (i.e., a gate of the third transistor T3 and one terminal of the first capacitor C1) and the third node N3 are reset to the first reset voltage of the first reset signal line INIT1. In this phase, the fourth transistor T4, the fifth transistor T5, and the seventh transistor T7 remain off, as shown in FIG. 41.

Figure 42:
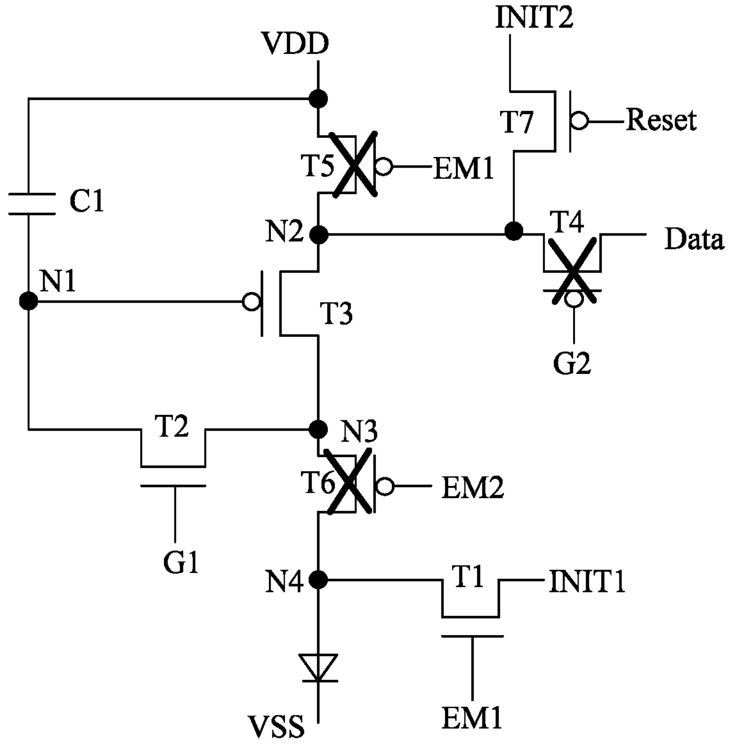
FIG. 42 is a schematic diagram of a working state of transistors of the pixel circuit shown in FIG. 37*a* in a reposition phase.

In a second phase t2, that is, a reposition phase, the first scan signal line G1, the second scan signal line G2, the first light emitting control signal line EM1, and the second light emitting control signal line EM2 are at a high level, and the first reset control signal line Reset1 is at a low level. The second light emitting control signal line EM2 is at a high level, so that the sixth transistor T6 is turned off. The first reset control signal line Reset1 is at a low level, so that the seventh transistor T7 is turned on (this timing is explained by taking the seventh transistor T7 being a P-type thin film transistor as an example, and when the seventh transistor T7 is an N-type thin film transistor, the first reset control signal line Reset1 provides a high-level signal in the second phase t2 and provides a low-level signal in other phases), the second node N2 is reset to a second reset voltage, and the second reset voltage may be a voltage signal provided by the first power supply line VDD, the first light emitting control signal line EM1, the second light emitting control signal line EM2 or a third power supply line. The second reset voltage is greater than the first reset voltage. Since the first node N1 is at the first reset voltage of the first reset signal line INIT1, the third transistor T3 is turned on, the first scan signal line G1 is at a high level, the second transistor T2 is turned on, and a voltage at the second node N2 is transmitted to the first node N1 through the third transistor T3 and the second transistor T2. In this phase, the fourth transistor T4, the fifth transistor T5, and the sixth transistor T6 remain off, as shown in FIG. 42.

Figure 43:
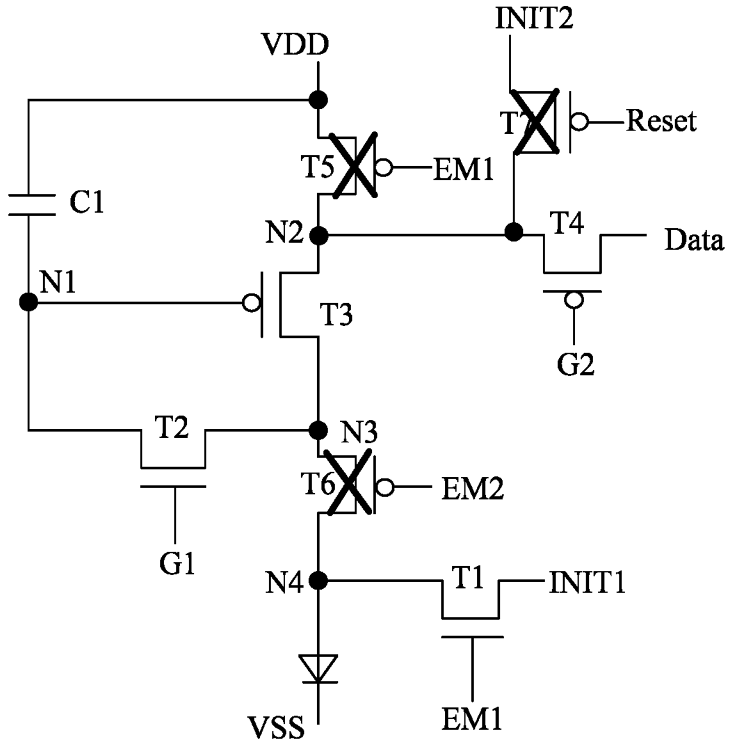
FIG. 43 is a schematic diagram of a working state of transistors of the pixel circuit shown in FIG. 37*a* in a data write phase.

In a third phase t3, that is, a data write phase, the first scan signal line G1, the first reset control signal line Reset1, the first light emitting control signal line EM1, and the second light emitting control signal line EM2 are at a high level, and the second scan signal line G2 is at a low level. At this time, the second scan signal line G2 is at a low level, so that the fourth transistor T4 is turned on, a data voltage signal Vdata output from the data signal line Data is provided to the first node N1 through the fourth transistor T4, the third transistor T3, and the second transistor T2 which are turned on, and a sum of the data voltage signal Vdata output from the data signal line Data and a threshold voltage Vth of the third transistor T3 is stored in the first capacitor C1. In this phase, the fifth transistor T5, the sixth transistor T6, and the seventh transistor T7 remain off, as shown in FIG. 43.

Figure 44:
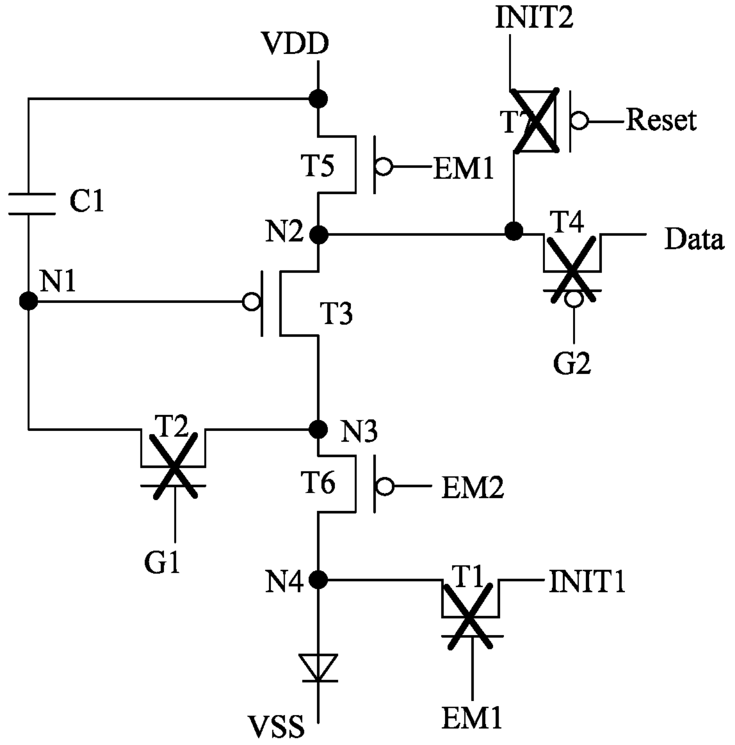
FIG. 44 is a schematic diagram of a working state of transistors of the pixel circuit shown in FIG. 37*a* in a light emitting phase.

In a fourth phase t4, that is, a light emitting phase, the second scan signal line G2 and the first reset control signal line Reset1 are at a high level, and the first scan signal line G1, the first light emitting control signal line EM1, and the second light emitting control signal line EM2 are at a low level. The first light emitting control signal line EM1 is at a low level, so that the fifth transistor T5 is turned on and the first transistor T1 is turned off, the second light emitting control signal line EM2 is at a low level, so that the sixth transistor T6 is turned on, and a power supply voltage output from the first power supply terminal VDD provides a drive voltage to the fourth node N4 (i.e., the anode terminal of the light emitting element EL) through the fifth transistor T5, the third transistor T3, and the sixth transistor T6 which are turned on, to drive the light emitting element EL to emit light. In this phase, the first transistor T1, the second transistor T2, the fourth transistor T4, and the seventh transistor T7 remain off, as shown in FIG. 44.

Figure 40:
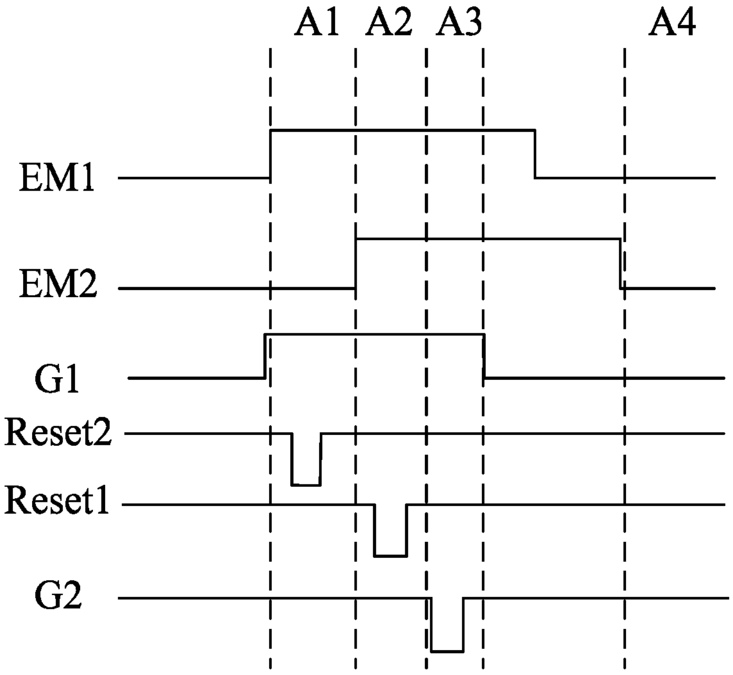
FIG. 40 is a working timing diagram of the pixel circuit shown in FIG. 38*a* or FIG. 38*b* in a scan period.

FIG. 40 is a working timing diagram of the pixel circuit shown in FIG. 38*a* or FIG. 38*b* in a scan period. A working process of a pixel circuit in a period of a frame will be described below in combination with the pixel circuit shown in FIG. 38*a* and the working timing diagram shown in FIG. 40 by taking the first transistor T2 being an N-type transistor, and the first transistor T1 and the third transistor T3 to the seventh transistor T7 being P-type transistors in the pixel circuit provided by the embodiment of the present disclosure as an example. As shown in FIG. 38*a*, the pixel circuit provided by the embodiment of the present disclosure includes seven transistor units (T1 to T7), one capacitor unit (C1), and three voltage lines (VDD, VSS, INIT1, since the second reset signal line INIT2 may be a same voltage line as any one of the first power supply line VDD, the first light emitting control signal line EM1, and the second light emitting control signal line EM2, the second reset signal line INIT2 is not contained in the above three voltage lines). The first power supply line VDD continuously provides a high-level signal, the second power supply line VSS continuously provides a low-level signal, and the first reset signal line INIT1 provides a first reset voltage (an initial voltage signal). As shown in FIG. 40, the working process may include following contents.

In a first phase A1, that is, a reset phase, the first scan signal line G1, the second scan signal line G2, the first reset control signal line Reset1, and the first light emitting control signal line EM1 are at a high level, and the second reset control signal line Reset2 and the second light emitting control signal line EM2 are at a low level. The first transistor T1, the sixth transistor T6, and the second transistor T2 are turned on, and the fourth node N4 (i.e., an anode terminal of the light emitting element EL), the third node N3, and the first node N1 (i.e., a gate of the third transistor T3 and one terminal of the first capacitor C1) are reset to a first reset voltage of the first reset signal line INIT1. In this phase, the fourth transistor T4, the fifth transistor T5, and the seventh transistor T7 remain off.

In a second phase A2, that is, a reposition phase, the first scan signal line G1, the second scan signal line G2, the second reset control signal line Reset2, the first light emitting control signal line EM1, and the second light emitting control signal line EM2 are at a high level, and the first reset control signal line Reset1 is at a low level. The second light emitting control signal line EM2 is at a high level, so that the sixth transistor T6 is turned off. The first reset control signal line Reset1 is at a low level, so that the seventh transistor T7 is turned on (this timing is explained by taking the seventh transistor T7 being a P-type thin film transistor as an example, and when the seventh transistor T7 is an N-type thin film transistor, the first reset control signal line Reset1 provides a high-level signal in the second phase A2 and provides a low-level signal in other phases), and the second node N2 is reset to a second reset voltage, wherein the second reset voltage may be a voltage signal provided by the first power supply line VDD, the first light emitting control signal line EM1, the second light emitting control signal line EM2, or a third power supply line, the second reset voltage is greater than the first reset voltage. Since the first node N1 is the first reset voltage of the first reset signal line INIT1, the third transistor T3 is turned on, the first scan signal line G1 is at a high level, the second transistor T2 is turned on, and a voltage at the second node N2 is transmitted to the first node N1 through the third transistor T3 and the second transistor T2. In this phase, the fourth transistor T4, the fifth transistor T5, and the sixth transistor T6 remain off.

In a third phase A3, that is, a data write phase, the first scan signal line G1, the second reset control signal line Reset2, the first reset control signal line Reset1, the first light emitting control signal line EM1, and the second light emitting control signal line EM2 are at a high level, and the second scan signal line G2 is at a low level. At this time, the second scan signal line G2 is at a low level, so that the fourth transistor T4 is turned on, a data voltage signal Vdata output by the data signal line Data is provided to the first node N1 through the fourth transistor T4, the third transistor T3, and the second transistor T2 which are turned on, and a sum of the data voltage signal Vdata output by the data signal line Data and a threshold voltage Vth of the third transistor T3 is stored in the first capacitor C1. In this phase, the fifth transistor T5, the sixth transistor T6, and the seventh transistor T7 remain off.

In a fourth phase A4, that is, a light emitting phase, the second scan signal line G2, the second reset control signal line Reset2, and the first reset control signal line Reset1 are at a high level, and the first scan signal line G1, the first light emitting control signal line EM1, and the second light emitting control signal line EM2 are at a low level. The first light emitting control signal line EM1 is at a low level, so that the fifth transistor T5 is turned on, and the second reset control signal line Reset2 is at a high level, so that the first transistor is turned off. The second light emitting control signal line EM2 is at a low level, so that the sixth transistor T6 is turned on. A power supply voltage output by the first power supply line VDD provides a drive voltage to the fourth node N4 (i.e., an anode terminal of the light emitting element EL) through the fifth transistor T5, the third transistor T3, and the sixth transistor T6 which are turned on, to drive the light emitting element EL to emit light. In this phase, the first transistor T1, the second transistor T2, the fourth transistor T4, and the seventh transistor T7 remain off.

In the driving process of the pixel circuit, a drive current flowing through the third transistor T3 (i.e., a drive transistor) is determined by a voltage difference between a gate electrode and a first electrode of the third transistor T3. Since a voltage at the first node N1 is Vdata+Vth, the drive current of the third transistor T3 is as follows.

$$I=K^*(Vgs-Vth)^2=K^*[(V\text{data}+Vth-Vdd)-Vth]^2=K^*[(V\text{data}-Vdd)]^2$$

I is the drive current flowing through the third transistor T3, i.e., a drive current for driving the light emitting element EL, K is a constant, Vgs is the voltage difference between the gate electrode and the first electrode of the third transistor T3, Vth is a threshold voltage of the third transistor T3, Vdata is a data voltage output by the data signal line Data, and Vdd is a power voltage output by the first power supply terminal VDD.

It may be seen from the above formula that a current I flowing through the light emitting element EL is unrelated to the threshold voltage Vth of the third transistor T3, so that an influence of the threshold voltage Vth of the third transistor T3 on the current I is eliminated, and uniformity of brightness is ensured.

Due to long response time of a pixel circuit with an LTPS transistor+an oxide transistor (LTPO), picture brightness flashes when switching at a low frequency. In the pixel circuit of the embodiment of the present disclosure, hysteresis is improved by adding a large bias voltage to the third transistor T3 (drive transistor) in the reposition phase of the drive transistor, so that the picture brightness can be maintained when switching between high and low frequencies, and a risk of flicker is reduced.

In a column of sub-pixels, for at least two adjacent sub-pixels, a second light emitting control signal line EM2 in a previous row of sub-pixels is electrically connected with a first light emitting control signal line EM1 in a next row of sub-pixels, and a second scan signal line G2 in the previous row of sub-pixels is electrically connected with a first reset control signal line Reset1 in the next row of sub-pixels.

Figure 45:
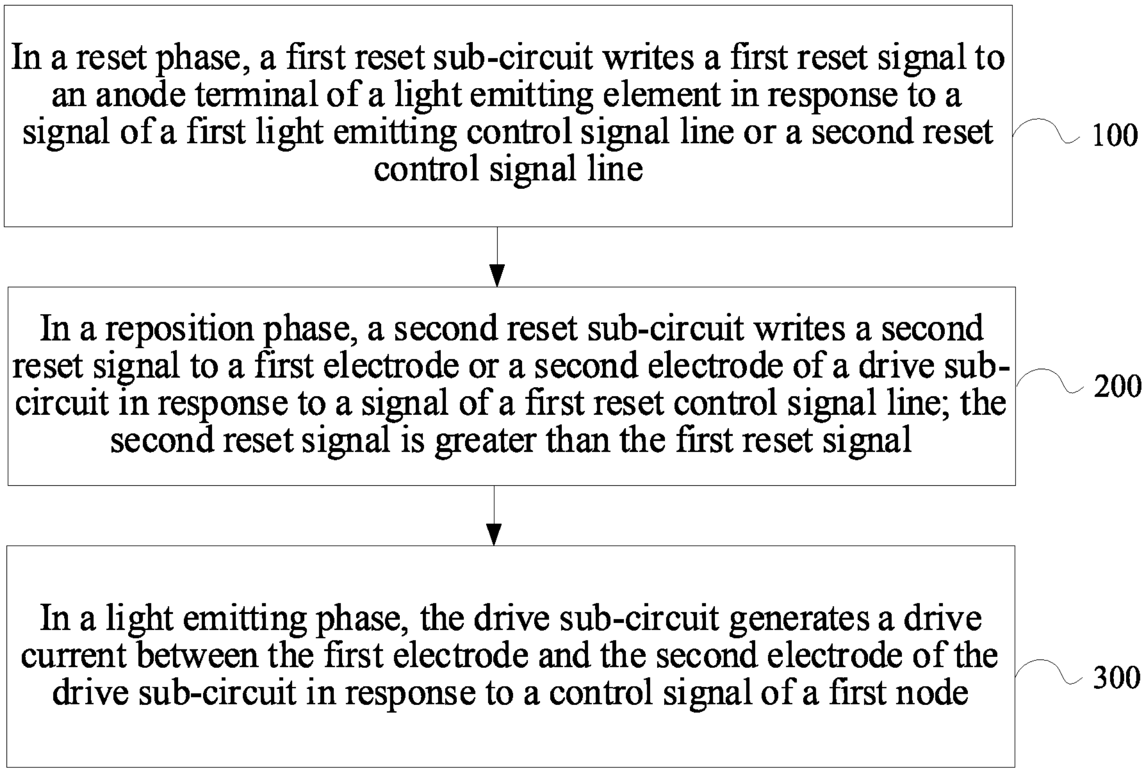
FIG. 45 is a schematic flowchart of a driving method of a pixel circuit according to an embodiment of the present disclosure.

An embodiment of the present disclosure also provides a driving method of a pixel circuit, for driving the pixel circuit as described above, the pixel circuit has multiple scan periods, and in a scan period, as shown in FIG. 45, the driving method includes an act 100 to an act 400.

The act 100 includes: in a reset phase, a first reset sub-circuit writes a first reset signal to an anode terminal (i.e., a fourth node) of a light emitting element in response to a signal of a first light emitting control signal line or a second reset control signal line.

In some exemplary implementations, the act 100 further includes: a second light emitting control sub-circuit writes the first reset signal at the fourth node to a third node in response to a signal of a second light emitting control signal line; a compensation sub-circuit writes the first reset signal at the third node to a first node in response to a signal of a first scan signal line.

The act 200 includes: in a reposition phase, a second reset sub-circuit writes a second reset signal to a first electrode (i.e., a second node) or a second electrode (i.e., the third node) of a drive sub-circuit in response to a signal of a first reset control signal line; the second reset signal is greater than the first reset signal.

In some exemplary implementations, the act 100 further includes: the compensation sub-circuit writes the second reset signal at the third node to the first node in response to the signal of the first scan signal line.

In some exemplary implementations, the second reset signal may be a signal derived from at least one of a first power supply line, the first light emitting control signal line, the second light emitting control signal line, or a third power supply line.

The act 300 includes: in a light emitting phase, the drive sub-circuit generates a drive current between the second node and the third node in response to a control signal of the first node.

In some exemplary implementations, prior to the act 300, the method further includes: in a data write phase, a write sub-circuit writes a data signal to the second node in response to a signal of a second scan signal line; and the compensation sub-circuit compensates the first node in response to a signal of the first scan signal line.

In some exemplary implementations, the act 300 further includes: in the light emitting phase, a first light emitting control sub-circuit provides a signal of the first power supply line to the second node in response to a signal of the first light emitting control signal line; and a second light emitting control sub-circuit allows the drive current to flow between the third node and the fourth node in response to a signal of the second light emitting control signal line.

According to the pixel circuit, the driving method therefor, and the display apparatus of the embodiments of the present disclosure, the second reset sub-circuit writes the second reset signal to the first electrode or the second electrode of the drive sub-circuit in response to the signal of the first reset control signal line, a large bias voltage is added to the drive sub-circuit to improve hysteresis, so that picture brightness can be maintained when switching between high and low frequencies, and a risk of flicker is reduced, and a display effect of the display apparatus under high and low gray scales is improved. In addition, since a quantity of transistors in the pixel circuit of the present disclosure is relatively small, the pixel circuit occupies less space, thereby improving a pixel resolution of the display apparatus.

Following points need to be noted.

The drawings of the embodiments of the present disclosure only involve structures involved in the embodiments of the present disclosure, and other structures may refer to conventional designs.

The embodiments of the present disclosure and features in the embodiments may be combined mutually to obtain new embodiments if there is no conflict.

As shown in FIG. 46 to FIG. 60, FIG. 46 to FIG. 60 are illustrative drawings of pixel drive circuits according to another set of exemplary embodiments of the present disclosure.

Transistors used in all embodiments of the present disclosure may be triodes, thin film transistors, field effect transistors, or other devices with same characteristics. In an embodiment of the present disclosure, in order to distinguish two electrodes of a transistor except a control electrode, one electrode of the two electrodes is referred to as a first electrode, and the other electrode is referred to as a second electrode.

In actual operation, when the transistor is a thin film transistor or a field effect transistor, the first electrode may be a drain and the second electrode may be a source. Or, the first electrode may be a source and the second electrode may be a drain.

Figure 46:
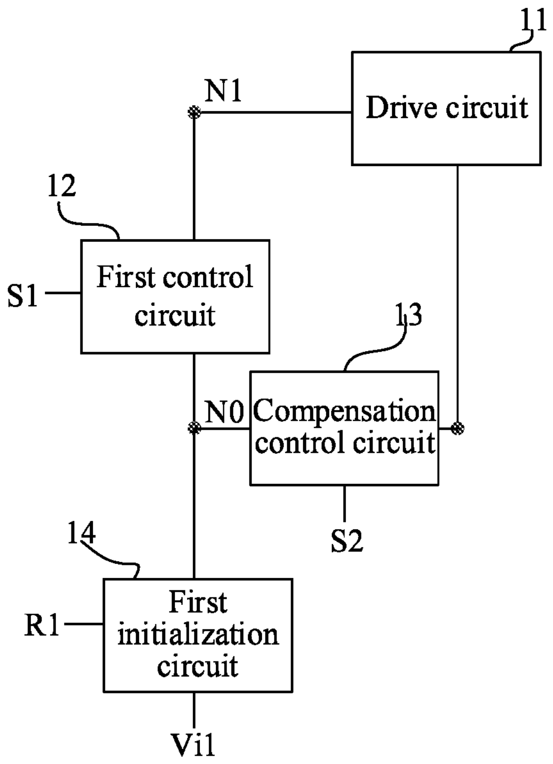
FIG. 46 is a schematic diagram of a structure of a pixel circuit according to at least one embodiment of the present disclosure.

As shown in FIG. 46, a pixel circuit described in an embodiment of the present disclosure includes a drive circuit 11, a first control circuit 12, a compensation control circuit 13, and a first initialization circuit 14.

The first control circuit 12 is electrically connected with a first scan line S1, a control terminal of the drive circuit 11, and a connection node NO respectively, and configured to control communication between the control terminal of the drive circuit 11 and the connection node NO under control of a first scan signal provided by the first scan line S1.

The compensation control circuit 13 is electrically connected with a second scan line S2, the connection node NO, and a first terminal of the drive circuit 11 respectively, and configured to control communication between the connection node NO and the first terminal of the drive circuit 11 under control of a second scan signal provided by the second scan line S2.

The first initialization circuit 14 is electrically connected with an initialization control line R1, a first initialization voltage line, and the connection node NO respectively, and configured to write a first initialization voltage Vi1 provided by the first initialization voltage line to the connection node NO under control of an initialization control signal provided by the initialization control line R1.

The drive circuit 11 is configured to control communication between the first terminal of the drive circuit 11 and a second terminal of the drive circuit 11 under control of a potential of the control terminal of the drive circuit 11.

In at least one embodiment shown in FIG. 46, a first node N1 is a node connected with the control terminal of the drive circuit 11.

In the pixel circuit described in the embodiment of the present disclosure, the first control circuit 12 is electrically connected directly with the first node N1, and neither the first initialization circuit 14 nor the compensation control circuit 13 is directly electrically connected with the first node N1, so as to reduce a leakage path of the first node N1, and ensure stability of a voltage at the first node when working at a low frequency, which is beneficial to improve display quality, improve display uniformity, and reduce flicker.

When the pixel circuit of the embodiment of the present disclosure as shown in FIG. 46 is working, a display period includes an initialization phase and a data write phase. The driving method includes following contents.

In the initialization phase, the first control circuit 12 controls communication between the control terminal of the drive circuit 11 and the connection node NO under control of the first scan signal. The first initialization circuit 14 writes the first initialization voltage Vi1 to the connection node NO under control of the initialization control signal, so as to write the first initialization voltage Vi1 to the control terminal of the drive circuit 11, so that the drive circuit 11 can control communication between the first terminal and the second terminal of the drive circuit at beginning of the data write phase.

In the data write phase, the first control circuit 12 controls the communication between the control terminal of the drive circuit 11 and the connection node NO under control of the first scan signal. The compensation control circuit 13 controls communication between the connection node NO and the first terminal of the drive circuit 11 under control of the second scan signal, so that the control terminal of the drive circuit 11 communicates with the first terminal of the drive circuit 11.

Optionally, the first control circuit includes a first transistor.

A control electrode of the first transistor is electrically connected with the first scan line, a first electrode of the first transistor is electrically connected with the control terminal of the drive circuit, and a second electrode of the first transistor is electrically connected with the connection node.

The first transistor is an oxide thin film transistor.

In at least one embodiment of the present disclosure, the first transistor included in the control circuit is an oxide thin film transistor.

An oxide transistor has good hysteresis characteristics, a low leakage current, and a low mobility. Therefore, according to at least one embodiment of the present disclosure, a first transistor is set as an oxide thin film transistor to achieve a low leakage current and ensure stability of a potential of a control terminal of a drive circuit.

Optionally, the compensation control circuit includes a second transistor.

A control electrode of the second transistor is electrically connected with the second scan line, a first electrode of the second transistor is electrically connected with the connection node, and a second electrode of the second transistor is electrically connected with the first terminal of the drive circuit.

In at least one embodiment of the present disclosure, the second transistor may be a low temperature poly silicon thin film transistor, but not limited to this. In specific implementation, the second transistor may also be another type of transistor.

Optionally, the first initialization circuit includes a third transistor.

A control electrode of the third transistor is electrically connected with the initialization control line, a first electrode of the third transistor is electrically connected with the first initialization voltage line, and a second electrode of the third transistor is electrically connected with the connection node.

In at least one embodiment of the present disclosure, the third transistor is a low temperature poly silicon thin film transistor. In specific implementation, the third transistor may also be another type of transistor.

Figure 47:
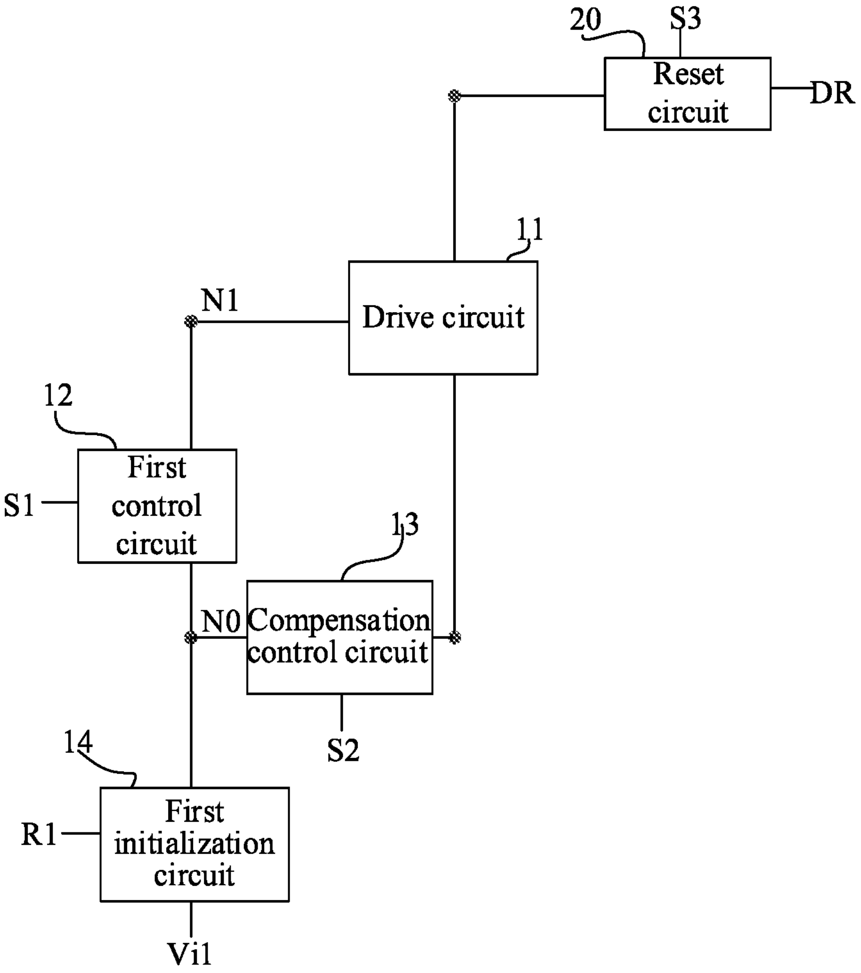
FIG. 47 is a schematic diagram of a structure of a pixel circuit according to at least another embodiment of the present disclosure.

As shown in FIG. 47, on a basis of the pixel circuit shown in FIG. 46, the pixel circuit described in at least one embodiment of the present disclosure may further include a reset circuit 20.

The reset circuit 20 is electrically connected with a third scan line S3, a reset voltage line DR, and the second terminal of the drive circuit 11 respectively, and configured to write a reset voltage provided by the reset voltage line DR to the second terminal of the drive circuit 11 under control of a third scan signal provided by the third scan line S3.

The pixel circuit according to at least one embodiment of the present disclosure as shown in FIG. 47 is additionally provided with the reset circuit 20. The reset circuit 20 writes the reset voltage to the second terminal of the drive circuit 11 under control of the third scan signal in a non-light-emitting period before a data voltage is written to the second terminal of the drive circuit 11, to provide a bias voltage to a drive transistor in the drive circuit 11 (at this time, a potential of a gate of the drive transistor is also initialized to Vi1), so that the drive transistor remains in a reset state to improve hysteresis of the drive transistor and facilitate First Frame Response time (FFR) of a display screen.

In specific implementation, the hysteresis of the drive transistor will cause a characteristic response of the drive transistor to be slow, and according to at least one embodiment of the present disclosure, a gate-source voltage of the drive transistor is quickly reset before the data voltage is written, which is beneficial to speed up a recovery speed of the drive transistor, thereby improving a hysteresis phenomenon of the drive transistor and improving a hysteresis recovery speed.

When the pixel circuit according to at least one embodiment of the present disclosure as shown in FIG. 47 is working, in a non-light-emitting period (the non-light-emitting period may refer to a period other than a light-emitting period included in the display period), time for resetting the second terminal of the drive circuit 11 may be increased by increasing a duty cycle of the third scan signal, before the data voltage is written into the second terminal of the drive circuit 11, so as to make a reset effect of a potential of the second terminal of the drive circuit 11 better.

When the pixel circuit according to at least one embodiment of the present disclosure as shown in FIG. 47 is working, the reset circuit writes a reset voltage to the second terminal of the drive circuit under control of the third scan signal in the initialization phase.

In at least one embodiment of the present disclosure, the reset voltage is a Direct Current (DC) voltage signal to provide a fixed bias voltage for the drive transistor to improve a hysteresis phenomenon.

Optionally, the reset voltage may be a high voltage, but not limited to this.

In at least one embodiment of the present disclosure, a third scan signal may be provided to the third scan line through a separate third scan signal generation module, which is beneficial to reset a potential of the second terminal of the drive circuit.

In at least one embodiment of the present disclosure, the reset voltage line and the first voltage line may be a same voltage line, so that a quantity of signal lines used may be reduced. A voltage value of the reset voltage is greater than a voltage value of the first initialization voltage. The first voltage line is used for providing a first voltage signal (the first voltage line may be a high voltage line). A voltage value of the first voltage signal may be greater than 0 V and less than or equal to 5 V, for example, the voltage value of the first voltage signal may be 4.6 V, but not limited to this. The first initialization voltage may be a DC voltage, and a voltage value of the first initialization voltage may be greater than or equal to −7 V and less than or equal to 0 V, for example, the voltage value of the first initialization voltage may be −6 V, −5 V, −4 V, −3 V, or −2 V, but not limited to this.

In at least one embodiment of the present disclosure, the threshold voltage Vth of the drive transistor in the drive circuit may be greater than or equal to −5 V and less than or equal to −2 V. Preferably, Vth may be greater than or equal to −4 V and less than or equal to −2.5 V, for example, Vth may be −4 V, −3.5 V, −3 V, or −2.5 V, but not limited to this.

An absolute value of the voltage value of the reset voltage may be greater than 1.5 times of an absolute value of the threshold voltage, so as to ensure that a bias effect can be quickly achieved in a relatively short time. For example, the absolute value of the voltage value of the reset voltage may be greater than 2 times, 2.5 times, or 3 times the absolute value of the threshold voltage, but not limited to this.

Optionally, the reset circuit includes a fourth transistor.

A control electrode of the fourth transistor is electrically connected with the third scan line, a first electrode of the fourth transistor is electrically connected with the reset voltage line, and a second electrode of the fourth transistor is electrically connected with the second terminal of the drive circuit.

In at least one embodiment of the present disclosure, the fourth transistor may be a low temperature poly silicon thin film transistor, but not limited to this.

Figure 48:
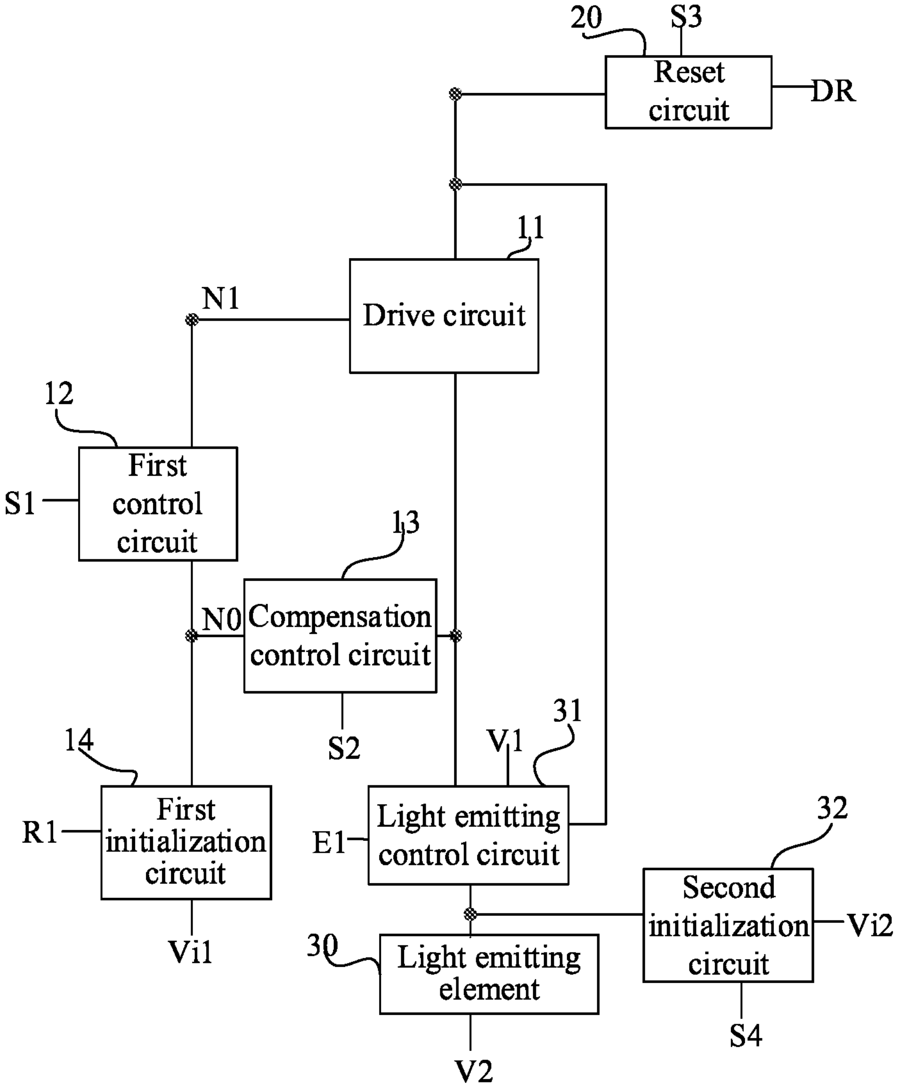
FIG. 48 is a schematic diagram of a structure of a pixel circuit according to at least yet another embodiment of the present disclosure.

As shown in FIG. 48, the pixel circuit described in at least one embodiment of the present disclosure may further include a light emitting element 30, a light emitting control circuit 31, and a second initialization circuit 32.

The light emitting control circuit 31 is electrically connected with a light emitting control line E1, a first voltage line V1, a second terminal of a drive circuit 11, a first terminal of the drive circuit 11, and a first electrode of the light emitting element 30 respectively, and configured to control communication between the first voltage line V1 and the second terminal of the drive circuit 11 and control communication between the first terminal of the drive circuit 11 and the first electrode of the light emitting element 30 under control of a light emitting control signal provided by the light emitting control line E1.

The second initialization circuit 32 is electrically connected with a fourth scan line S4, a second initialization voltage line, and the first electrode of the light emitting element 30 respectively, and configured to write a second initialization voltage Vi2 provided by the second initialization voltage line to the first electrode of the light emitting element 30 under control of a fourth scan signal provided by the fourth scan line S4.

A second electrode of the light emitting element 30 is electrically connected with a second voltage line V2.

In at least one embodiment of the present disclosure, the first voltage line V1 may be a high voltage line and the second voltage line V2 may be a low voltage line, but not limited to this.

The light emitting element 30 may be an Organic Light Emitting Diode (OLED), the first electrode of the light emitting element 30 may be an anode of the OLED, and the second electrode of the light emitting element 30 may be a cathode of the OLED, but not limited to this.

In the pixel circuit according to at least one embodiment of the present disclosure as shown in FIG. 48, a fourth scan signal may be provided to the fourth scan line through a separate fourth scan signal generation module, which is beneficial to a degree of freedom of switching a switch frequency under low frequency flicker (the switch frequency is a switch frequency of a transistor included in the second initialization circuit 32). When a display panel to which the pixel circuit is applied works at a low frequency, when the light emitting control circuit 31 controls the first voltage line V1 to disconnect from the second terminal of the drive circuit 11 and controls the first terminal of the drive circuit 11 to disconnect from the first electrode of the light emitting element 30, it is possible to reduce flicker by increasing a frequency of the fourth scan signal.

In at least one embodiment of the present disclosure, the third scan signal and the fourth scan signal may be a same scan signal, and the third scan signal generation module and the fourth scan signal generation module may be a same module, but not limited to this.

When the pixel circuit according to at least one embodiment of the present disclosure shown in FIG. 48 is working, the first scan signal and the light emitting control signal may be a same signal. However, considering that when Pulse Width Modulation (PWM) controls a light emitting function, an EM may provide a high voltage signal during a light emitting process, then a first scan signal is provided to a first scan line through a separate first scan signal generation module, and a light emitting control signal is provided to a light emitting control line through a light emitting control signal generation module.

In at least one embodiment of the present disclosure, when the reset voltage line is a first voltage line, a voltage value of the reset voltage may be greater than a voltage value of the second initialization voltage.

The voltage value of the second initialization voltage may be greater than or equal to −7 V and less than or equal to 0 V. For example, the voltage value of the second initialization voltage may be −6 V, −5 V, −4 V, −3 V, or −2 V.

Optionally, the light emitting control circuit includes a fifth transistor and a sixth transistor.

A control electrode of the fifth transistor is electrically connected with the light emitting control line, a first electrode of the fifth transistor is electrically connected with the first voltage line, and a second electrode of the fifth transistor is electrically connected with the second terminal of the drive circuit.

A control terminal of the sixth transistor is electrically connected with the light emitting control line, a first electrode of the sixth transistor is electrically connected with the first terminal of the drive circuit, and a second electrode of the sixth transistor is electrically connected with the first electrode of the light emitting element.

The second initialization circuit includes a seventh transistor.

A control electrode of the seventh transistor is electrically connected with the fourth scan line, a first electrode of the seventh transistor is electrically connected with the second initialization voltage line, and a second electrode of the seventh transistor is electrically connected with the first electrode of the light emitting element.

Optionally, the seventh transistor may be an oxide thin film transistor.

In at least one embodiment of the present disclosure, the seventh transistor may be set as an oxide thin film transistor, so that leakage may be reduced to ensure stability of a potential of a first electrode of a light emitting element.

Figure 49:
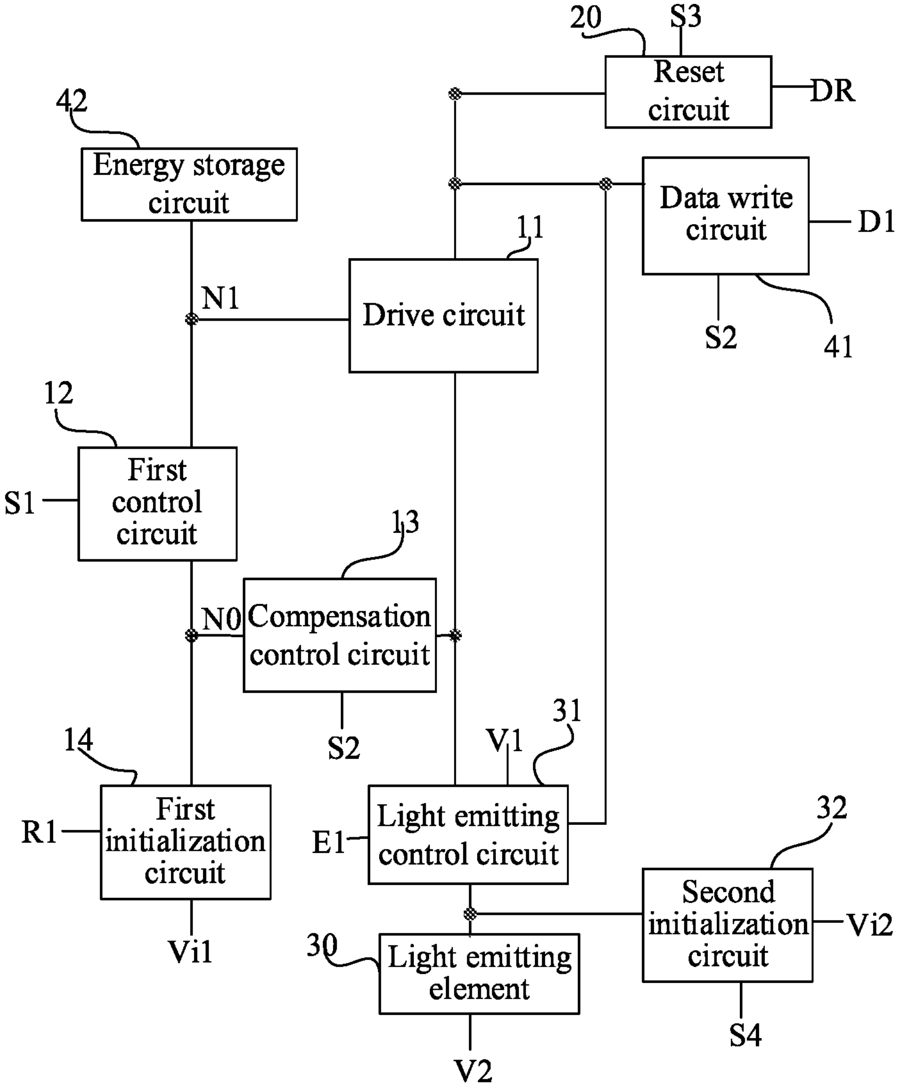
FIG. 49 is a schematic diagram of a structure of a pixel circuit according to at least yet another embodiment of the present disclosure.

As shown in FIG. 49, on a basis of at least one embodiment of the pixel circuit shown in FIG. 48, the pixel circuit described in at least one embodiment of the present disclosure may further include a data write circuit 41 and an energy storage circuit 42.

The data write circuit 41 is electrically connected with a second scan line S2, a data line D1, and the second terminal of the drive circuit 11 respectively, and configured to write a data voltage on the data line D1 to the second terminal of the drive circuit 11 under control of a second scan signal provided by the second scan line S2.

The energy storage circuit 42 is electrically connected with a control terminal of the drive circuit 11, and configured to store electrical energy.

When the pixel circuit according to at least one embodiment of the present disclosure shown in FIG. 49 is working, a display period further includes a light emitting phase set after a data write phase.

In an initialization phase, the second initialization circuit 32 writes the second initialization voltage Vi2 provided by the second initialization voltage line to the first electrode of the light emitting element 30 under control of the fourth scan signal provided by the fourth scan line S4.

In the data write phase, the data write circuit 41 writes a data voltage Vdata on the data line D1 to the second terminal of the drive circuit 11 under control of the second scan signal.

At beginning of the data write phase, the drive circuit 11 controls communication between the first terminal of the drive circuit 11 and the second terminal of the drive circuit 11 to charge the energy storage circuit 42 through the data voltage Vdata, and change a potential of the control terminal of the drive circuit 11 until the potential of the control terminal of the drive circuit 11 becomes Vdata+Vth, wherein Vth is a threshold voltage of a drive transistor of the drive circuit 11.

In the light emitting phase, the light emitting control circuit 31 controls communication between the first voltage line V1 and the second terminal of the drive circuit 11 under control of a light emitting control signal, and controls communication between the first terminal of the drive circuit 11 and the first electrode of the light emitting element 30. The drive circuit 11 drives the light emitting element 30 to emit light.

Optionally, the data write circuit includes an eighth transistor, and the energy storage circuit includes a storage capacitor.

A control electrode of the eighth transistor is electrically connected with the second scan line, a first electrode of the eighth transistor is electrically connected with the data line, and a second electrode of the eighth transistor is electrically connected with the second terminal of the drive circuit.

A first terminal of the storage capacitor is electrically connected with the control terminal of the drive circuit, and a second terminal of the storage capacitor is electrically connected with the first voltage line.

In at least one embodiment of the present disclosure, the drive circuit may include a drive transistor.

The drive transistor is a single-gate transistor, a gate of the drive transistor is electrically connected with the control terminal of the drive circuit, a first electrode of the drive transistor is electrically connected with the first terminal of the drive circuit, and a second electrode of the drive transistor is electrically connected with the second terminal of the drive circuit; or, the drive transistor is a double-gate transistor, a first gate of the drive transistor is electrically connected with the control terminal of the drive circuit, a second gate of the drive transistor is electrically connected with the first voltage line, a first electrode of the drive transistor is electrically connected with the first terminal of the drive circuit, and a second electrode of the drive transistor is electrically connected with the second terminal of the drive circuit. The first gate is a top gate and the second gate is a bottom gate.

Optionally, the drive transistor may be a single-gate transistor or a double-gate transistor. When the drive transistor is a double-gate transistor, a first gate of the drive transistor is electrically connected with the control terminal of the drive circuit, a second gate of the drive transistor is electrically connected with the first voltage line, the first gate is a top gate, and the second gate is a bottom gate, so that a substrate of the drive transistor is biased and a hysteresis phenomenon of the drive transistor is improved.

Figure 50:
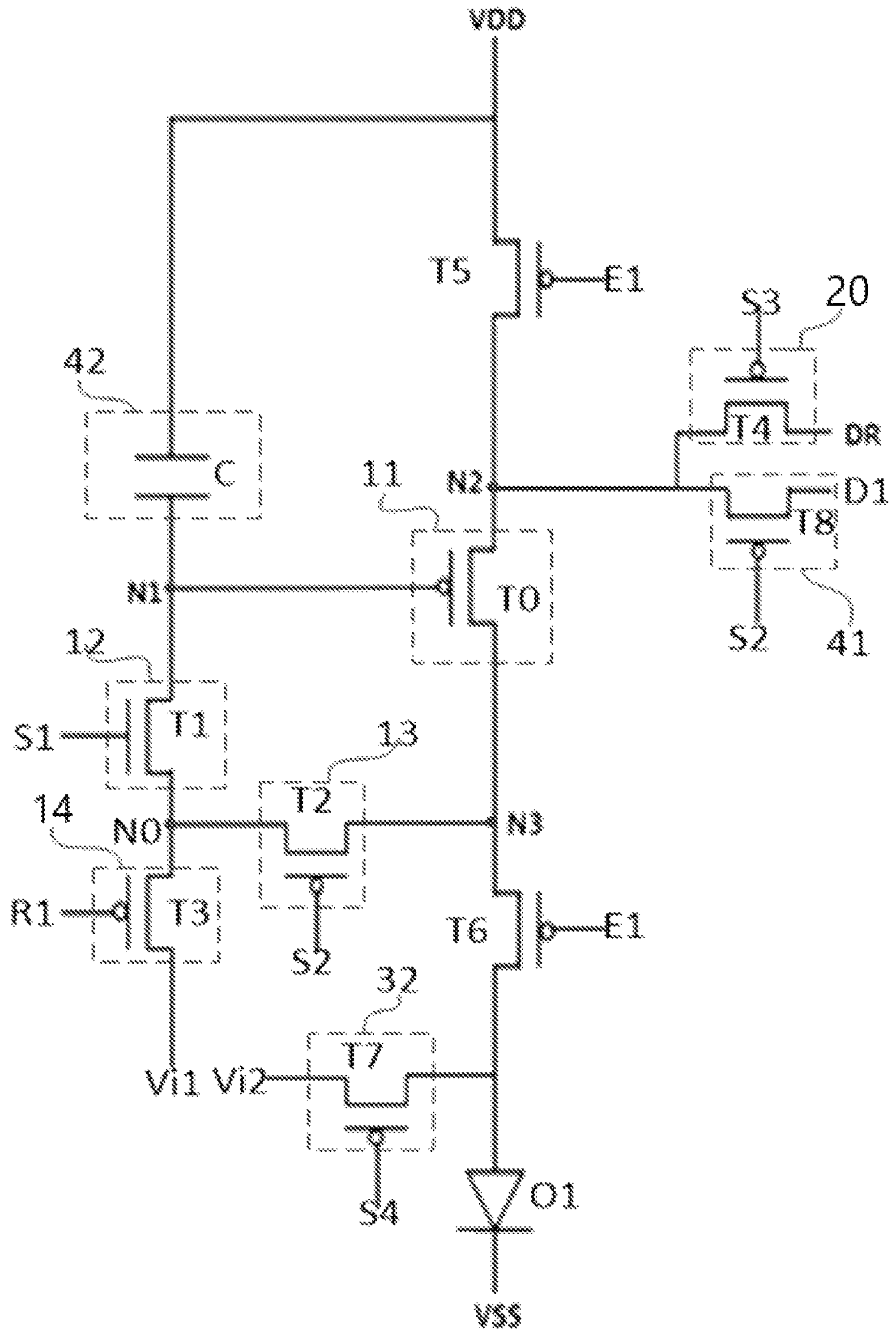
FIG. 50 is a circuit diagram of a pixel circuit according to at least one embodiment of the present disclosure.

As shown in FIG. 50, on a basis of at least one embodiment of the pixel circuit shown in FIG. 49, the first control circuit 12 includes a first transistor T1, the drive circuit 11 includes a drive transistor TO, and the light emitting element is an organic light emitting diode O1.

A gate of the first transistor T1 is electrically connected with the first scan line S1, a drain of the first transistor T1 is electrically connected with a gate of the drive transistor TO, and a source of the first transistor T1 is electrically connected with the connection node NO.

The compensation control circuit 13 includes a second transistor T2.

A gate of the second transistor T2 is electrically connected with the second scan line S2, a drain of the second transistor T2 is electrically connected with the connection node NO, and a source of the second transistor T2 is electrically connected with a drain of the drive transistor TO.

The first initialization circuit 14 includes a third transistor T3.

A gate of the third transistor T3 is electrically connected with the initialization control line R1, a drain of the third transistor T3 is electrically connected with a first initialization voltage line, and a source of the third transistor T3 is electrically connected with the connection node NO. The first initialization voltage line is used for providing a first initialization voltage Vi1.

The reset circuit 20 includes a fourth transistor T4.

A gate of the fourth transistor T4 is electrically connected with the third scan line S3, a drain of the fourth transistor T4 is electrically connected with the reset voltage line DR, and a source of the fourth transistor T4 is electrically connected with the source of the drive transistor T0.

The light emitting control circuit includes a fifth transistor T5 and a sixth transistor T6.

A gate of the fifth transistor T5 is electrically connected with the light emitting control line E1, a drain of the fifth transistor T5 is electrically connected with a high voltage line, and a source of the fifth transistor T5 is electrically connected with the source of the drive transistor T0. The high voltage line is used for providing a high voltage signal VDD.

A gate of the sixth transistor T6 is electrically connected with the light emitting control line E1, a drain of the sixth transistor T6 is electrically connected with the drain of the drive transistor T0, and a source of the sixth transistor T6 is electrically connected with an anode of the organic light emitting diode O1.

The second initialization circuit 32 includes a seventh transistor T7.

A gate of the seventh transistor T7 is electrically connected with the fourth scan line S4, a drain of the seventh transistor T7 is electrically connected with the second initialization voltage line, and a source of the seventh transistor T7 is electrically connected with the anode of the organic light emitting diode O1. The second initialization voltage line is used for providing a second initialization voltage Vi2.

The data write circuit 41 includes an eighth transistor T8 and the energy storage circuit 42 includes a storage capacitor C.

A gate of the eighth transistor T8 is electrically connected with the second scan line S2, a drain of the eighth transistor T8 is electrically connected with the data line D1, and a source of the eighth transistor T8 is electrically connected with the source of the drive transistor T0.

A first terminal of the storage capacitor C is electrically connected with the gate of the drive transistor T0, and a second terminal of the storage capacitor C is electrically connected with the high voltage line.

A cathode of O1 is electrically connected with a low voltage line, and the low voltage line is used for providing a low voltage VSS.

In FIG. 50, a first node is labeled N1, the first node N1 is electrically connected with the gate of T0.

A second node is labeled N2, and a third node is labeled N3. N2 is electrically connected with the source of T0, and N3 is electrically connected with the drain of T0.

In at least one embodiment shown in FIG. 50, the first voltage line is a high voltage line and the second voltage line is a low voltage line.

In at least one embodiment of the pixel circuit shown in FIG. 50, T1 may be an oxide thin film transistor, T0, T2, T3, T4, T5, T6, T7, and T8 may all be low temperature poly silicon thin film transistors, T1 is an n-type transistor, T0, T2, T3, T4, T5, T6, T7, and T8 are p-type transistors, and T0 is a single-gate transistor, but not limited to this.

In at least one embodiment of the pixel circuit shown in FIG. 50, N1 is only directly electrically connected with T1 and N1 is not directly electrically connected with T2 and T3 so as to reduce leakage of N1 and stabilize stability of a potential of the gate of T0.

In at least one embodiment of the pixel circuit shown in FIG. 50, T1 is an oxide thin film transistor, which may reduce leakage and ensure stability of a potential of N1.

Optionally, T2 and T3 may be single-gate transistors, thereby saving space.

In at least one embodiment of the pixel circuit shown in FIG. 50, both the initialization control signal provided by the initialization control line R1 and the second scan signal provided by the second scan line may be provided by the second scan signal generation module.

Optionally, in at least one embodiment of the pixel circuit, each transistor included in the pixel circuit may be disposed on a substrate, an overlapping area between an orthographic projection of a conductive pattern on the substrate and an orthographic projection of the fourth scan line S4 on the substrate is as small as possible, and an overlapping area between the orthographic projection of the conductive pattern on the substrate and an orthographic projection of the initialization control line R1 on the substrate is as small as possible, so as to reduce a parasitic capacitance. In a preferred case, a capacitance between the conductive pattern and the fourth scan line S4 is less than 0.3 Cz, and a capacitance between a conductive pattern for electrically connecting the source of T0 and a source of T5 and the initialization control line R1 is less than 0.3 Cz, wherein Cz is a capacitance value of the storage capacitance C.

The conductive pattern includes the source of T0, the source of T5, and a connection conductive pattern for electrically connecting the source of T0 and the source of T5.

Figure 51:
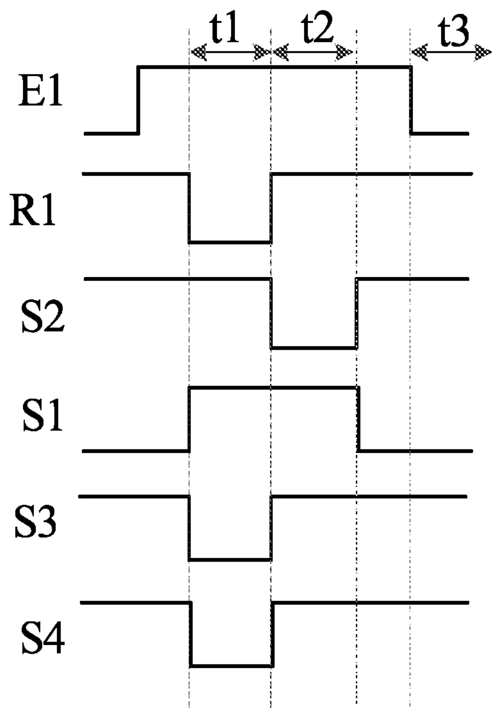
FIG. 51 is a working timing diagram of the pixel circuit shown in FIG. 50 according to at least one embodiment of the present disclosure.

As shown in FIG. 51, when the pixel circuit according to at least one embodiment of the present disclosure shown in FIG. 50 is working, a display period includes an initialization phase t1, a data write phase t2, and a light emitting phase t3 which are set sequentially.

In the initialization phase t1, E1 provides a high voltage signal, S1 provides a high voltage signal, T1 is turned on. R1 provides a low voltage signal, S2 provides a high voltage signal, T2 is turned on, T3 is turned off, and Vi1 is written to N1, so that T0 is turned on at beginning of the data write phase t2. S3 and S4 provide low voltage signals, T7 is turned on, T4 is turned on to write a reset voltage provided by DR to N2, Vi2 is written to an anode of O1, so that O1 does not emit light, and a residual charge of the anode of O1 is cleared.

In the data write phase t2, E1 provides a high voltage signal, S1 provides a high voltage signal, T1 is turned on. R1 provides a high voltage signal, S2 provides a high voltage signal, T2 is turned on, T3 is turned off, T8 is turned on, S3 and S4 provide high voltage signals, T7 and T4 are turned off, and a data voltage Vdata on a data line D1 is written to N2.

At the beginning of the data write phase t2, T0 is turned on to charge C through Vdata, through T8, T0, T2, and T1 which are turned on, to raise a potential of N1 until T0 is turned off, at this time, the potential of N1 is Vdata+Vth, and Vth is a threshold voltage of T0.

In the light emitting phase t3, E1 provides a low voltage signal, R1 provides a high voltage signal, S1 provides a low voltage signal, S2, S3, and S4 provide a high voltage signal, T1, T2, T3, T4, T7, and T8 are turned off, T5 and T6 are turned on, and T0 is turned on to drive O1 to emit light.

In at least one embodiment of the pixel circuit shown in FIG. 50, T4 is added to provide a high voltage for N2, and a potential of N2 is initialized in a non-light-emitting period, which is beneficial to improve stability of T0. T7 is provided to initialize a potential of the anode of O1, which facilitates a degree of freedom of switching a switch frequency under low frequency flicker.

Figure 52:
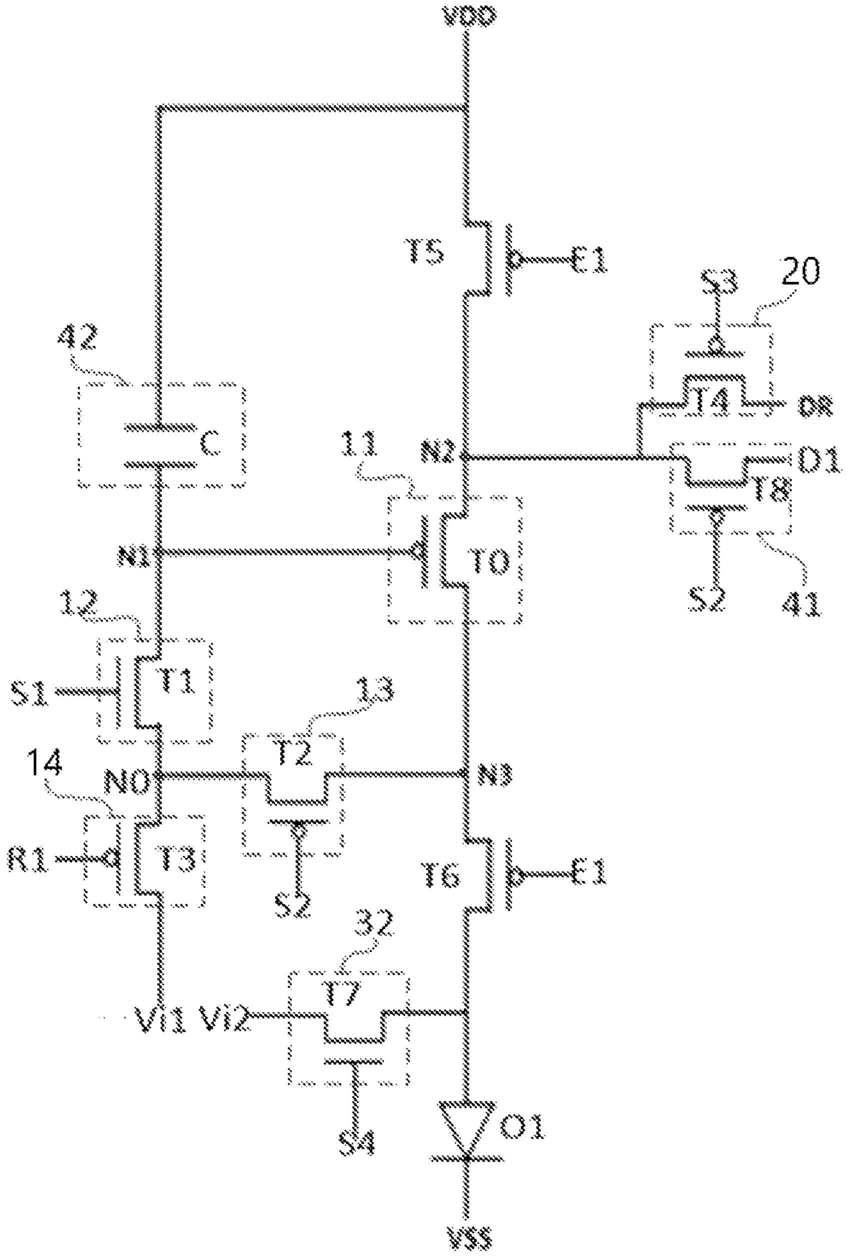
FIG. 52 is a circuit diagram of a pixel circuit according to at least another embodiment of the present disclosure.

As shown in FIG. 52, on a basis of at least one embodiment of the pixel circuit shown in FIG. 49, the first control circuit 12 includes a first transistor T1, the drive circuit 11 includes a drive transistor T0; and the light emitting element is an organic light emitting diode O1.

A gate of the first transistor T1 is electrically connected with the first scan line S1, a drain of the first transistor T1 is electrically connected with a gate of the drive transistor T0, and a source of the first transistor T1 is electrically connected with the connection node N0.

The compensation control circuit 13 includes a second transistor T2.

A gate of the second transistor T2 is electrically connected with the second scan line S2, a drain of the second transistor T2 is electrically connected with the connection node N0, and a source of the second transistor T2 is electrically connected with a drain of the drive transistor T0.

The first initialization circuit 14 includes a third transistor T3.

A gate of the third transistor T3 is electrically connected with the initialization control line R1, a drain of the third transistor T3 is electrically connected with a first initialization voltage line, and a source of the third transistor T3 is electrically connected with the connection node N0. The first initialization voltage line is used for providing a first initialization voltage Vi1.

The reset circuit 20 includes a fourth transistor T4.

A gate of the fourth transistor T4 is electrically connected with the third scan line S3, a drain of the fourth transistor T4 is electrically connected with the reset voltage line DR, and a source of the fourth transistor T4 is electrically connected with a source of the drive transistor T0.

The light emitting control circuit includes a fifth transistor T5 and a sixth transistor T6.

A gate of the fifth transistor T5 is electrically connected with the light emitting control line E1, a drain of the fifth transistor T5 is electrically connected with a high voltage line, and a source of the fifth transistor T5 is electrically connected with the source of the drive transistor T0. The high voltage line is used for providing a high voltage signal VDD.

A gate of the sixth transistor T6 is electrically connected with the light emitting control line E1, a drain of the sixth transistor T6 is electrically connected with the drain of the drive transistor T0, and a source of the sixth transistor T6 is electrically connected with an anode of the organic light emitting diode O1.

The second initialization circuit 32 includes a seventh transistor T7.

A gate of the seventh transistor T7 is electrically connected with the fourth scan line S4, a drain of the seventh transistor T7 is electrically connected with the second initialization voltage line, and a source of the seventh transistor T7 is electrically connected with the anode of the organic light emitting diode O1. The second initialization voltage line is used for providing a second initialization voltage Vi2.

The data write circuit 41 includes an eighth transistor T8 and the energy storage circuit 42 includes a storage capacitor C.

A gate of the eighth transistor T8 is electrically connected with the second scan line S2, a drain of the eighth transistor T8 is electrically connected with the data line D1, and a source of the eighth transistor T8 is electrically connected with the source of the drive transistor T0.

A first terminal of the storage capacitor C is electrically connected with the gate of the drive transistor T0, and a second terminal of the storage capacitor C is electrically connected with the high voltage line.

A cathode of O1 is electrically connected with a low voltage line, and the low voltage line is used for providing a low voltage VSS.

In FIG. 52, a first node is labeled N1, and the first node N1 is electrically connected with the gate of T0.

A second node is labeled N2, and a third node is labeled N3. N2 is electrically connected with the source of T0, and N3 is electrically connected with the drain of T0.

In at least one embodiment shown in FIG. 52, the first voltage line is a high voltage line and the second voltage line is a low voltage line.

In at least one embodiment of the pixel circuit shown in FIG. 52, T1 and T7 may be oxide thin film transistors, T0, T2, T3, T4, T5, T6, and T8 may all be low temperature poly silicon thin film transistors, T1 and T7 are n-type transistors, T0, T2, T3, T4, T5, T6, and T8 are p-type transistors, and T0 is a single-gate transistor, but not limited to this.

The at least one embodiment of the pixel circuit shown in FIG. 52 of the present disclosure differs from the at least one embodiment of the pixel circuit shown in FIG. 50 of the present disclosure in that T7 is an oxide thin film transistor.

In at least one embodiment of the pixel circuit shown in FIG. 52, N1 is only directly electrically connected with T1 and N1 is not directly electrically connected with T2 and T3, so as to reduce leakage of N1 and stabilize stability of a potential of the gate of T0.

In at least one embodiment of the pixel circuit shown in FIG. 52, T1 and T7 are oxide thin film transistors to reduce leakage, to ensure stability of a potential of N1, and to ensure stability of a potential of the anode of O1.

In at least one embodiment of the pixel circuit shown in FIG. 52, a fourth scan signal may be provided to a fourth scan line through a separate fourth scan signal generation module, which facilitates a degree of freedom of switching a switch frequency (the switch frequency is a switch frequency of a transistor included in the second initialization circuit 32) under low frequency flicker. When a display panel to which the pixel circuit is applied works at a low frequency, when the light emitting control circuit 31 controls the first voltage line V1 to disconnect from the second terminal of the drive circuit 11 and controls the first terminal of the drive circuit 11 to disconnect from the first electrode of the light emitting element 30, it is possible to reduce flicker by increasing a frequency of the fourth scan signal; or, the fourth scan line may be the light emitting control line, so that only the light emitting control signal provided by the light emitting control line needs to be periodically controlled in a low-frequency refresh phase, that is, the light emitting element can be periodically reset/adjusted in brightness, thereby achieving brightness equalization.

Figure 53:
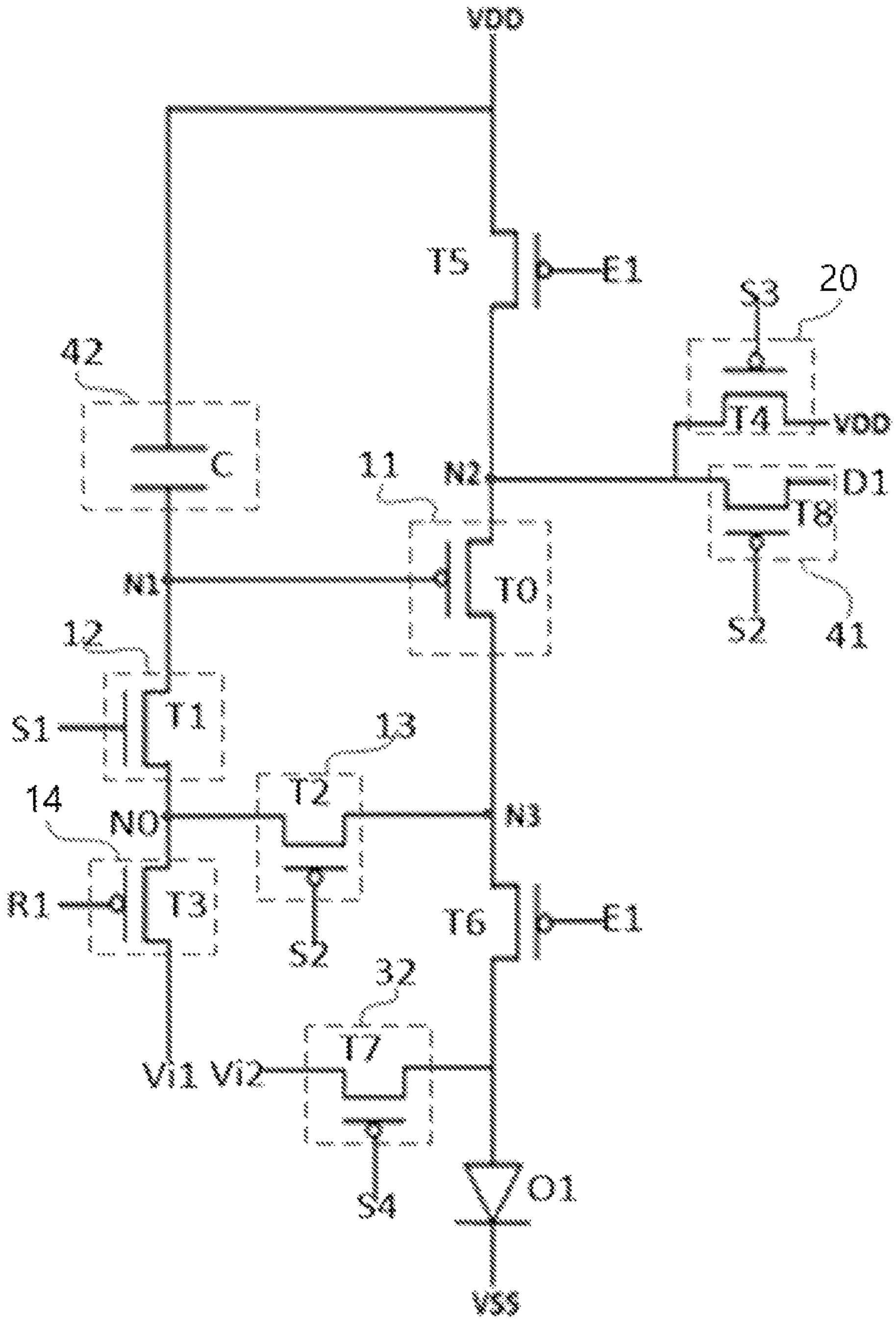
FIG. 53 is a circuit diagram of a pixel circuit according to at least yet another embodiment of the present disclosure.

As shown in FIG. 53 on a basis of at least one embodiment of the pixel circuit shown in FIG. 49, the first control circuit 12 includes a first transistor T1, the drive circuit 11 includes a drive transistor T0, and the light emitting element is an organic light emitting diode O1.

A gate of the first transistor T1 is electrically connected with the first scan line S1, a drain of the first transistor T1 is electrically connected with a gate of the drive transistor T0, and a source of the first transistor T1 is electrically connected with the connection node N0.

The compensation control circuit 13 includes a second transistor T2.

A gate of the second transistor T2 is electrically connected with the second scan line S2, a drain of the second transistor T2 is electrically connected with the connection node N0, and a source of the second transistor T2 is electrically connected with a drain of the drive transistor T0.

The first initialization circuit 14 includes a third transistor T3.

A gate of the third transistor T3 is electrically connected with the initialization control line R1, a drain of the third transistor T3 is electrically connected with the first initialization voltage line, and a source of the third transistor T3 is electrically connected with the connection node N0. The first initialization voltage line is used for providing a first initialization voltage Vi1.

The reset circuit 20 includes a fourth transistor T4.

A gate of the fourth transistor T4 is electrically connected with the third scan line S3, a drain of the fourth transistor T4 is electrically connected with a high voltage line, and a source of the fourth transistor T4 is electrically connected with a source of the drive transistor T0. The high voltage line is used for providing a high voltage signal VDD.

The light emitting control circuit includes a fifth transistor T5 and a sixth transistor T6.

A gate of the fifth transistor T5 is electrically connected with the light emitting control line E1, a drain of the fifth transistor T5 is electrically connected with a high voltage line, and a source of the fifth transistor T5 is electrically connected with the source of the drive transistor T0.

A gate of the sixth transistor T6 is electrically connected with the light emitting control line E1, a drain of the sixth transistor T6 is electrically connected with a drain of the drive transistor T0, and a source of the sixth transistor T6 is electrically connected with an anode of the organic light emitting diode O1.

The second initialization circuit 32 includes a seventh transistor T7.

A gate of the seventh transistor T7 is electrically connected with the fourth scan line S4, a drain of the seventh transistor T7 is electrically connected with the second initialization voltage line, and a source of the seventh transistor T7 is electrically connected with the anode of the organic light emitting diode O1. The second initialization voltage line is used for providing a second initialization voltage Vi2.

The data write circuit 41 includes an eighth transistor T8 and the energy storage circuit 42 includes a storage capacitor C.

A gate of the eighth transistor T8 is electrically connected with the second scan line S2, a drain of the eighth transistor T8 is electrically connected with the data line D1, and a source of the eighth transistor T8 is electrically connected with the source of the drive transistor T0.

A first terminal of the storage capacitor C is electrically connected with the gate of the drive transistor T0, and a second terminal of the storage capacitor C is electrically connected with the high voltage line.

A cathode of O1 is electrically connected with a low voltage line, and the low voltage line is used for providing a low voltage VSS.

In FIG. 53, a first node is labeled N1, and the first node N1 is electrically connected with the gate of T0.

A second node is labeled N2, and a third node is labeled N3. N2 is electrically connected with the source of T0, and N3 is electrically connected with the drain of T0.

In at least one embodiment shown in FIG. 53, the first voltage line is a high voltage line and the second voltage line is a low voltage line.

In at least one embodiment of the pixel circuit shown in FIG. 53, T1 may be an oxide thin film transistor, T0, T2, T3, T4, T5, T6, T7, and T8 may all be low temperature poly silicon thin film transistors, T1 is an n-type transistor, T0, T2, T3, T4, T5, T6, T7, and T8 are p-type transistors, and T0 is a single-gate transistor, but not limited to this.

In at least one embodiment of the pixel circuit shown in FIG. 53, N1 is only directly electrically connected with T1 and N1 is not directly electrically connected with T2 and T3, so as to reduce leakage of N1 and stabilize stability of a potential of the gate of T0.

T1 is an oxide thin film transistor to reduce leakage of N1 and stabilize stability of the potential of the gate of T0.

The at least one embodiment of the pixel circuit shown in FIG. 53 of the present disclosure differs from the at least one embodiment of the pixel circuit shown in FIG. 50 of the present disclosure in that the reset voltage line DR is the high voltage line, and a quantity of signal lines used may be reduced.

In at least one embodiment of the pixel circuit shown in FIG. 53 of the present disclosure, a voltage value of VDD may be 4.6 V, the voltage value of VDD is greater than a voltage value of Vi1, and the voltage value of VDD is greater than a voltage value of Vi2.

In at least one embodiment of the pixel circuit shown in FIG. 53 of the present disclosure, T7 may also be replaced with an oxide thin film transistor, and T0 may also be replaced with a double-gate transistor, but not limited to this.

Figure 54:
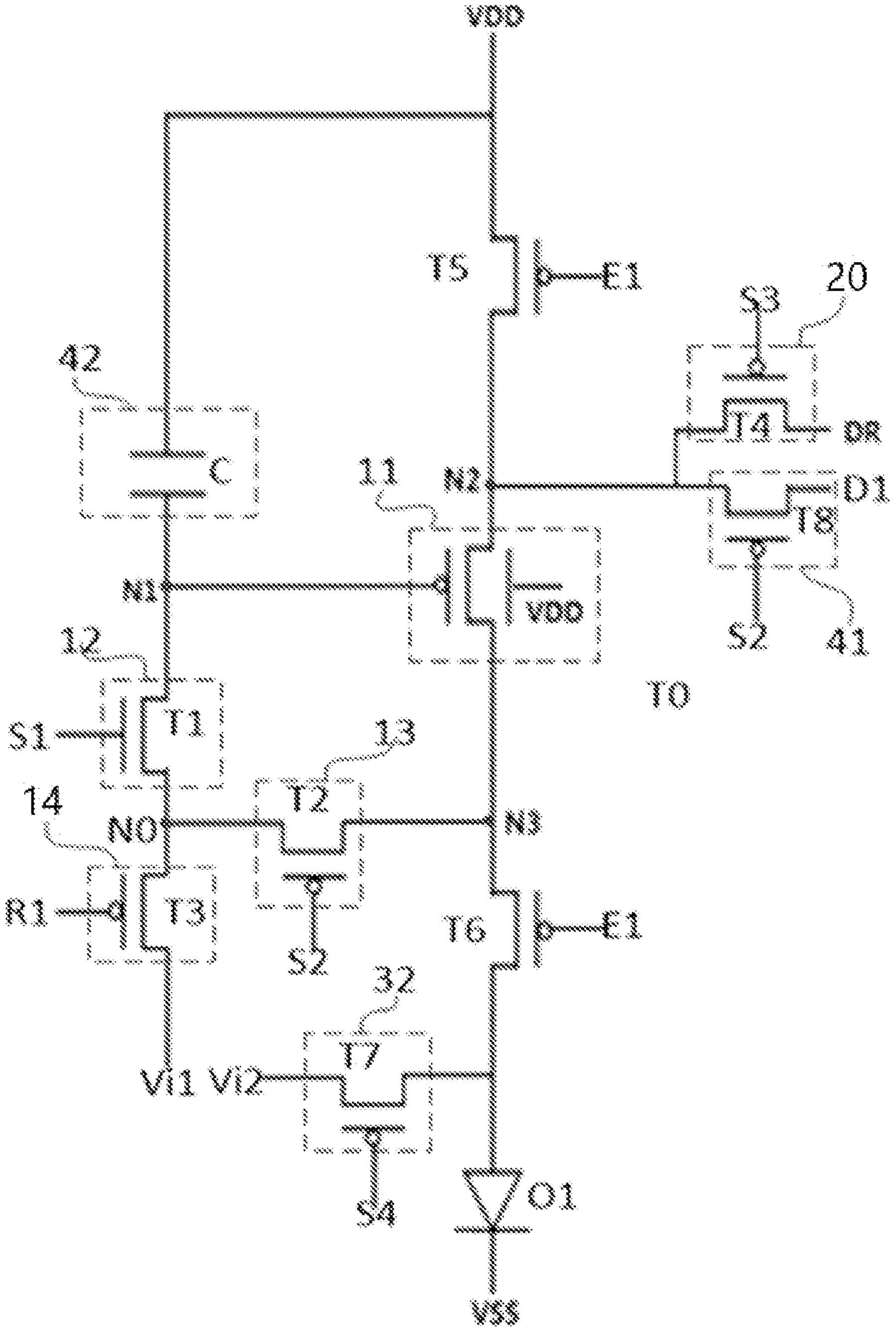
FIG. 54 is a circuit diagram of a pixel circuit according to at least yet another embodiment of the present disclosure.

As shown in FIG. 54, on a basis of at least one embodiment of the pixel circuit shown in FIG. 49, the first control circuit 12 includes a first transistor T1, the drive circuit 11 includes a drive transistor T0, and the light emitting element is an organic light emitting diode O1.

A gate of the first transistor T1 is electrically connected with the first scan line S1, a drain of the first transistor T1 is electrically connected with a first gate of the drive transistor T0, and a source of the first transistor T1 is electrically connected with the connection node N0.

The compensation control circuit 13 includes a second transistor T2.

A gate of the second transistor T2 is electrically connected with the second scan line S2, a drain of the second transistor T2 is electrically connected with the connection node N0, and a source of the second transistor T2 is electrically connected with a drain of the drive transistor T0.

The first initialization circuit 14 includes a third transistor T3.

A gate of the third transistor T3 is electrically connected with the initialization control line R1, a drain of the third transistor T3 is electrically connected with a first initialization voltage line, and a source of the third transistor T3 is electrically connected with the connection node N0. The first initialization voltage line is used for providing a first initialization voltage Vi1.

The reset circuit 20 includes a fourth transistor T4.

A gate of the fourth transistor T4 is electrically connected with the third scan line S3, a drain of the fourth transistor T4 is electrically connected with the reset voltage line DR, and a source of the fourth transistor T4 is electrically connected with a source of the drive transistor T0.

The light emitting control circuit includes a fifth transistor T5 and a sixth transistor T6.

A gate of the fifth transistor T5 is electrically connected with the light emitting control line E1, a drain of the fifth transistor T5 is electrically connected with a high voltage line, and a source of the fifth transistor T5 is electrically connected with the source of the drive transistor T0. The high voltage line is used for providing a high voltage signal VDD.

A gate of the sixth transistor T6 is electrically connected with the light emitting control line E1, a drain of the sixth transistor T6 is electrically connected with a drain of the drive transistor T0, and a source of the sixth transistor T6 is electrically connected with an anode of an organic light emitting diode O1.

The second initialization circuit 32 includes a seventh transistor T7.

A gate of the seventh transistor T7 is electrically connected with the fourth scan line S4, a drain of the seventh transistor T7 is electrically connected with the second initialization voltage line, and a source of the seventh transistor T7 is electrically connected with the anode of the organic light emitting diode O1. The second initialization voltage line is used for providing a second initialization voltage Vi2.

The data write circuit 41 includes an eighth transistor T8 and the energy storage circuit 42 includes a storage capacitor C.

A gate of the eighth transistor T8 is electrically connected with the second scan line S2, a drain of the eighth transistor T8 is electrically connected with the data line D1, and a source of the eighth transistor T8 is electrically connected with the source of the drive transistor T0.

A first terminal of the storage capacitor C is electrically connected with the first gate of the drive transistor T0, and a second terminal of the storage capacitor C is electrically connected with the high voltage line.

The second gate of the drive transistor T0 is electrically connected with the high voltage line.

A cathode of O1 is electrically connected with a low voltage line, and the low voltage line is used for providing a low voltage VSS.

In FIG. 54, a first node is labeled N1, and the first node N1 is electrically connected with the gate of T0.

A second node is labeled N2, and a third node is labeled N3. N2 is electrically connected with the source of T0, and N3 is electrically connected with the drain of T0.

In at least one embodiment shown in FIG. 54, the first voltage line is a high voltage line and the second voltage line is a low voltage line.

In at least one embodiment of the pixel circuit shown in FIG. 54, T1 may be an oxide thin film transistor, T0, T2, T3, T4, T5, T6, T7, and T8 may all be low temperature poly silicon thin film transistors, T1 is an n-type transistor, T0, T2, T3, T4, T5, T6, T7, and T8 are p-type transistors, and T0 is a double-gate transistor, but not limited to this.

In at least one embodiment of the pixel circuit t shown in FIG. 54, N1 is only directly electrically connected with T1 and N1 is not directly electrically connected with T2 and T3, so as to reduce leakage of N1 and stabilize stability of a potential of the gate of T0.

In at least one embodiment of the pixel circuit shown in FIG. 54, T1 is an oxide thin film transistor, which can reduce leakage and ensure stability of a potential of N1.

In at least one embodiment of the pixel circuit shown in FIG. 54, T0 is a double-gate transistor, the first gate of T0 is a top gate, the second gate of T0 is a bottom gate, and the second gate of T0 is electrically connected with the high voltage line to bias a substrate of T0, which is beneficial to improve a hysteresis phenomenon of T0.

The at least one embodiment of the pixel circuit shown in FIG. 54 of the present disclosure differs from the at least one embodiment of the pixel circuit shown in FIG. 50 of the present disclosure in that T0 is a double-gate transistor.

In at least one embodiment of the pixel circuit shown in FIG. 54 of the present disclosure, T7 may be replaced with an oxide thin film transistor and DR may be a first voltage line, but not limited to this.

In at least one embodiment of pixel circuits shown in FIG. 50, FIG. 52, FIG. 53, and FIG. 54 of the present disclosure, in a non-light-emitting period (which may refer to a period other than a light emitting phase included in the display period), before the data voltage Vdata is written to N2, on-time of T4 may be increased by increasing a duty cycle of the third scan signal, so that a reset effect on a potential of N2 is better.

Figure 55:
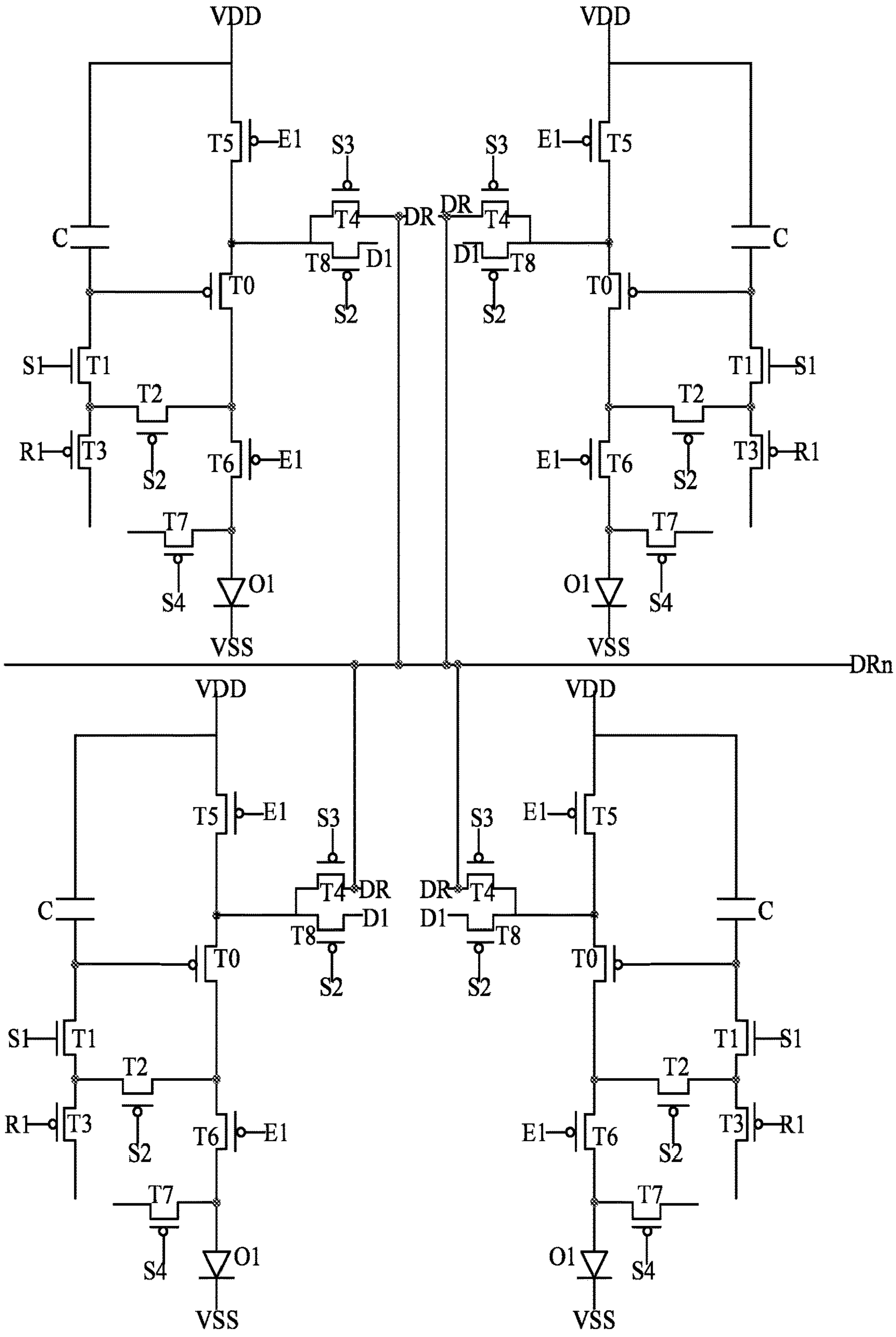
FIG. 55 is a schematic diagram of electrical connections between two adjacent rows of pixel circuits and a reset voltage line of a same row.

As shown in FIG. 55, two adjacent rows of pixel circuits may be electrically connected with a reset voltage line of a same row. In FIG. 55, a reset voltage line of an n-th row is labeled DRn (n is a positive integer). And two pixel circuits located in adjacent columns are mirrored to facilitate wiring.

Figure 56:
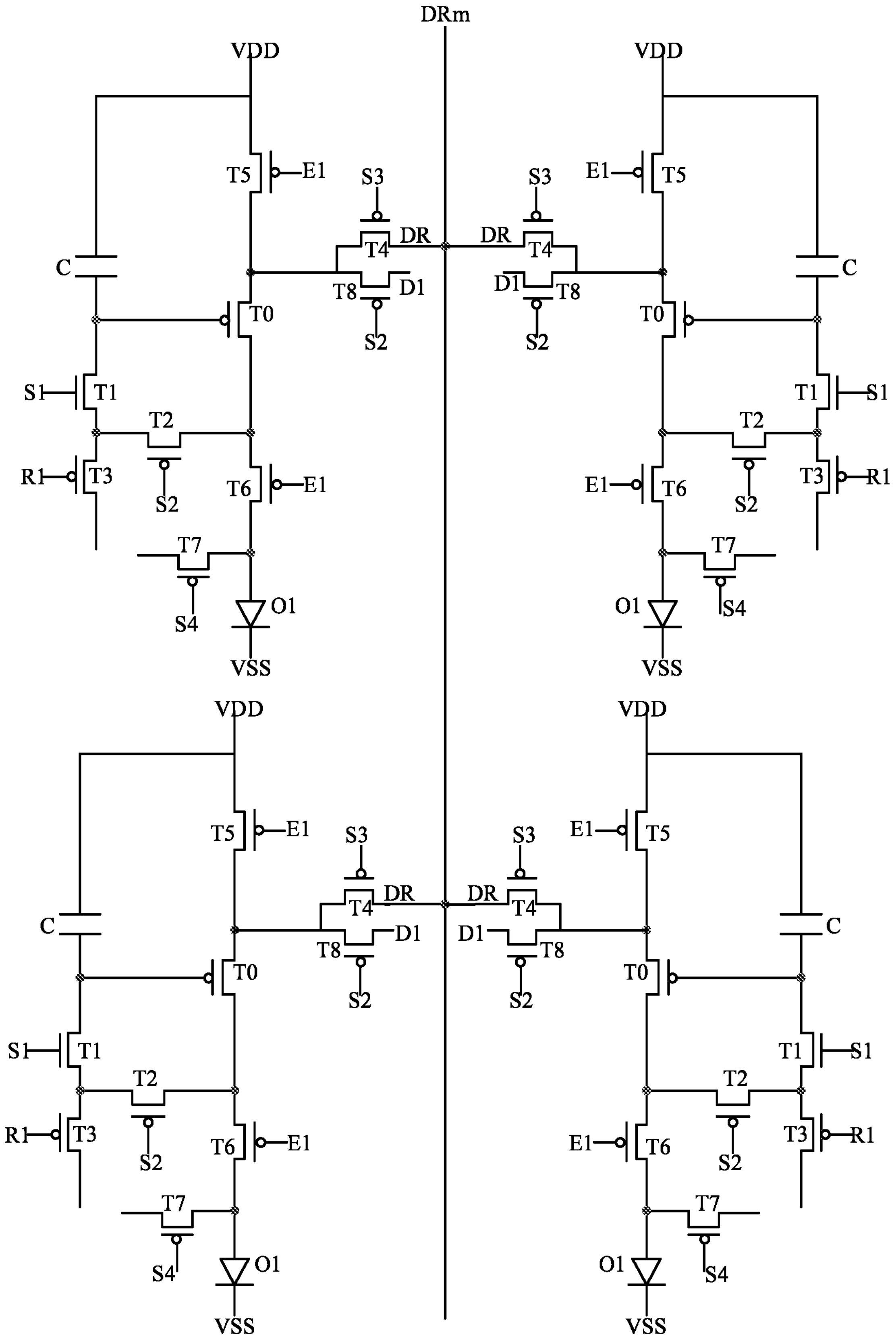
FIG. 56 is a schematic diagram of electrical connections between two adjacent columns of pixel circuits and a reset voltage line of a same column.

As shown in FIG. 56, two adjacent columns of pixel circuits may be electrically connected with a reset voltage line of a same column. In FIG. 56, a reset voltage line of an m-th column is labeled DRm (m is a positive integer). And two pixel circuits located in adjacent columns are mirrored to facilitate wiring.

Figure 57:
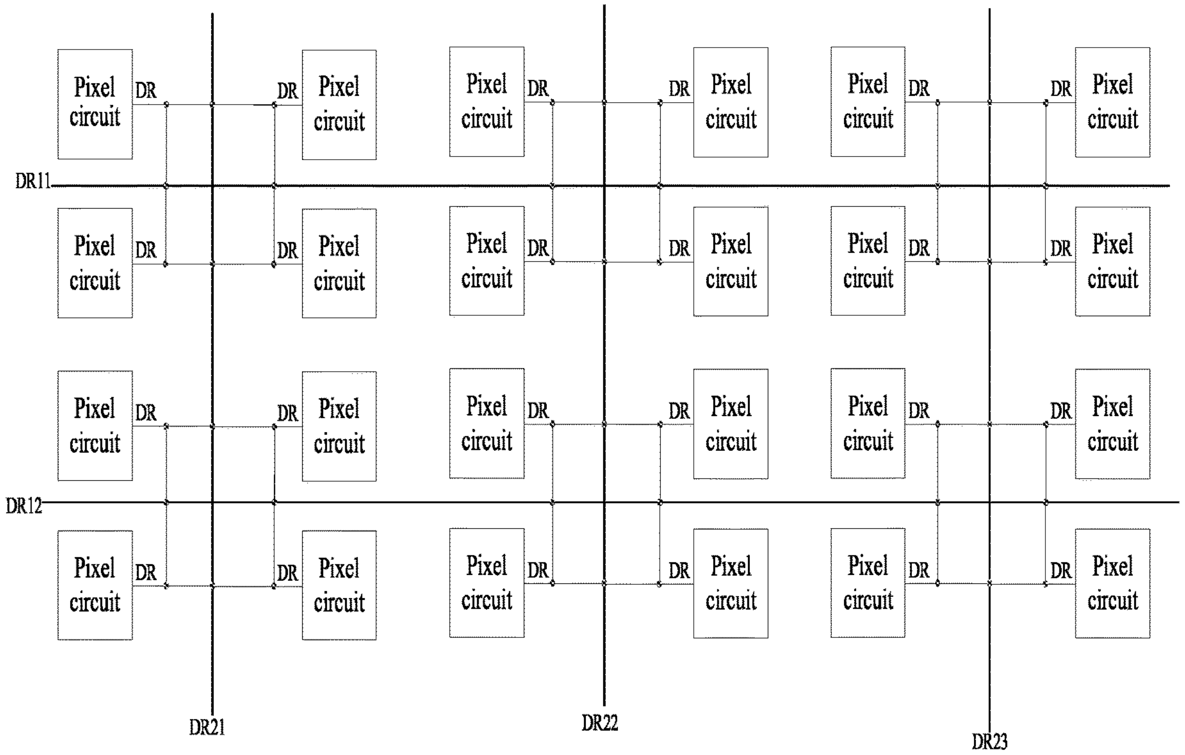
FIG. 57 is a schematic diagram of sharing reset voltage lines by adjacent rows of pixel circuits and adjacent columns of pixel circuits.

As shown in FIG. 57, two adjacent rows of pixel circuits may be electrically connected with a reset voltage line of a same row, and two adjacent columns of pixel circuits may be electrically connected with a reset voltage line of a same column, and two pixel circuits located in adjacent columns are mirrored, and multiple reset voltage lines are disposed in a grid to facilitate wiring.

In FIG. 57, a reset voltage line of a first row is labeled DR11, a reset voltage line of a second row is labeled DR12, a reset voltage line of a first column is labeled DR21, a reset voltage line of a second column is labeled DR22, and a reset voltage line of a third column is labeled DR23.

Figure 58:
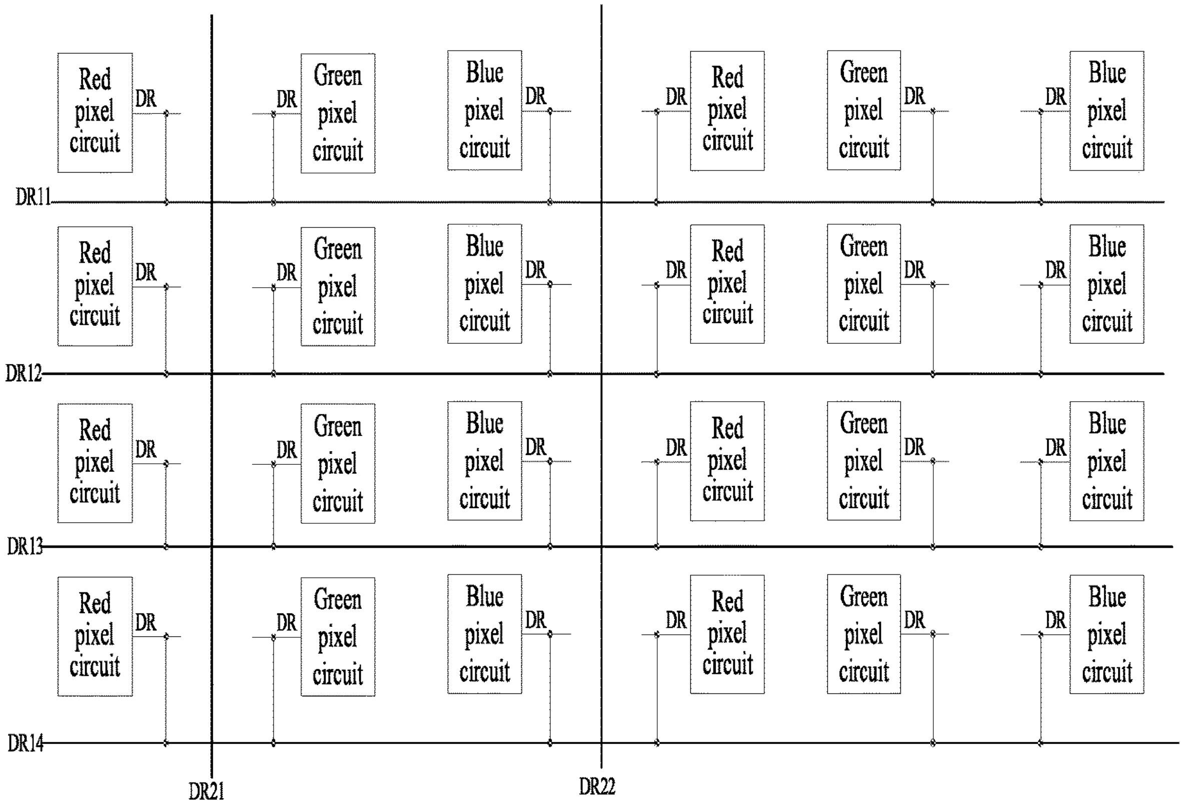
FIG. 58 is a schematic diagram of a connection relationship and a positional relationship between reset voltage lines arranged in a grid and multiple pixel circuits.

In FIG. 58, a reset voltage line of a first row is labeled DR11, a reset voltage line of a second row is labeled DR12, a reset voltage line of a third row is labeled DR13, a reset voltage line of a fourth row is labeled DR14, a reset voltage line of a first column is labeled DR21, and a reset voltage line of a second column is labeled DR22.

As shown in FIG. 58, pixel circuits located in the first row are all electrically connected with the reset voltage line of the first row DR11, pixel circuits located in the second row are electrically connected with the reset voltage line of the second row DR12, pixel circuits located in the third row are all electrically connected with the reset voltage line of the third row DR13, and pixel circuits located in the fourth row are electrically connected with the reset voltage line of the fourth row DR14.

Reset voltage lines vertically extending are disposed, so that multiple reset voltage lines are disposed in a grid. And a column of reset voltage lines may be disposed every few columns of pixel circuits to save wiring space.

In specific implementation, reset voltage lines vertically extending may be disposed on a side of a column of red pixel circuits.

The driving method described in the embodiment of the present disclosure is applied to the above pixel circuit, and a display period includes an initialization phase and a data write phase. The driving method includes following contents.

In the initialization phase, a first control circuit controls communication between a control terminal of a drive circuit and a connection node under control of a first scan signal, and a first initialization circuit writes a first initialization voltage into the connection node under control of an initialization control signal, thereby the first initialization voltage is written to the control terminal of the drive circuit, so that the drive circuit can control communication between a first terminal of the drive circuit and a second terminal of the drive circuit at beginning of the data write phase.

In the data write phase, the first control circuit controls communication between the control terminal of the drive circuit and the connection node under control of the first scan signal, and a compensation control circuit controls communication between the connection node and the first terminal of the drive circuit under control of a second scan signal, so that the control terminal of the drive circuit communicates with the first terminal of the drive circuit.

In the driving method described in the embodiment of the present disclosure, the first control circuit controls communication between the control terminal of the drive circuit and the connection node, the first initialization circuit writes the first initialization voltage into the connection node under control of the initialization control signal, the compensation control circuit controls communication between the connection node and the first terminal of the drive circuit under control of the second scan signal. The first control circuit is directly electrically connected with the control terminal of the drive circuit, the first initialization circuit and the compensation control circuit are not directly electrically connected with the control terminal of the drive circuit, so as to reduce a leakage path of a first node (a node electrically connected with the control terminal of the drive circuit), to ensure stability of a voltage of the first node when working at a low frequency, which is beneficial to improve display quality, improve display uniformity, and reduce flicker.

In specific implementation, the pixel circuit may further include a reset circuit. The driving method further includes: in the initialization phase, the reset circuit writes a reset voltage to the second terminal of the drive circuit under control of a third scan signal.

Optionally, the pixel circuit may further include a light emitting element and a second initialization circuit. The driving method further includes: the second initialization circuit writes a second initialization voltage to a first electrode of the light emitting element under control of a fourth scan signal to control the light emitting element not to emit light.

In specific implementation, the pixel circuit further includes a light emitting control circuit, a data write circuit, and an energy storage circuit, a display period includes a light emitting phase set after the data write phase, and the driving method further includes following contents.

In the data write phase, the data write circuit writes a data voltage Vdata on a data line to a second terminal of a drive circuit under control of a second scan signal.

At beginning of the data write phase, the drive circuit controls communication between a first terminal of the drive circuit and a second terminal of the drive circuit to charge the energy storage circuit through the data voltage Vdata, and changes a potential of a control terminal of the drive circuit until a potential of the control terminal of the drive circuit becomes Vdata+Vth, wherein Vth is a threshold voltage of a drive transistor included in the drive circuit.

In the light emitting phase, a light emitting control circuit controls communication between a first voltage line and the second terminal of the drive circuit under control of a light emitting control signal, and controls communication between the first terminal of the drive circuit and a first electrode of a light emitting element, and the drive circuit drives the light emitting element to emit light.

The display apparatus described in the embodiment of the present disclosure includes the above pixel circuit.

Optionally, the pixel circuit includes a reset circuit electrically connected with a third scan line and a second initialization circuit electrically connected with the fourth scan line. The display apparatus further includes a third scan signal generation module and a fourth scan signal generation module.

The third scan signal generation module is electrically connected with the third scan line, and configured to provide a third scan signal to the third scan line.

The fourth scan signal generation module is electrically connected with the fourth scan line, and configured to provide a fourth scan signal to the fourth scan line.

In at least one embodiment of the present disclosure, the third scan signal and the fourth scan signal may be a same scan signal, and the third scan signal generation module and the fourth scan signal generation module may be a same module.

Figure 59:
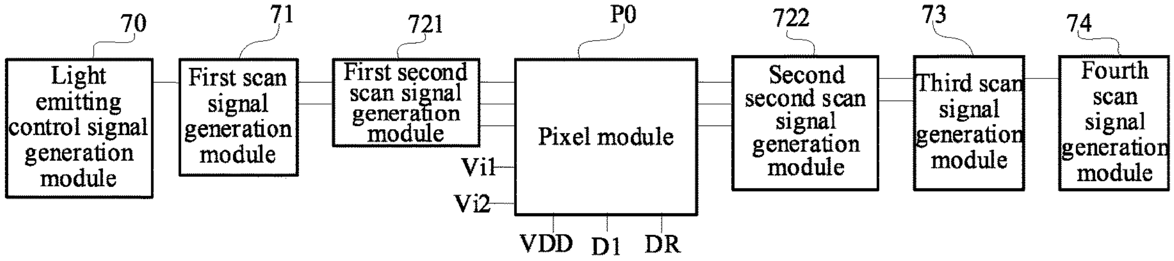
FIG. 59 is a schematic diagram of a structure of a display apparatus according to at least one embodiment of the present disclosure.

As shown in FIG. 59, the display apparatus described in at least one embodiment of the present disclosure includes a display panel, the display panel includes a pixel module P0, and the pixel module P0 includes multiple rows and multiple columns of the above pixel circuits. The pixel module P0 is disposed in a valid display region of the display panel.

The display panel further includes a light emitting control signal generation module 70, a first scan signal generation module 71, a first second scan signal generation module 721, a second second scan signal generation module 722, a third scan signal generation module 73, and a fourth scan signal generation module 74.

The light emitting control signal generation module 70 is configured to provide a light emitting control signal, the first scan signal generation module 71 is configured to provide a first scan signal, the first second scan signal generation module 721 and the second second scan signal generation module 722 are configured to provide a second scan signal, the third scan signal generation module 73 is configured to provide a third scan signal, and the fourth scan signal generation module 74 is configured to provide a fourth scan signal.

The light emitting control signal generation module 70, the first scan signal generation module 71, and the first second scan signal generation module 721 are disposed on a left side of the display panel.

The second second scan signal generation module 722, the third scan signal generation module 73, and the fourth scan signal generation module 74 are disposed on a right side of the display panel.

Figure 60:
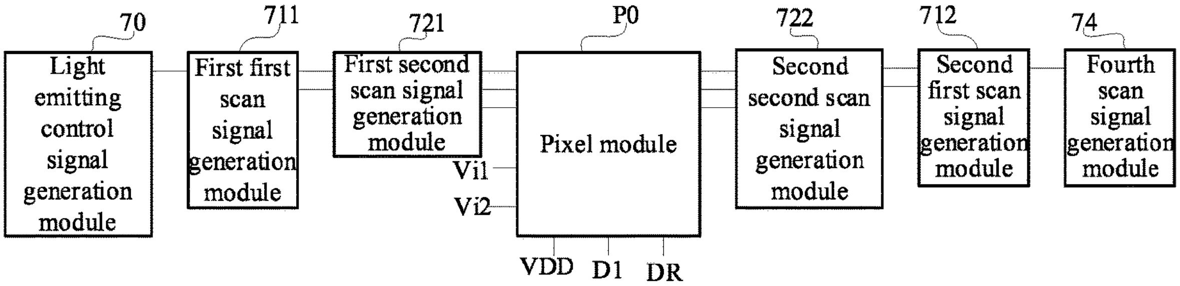
FIG. 60 is a schematic diagram of a structure of a display apparatus according to at least another embodiment of the present disclosure.

As shown in FIG. 60, the display apparatus described in at least one embodiment of the present disclosure includes a display panel, the display panel includes a pixel module P0, and the pixel module P0 includes multiple rows and multiple columns of the above pixel circuits. The pixel module P0 is disposed in a valid display region of the display panel.

The display panel further includes a light emitting control signal generation module 70, a first first scan signal generation module 711, a second first scan signal generation module 712, a first second scan signal generation module 721, a second second scan signal generation module 722, and a fourth scan signal generation module 74.

The light emitting control signal generation module 70 is configured to provide a light emitting control signal, the first first scan signal generation module 711, and the second first scan signal generation module 712 are configured to provide a first scan signal, and the first second scan signal generation module 721 and the second second scan signal generation module 722 are configured to provide a second scan signal.

The third scan signal and the fourth scan signal are a same scan signal.

The fourth scan signal generation module 74 is configured to provide a third scan signal and a fourth scan signal.

The light emitting control signal generation module 70, the first first scan signal generation module 711, and the first second scan signal generation module 721 are disposed on a left side of the display panel.

The second first scan signal generation module 712, the second second scan signal generation module 722, and the fourth scan signal generation module 74 are disposed on a right side of the display panel.

In FIG. 55 and FIG. 56, a first initialization voltage is labeled Vi1, a second initialization voltage is labeled Vi2, a high voltage signal is labeled VDD, a data line is labeled D1, and a reset voltage line is labeled DR.

The display apparatus provided by the embodiment of the present disclosure may be a mobile phone, a tablet computer, a television, a display, a notebook computer, a digital photo frame, a navigator, or any product or component with a display function.

As shown in FIG. 61 to FIG. 78, FIG. 61 to FIG. 78 are illustrative drawings of pixel drive circuits according to another set of exemplary embodiments of the present disclosure.

Transistors used in all embodiments of the present disclosure may be triodes, thin film transistors, field effect transistors, or other devices with same characteristics. In an embodiment of the present disclosure, in order to distinguish two electrodes of a transistor except a gate, one electrode of the two electrodes is directly described as a first electrode, and the other electrode is directly described as a second electrode.

In actual operation, when the transistor is a thin film transistor or a field effect transistor, the first electrode may be a drain and the second electrode may be a source. Or, the first electrode may be a source and the second electrode may be a drain.

The pixel circuit described in the embodiment of the present disclosure includes a drive circuit, a first initialization circuit, and a reset circuit.

The first initialization circuit is electrically connected with an initialization control line, a first terminal of the drive circuit, and a first initialization voltage terminal respectively, and is configured to write a first initialization voltage provided by the first initialization voltage terminal to the first terminal of the drive circuit under control of an initialization control signal provided by the initialization control line.

The reset circuit is electrically connected with a second scan line and a reset voltage terminal respectively, the reset circuit is also electrically connected with a second terminal of the drive circuit or the first terminal of the drive circuit, and configured to control to write a reset voltage provided by the reset voltage terminal to the second terminal of the drive circuit or the first terminal of the drive circuit under control of a second scan signal provided by the second scan line.

The drive circuit is configured to control communication between the first terminal of the drive circuit and the second terminal of the drive circuit under control of a potential of a control terminal of the drive circuit.

The pixel circuit according to at least one embodiment of the present disclosure includes the first initialization circuit and the reset circuit, the first initialization circuit writes the first initialization voltage to the first terminal of the drive circuit before the data voltage is written to the second terminal of the drive circuit so as to write the first initialization voltage to the control terminal of the drive circuit in cooperation with a compensation control circuit included in the pixel circuit. The reset circuit writes the reset voltage to the second terminal of the drive circuit or the first terminal of the drive circuit under control of the second scan signal, in a non-light-emitting period before the data voltage is written to the second terminal of the drive circuit, to provide a bias voltage to a drive transistor in the drive circuit (at this time a potential of a gate of the drive transistor is also initialized to Vi1), so that the drive transistor remains in a reset state, so as to improve a hysteresis phenomenon of the drive transistor and facilitate First Frame Response time (FFR) of a display screen.

In specific implementation, hysteresis of the drive transistor will cause a characteristic response of the drive transistor to be slow, and in at least one embodiment of the present disclosure, a gate-source voltage of the drive transistor can be quickly reset before the data voltage is written, which is beneficial to speed up a recovery speed of the drive transistor, thereby improving the hysteresis phenomenon of the drive transistor and improving a hysteresis recovery speed.

In at least one embodiment of the present disclosure, the second scan signal may be provided to the second scan line through a separate second scan signal generation module to facilitate reset of a potential of the second terminal of the drive circuit.

In at least one embodiment of the present disclosure, the reset voltage is a constant voltage to provide a fixed bias voltage for the drive transistor to improve the hysteresis phenomenon.

Optionally, the first initialization voltage is a low potential constant voltage, and a voltage value of the first initialization voltage is greater than or equal to −6 V and less than or equal to −2 V. For example, the voltage value of the first initialization voltage may be −6 V, −5 V, −4 V, −3 V, or −2 V, but not limited to this.

In specific implementation, the reset voltage may be a high potential constant voltage to ensure that the drive transistor in the drive circuit can be quickly turned on at beginning of the data write phase. A voltage value of the reset voltage is greater than or equal to 4 V and less than or equal to 10 V; or, the reset voltage may be a low potential constant voltage, a voltage value of the reset voltage is greater than or equal to −6 V and less than or equal to −2 V.

Optionally, when the reset voltage is a high potential constant voltage, a voltage value of the reset voltage may be, for example, 4 V, 5 V, 6 V, 7 V, 8 V, 9 V, or 10 V, but not limited to this.

When the reset voltage is a low potential constant voltage, a voltage value of the reset voltage may be, for example, −6 V, −5 V, −4 V, −3 V, or −2 V, but not limited to this.

In at least one embodiment of the present disclosure, when the reset voltage is a low potential constant voltage, the voltage value of the reset voltage is substantially the same as the voltage value of the first initialization voltage, so that when the first initialization voltage is written to the first terminal of the drive circuit through the first initialization circuit while the reset voltage is written to the second terminal of the drive circuit through the reset circuit, the drive transistor in the drive circuit does not fail.

The voltage value of the reset voltage is substantially the same as the voltage value of the first initialization voltage, which means that an absolute value of a difference between the voltage value of the reset voltage and the voltage value of the first initialization voltage is less than a predetermined voltage difference value. For example, the predetermined voltage difference value may be 0.1 V or 0.05 V, but not limited to this.

In at least one embodiment of the present disclosure, the threshold voltage Vth of the drive transistor in the drive circuit may be greater than or equal to −5 V and less than or equal to −2 V, and preferably, Vth may be greater than or equal to −4 V and less than or equal to −2.5 V. For example, Vth may be −4 V, −3.5 V, −3 V, or −2.5 V, but not limited to this.

Optionally, the drive circuit includes a drive transistor, and an absolute value of the voltage value of the reset voltage is greater than 1.5 times of an absolute value of a threshold voltage, so as to ensure that a bias effect can be quickly achieved in a short time. The threshold voltage is a threshold voltage of the drive transistor. For example, the absolute value of the voltage value of the reset voltage may be greater than 2 times, 2.5 times, or 3 times of the absolute value of the threshold voltage, but not limited to this.

Figure 61:
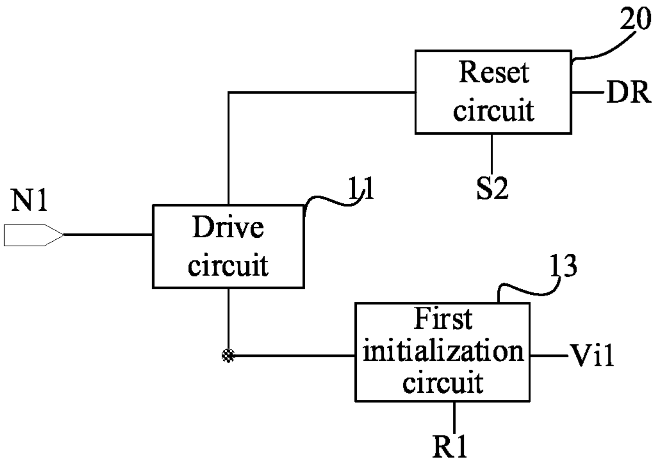
FIG. 61 is a schematic diagram of a structure of a pixel circuit according to at least yet another embodiment of the present disclosure.

As shown in FIG. 61, a pixel circuit described in an embodiment of the present disclosure includes a drive circuit 11, a first initialization circuit 13, and a reset circuit 20.

The first initialization circuit 13 is electrically connected with an initialization control line R1, a first terminal of the drive circuit 11, and a first initialization voltage terminal respectively, and configured to write a first initialization voltage Vi1 provided by the first initialization voltage terminal to the first terminal of the drive circuit 11 under control of an initialization control signal provided by the initialization control line R1.

The reset circuit 20 is electrically connected with a second scan line S2 and a reset voltage terminal DR respectively, and is also electrically connected with a second terminal of the drive circuit 11, and configured to control a reset voltage provided by the reset voltage terminal DR to be written to the second terminal of the drive circuit 11 under control of a second scan signal provided by the second scan line S2.

The drive circuit 11 is configured to control communication between the first terminal of the drive circuit 11 and the second terminal of the drive circuit 12 under control of a potential of a control terminal of the drive circuit 11.

In FIG. 61, a first node is labeled N1, and the first node is electrically connected with the control terminal of the drive circuit 11.

When the pixel circuit according to at least one embodiment of the present disclosure as shown in FIG. 61 is working, a display period may include an initialization phase and a reset phase.

In the initialization phase, the first initialization circuit 13 writes the first initialization voltage Vi1 to the first terminal of the drive circuit 11 under control of the initialization control signal.

In the reset phase, the reset circuit 20 writes the reset voltage to the second terminal of the drive circuit 11 under control of the second scan signal.

Figure 62:
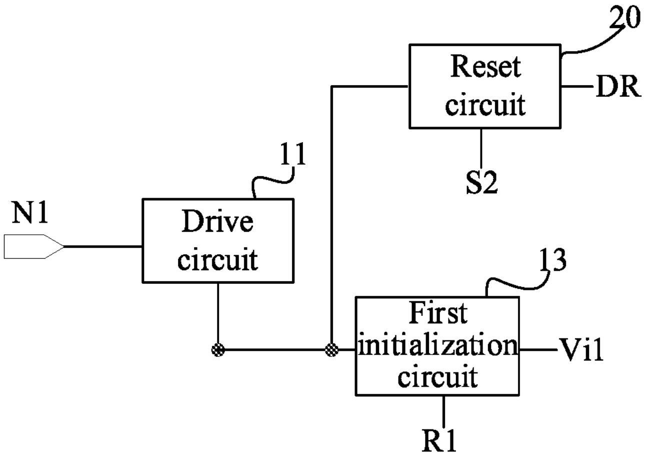
FIG. 62 is a schematic diagram of a structure of a pixel circuit according to at least yet another embodiment of the present disclosure.

As shown in FIG. 62, a pixel circuit described in at least one embodiment of the present disclosure may include a drive circuit 11, a first initialization circuit 13, and a reset circuit 20.

The first initialization circuit 13 is electrically connected with an initialization control line R1, a first terminal of the drive circuit 11, and a first initialization voltage terminal respectively, and configured to write a first initialization voltage Vi1 provided by the first initialization voltage terminal to the first terminal of the drive circuit 11 under control of an initialization control signal provided by the initialization control line R1.

The reset circuit 20 is electrically connected with a second scan line S2 and a reset voltage terminal DR respectively, the reset circuit 20 is also electrically connected with the first terminal of the drive circuit 11, and configured to control to write a reset voltage provided by the reset voltage terminal DR to the first terminal of the drive circuit 11 under control of a second scan signal provided by the second scan line S2.

When the pixel circuit according to at least one embodiment of the present disclosure as shown in FIG. 62 is working, a display period may include an initialization phase and a reset phase.

In the initialization phase, the first initialization circuit 13 writes the first initialization voltage Vi1 to the first terminal of the drive circuit 11 under control of the initialization control signal.

In the reset phase, the reset circuit 20 writes the reset voltage to the first terminal of the drive circuit 11 under control of the second scan signal.

Optionally, the first initialization circuit includes a second transistor.

A control electrode of the second transistor is electrically connected with the initialization control line, a first electrode of the second transistor is electrically connected with the first initialization voltage terminal, and a second electrode of the second transistor is electrically connected with the first terminal of the drive circuit.

In at least one embodiment of the present disclosure, the second transistor may be a low temperature poly silicon thin film transistor, but not limited to this.

Optionally, the reset circuit includes a third transistor.

A control electrode of the third transistor is electrically connected with the second scan line, a first electrode of the third transistor is electrically connected with the reset voltage terminal, and a second electrode of the third transistor is electrically connected with the second terminal of the drive circuit or the first terminal of the drive circuit.

In at least one embodiment of the present disclosure, the pixel circuit may include a compensation control circuit.

The compensation control circuit is electrically connected with a first scan line, a control terminal of the drive circuit, and a first terminal of the drive circuit respectively, and configured to control communication between the control terminal of the drive circuit and the first terminal of the drive circuit under control of a first scan signal provided by the first scan line.

When the pixel circuit described in at least one embodiment of the present disclosure is working, the display period may include the initialization phase. In the initialization phase, the first initialization circuit writes the first initialization voltage into the first terminal of the drive circuit under control of the initialization control signal, and the compensation control circuit controls communication between the control terminal of the drive circuit and the first terminal of the drive circuit under control of the first scan signal, to write the first initialization voltage to the control terminal of the drive circuit, so that at beginning of the data write phase, the drive circuit can control communication between the first terminal of the drive circuit and the second terminal of the drive transistor under control of a potential of the control terminal of the drive circuit.

In the pixel circuit described in at least one embodiment of the present disclosure, the control terminal of the drive circuit is only directly electrically connected with the compensation control circuit, the first initialization circuit is directly electrically connected with the first terminal of the drive circuit, so as to initialize the potential of the control terminal of the drive circuit through the compensation control circuit and the first initialization circuit and to reduce a leakage path of the control terminal of the drive circuit. Under a condition that design complexity of the pixel circuit is not obviously increased, stability of a voltage of a first node may be ensured, which is beneficial to improve display quality, improve display uniformity, and reduce flicker.

Optionally, the compensation control circuit includes a first transistor.

A control electrode of the first transistor is electrically connected with the first scan line, a first electrode of the first transistor is electrically connected with the control terminal of the drive circuit, and a second electrode of the first transistor is electrically connected with the first terminal of the drive circuit.

The first transistor is an oxide thin film transistor.

In the embodiment of the present disclosure, the compensation control circuit may include a first transistor which is an oxide thin film transistor. An oxide transistor has good hysteresis characteristics, a low leakage current, and a relatively low mobility. Therefore, according to at least one embodiment of the present disclosure, the first transistor is set as the oxide thin film transistor to achieve a low leakage current and ensure stability of the potential of the control terminal of the drive circuit.

Figure 63:
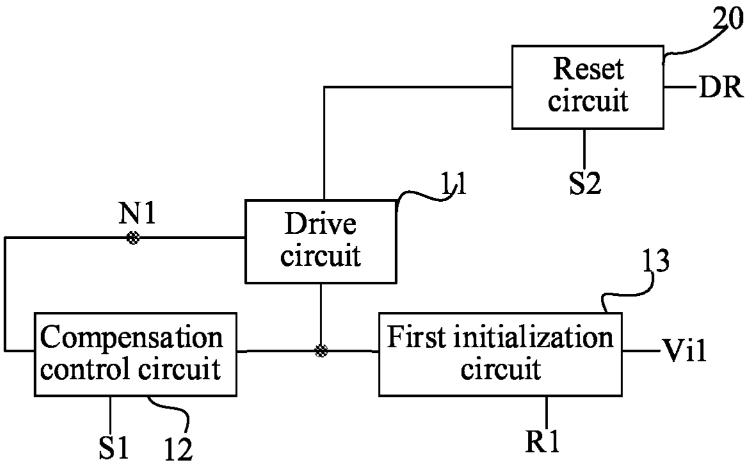
FIG. 63 is a schematic diagram of a structure of a pixel circuit according to at least yet another embodiment of the present disclosure.

As shown in FIG. 63, on a basis of at least one embodiment of the pixel circuit shown in FIG. 61 the pixel circuit described in at least one embodiment of the present disclosure may further include a compensation control circuit 12.

The compensation control circuit 12 is electrically connected with a first scan line S1, a control terminal of the drive circuit 11, and a first terminal of the drive circuit 11 respectively, and configured to control communication between the control terminal of the drive circuit 11 and the first terminal of the drive circuit 11 under control of a first scan signal provided by the first scan line S1.

When the pixel circuit according to at least one embodiment of the present disclosure as shown in FIG. 63 is working, a display period may include an initialization phase in which the compensation control circuit 12 controls communication between the control terminal of the drive circuit 11 and the first terminal of the drive circuit 11 under control of the first scan signal.

Figure 64:
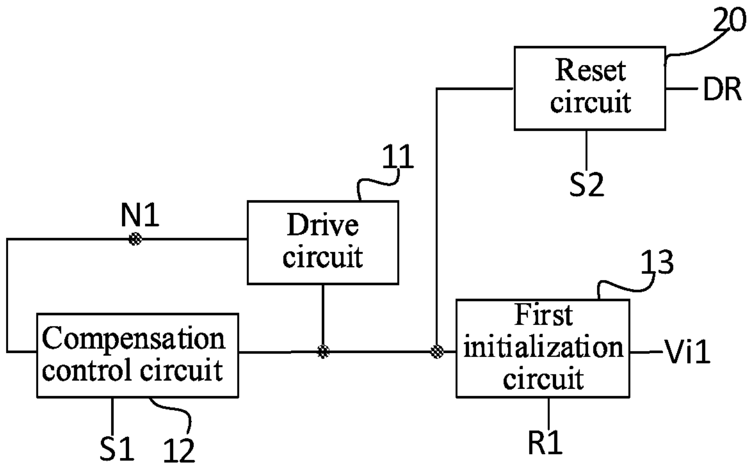
FIG. 64 is a schematic diagram of a structure of a pixel circuit according to at least yet another embodiment of the present disclosure.

As shown in FIG. 64, based on at least one embodiment of the pixel circuit shown in FIG. 62, the pixel circuit described in at least one embodiment of the present disclosure may further include a compensation control circuit 12.

The compensation control circuit 12 is electrically connected with a first scan line S1, a control terminal of the drive circuit 11 and a first terminal of the drive circuit 11 respectively, and configured to control communication between the control terminal of the drive circuit 11 and the first terminal of the drive circuit 11 under control of a first scan signal provided by the first scan line S1.

When the pixel circuit according to at least one embodiment of the present disclosure as shown in FIG. 64 is working, a display period may include an initialization phase in which the compensation control circuit 12 controls communication between the control terminal of the drive circuit 11 and the first terminal of the drive circuit 11 under control of the first scan signal.

In at least one embodiment of the present disclosure, the pixel circuit may further include a light emitting element, an energy storage circuit, a second initialization circuit, a data write circuit, and a light emitting control circuit.

The energy storage circuit is electrically connected with the control terminal of the drive circuit, and configured to store electrical energy; The second initialization circuit is electrically connected with a third scan line, a second initialization voltage terminal, and a first electrode of the light emitting element respectively, and is configured to write a second initialization voltage provided by the second initialization voltage terminal to the first electrode of the light emitting element under control of a third scan signal provided by the third scan line.

The data write circuit is electrically connected with a fourth scan line, a data line, and the second terminal of the drive circuit respectively, and is configured to write a data voltage provided by the data line to the second terminal of the drive circuit under control of a fourth scan signal provided by the fourth scan line.

The light emitting control circuit is electrically connected with a light emitting control line, a first voltage terminal, the second terminal of the drive circuit, the first terminal of the drive circuit, and the first electrode of the light emitting element respectively, and is configured to control communication between the first voltage terminal and the second terminal of the drive circuit and control communication between the first terminal of the drive circuit and the first electrode of the light emitting element under control of a light emitting control signal provided by the light emitting control line.

A second electrode of the light emitting element is electrically connected with a second voltage terminal.

In at least one embodiment of the present disclosure, the pixel circuit may also include a light emitting element, an energy storage circuit, a second initialization circuit, a data write circuit, and a light emitting control circuit. The second initialization circuit initializes a first electrode of the light emitting element, the data write circuit writes a data voltage to a second terminal of a drive circuit, and the light emitting control circuit controls communication between a first voltage terminal and the second terminal of the drive circuit and controls communication between a first terminal of the drive circuit and the first electrode of the light emitting element under control of a light emitting control signal.

Optionally, the light emitting element may be an organic light emitting diode, the first electrode of the light emitting element may be an anode of the organic light emitting diode, and a second electrode of the light emitting element may be a cathode of the organic light emitting diode.

The first voltage terminal may be a high voltage terminal and the second voltage terminal may be a low voltage terminal, but not limited to this.

Figure 65:
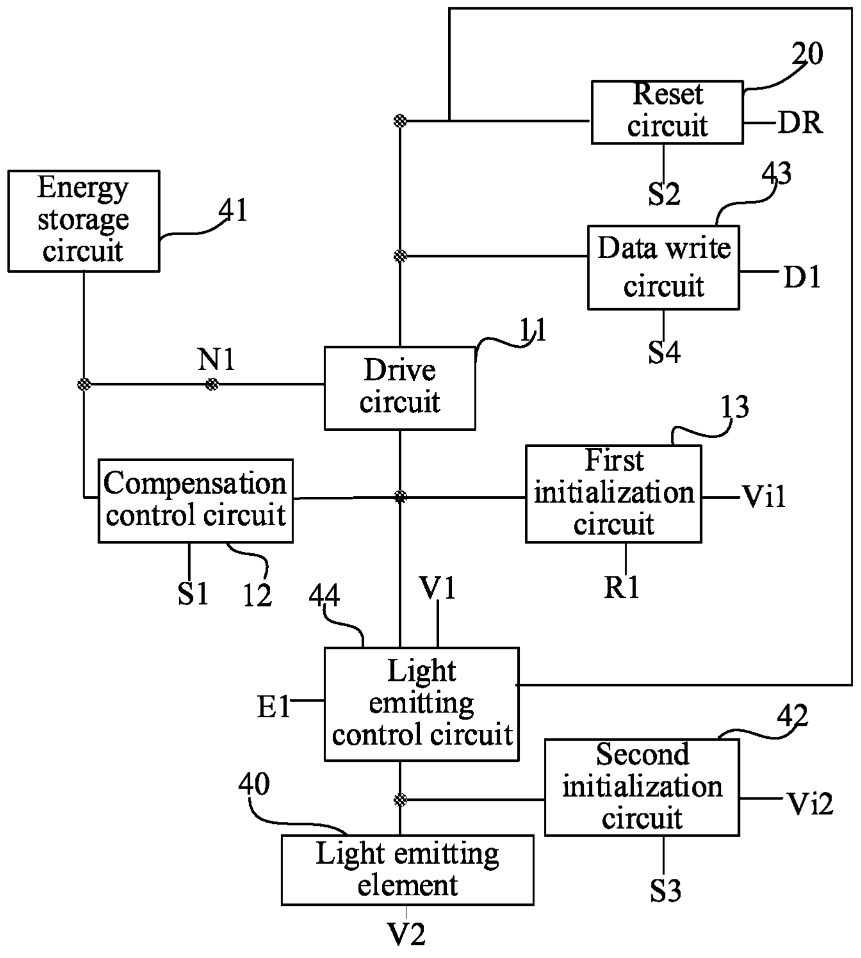
FIG. 65 is a schematic diagram of a structure of a pixel circuit according to at least yet another embodiment of the present disclosure.

As shown in FIG. 65, on a basis of at least one embodiment of the pixel circuit shown in FIG. 63, the pixel circuit described in at least one embodiment of the present disclosure may further include a light emitting element 40, an energy storage circuit 41, a second initialization circuit 42, a data write circuit 43, and a light emitting control circuit 44.

The energy storage circuit 41 is electrically connected with a control terminal of the drive circuit 11, and configured to store electrical energy.

The second initialization circuit 42 is electrically connected with a third scan line S3, a second initialization voltage terminal, and a first electrode of the light emitting element 40 respectively, and configured to write a second initialization voltage Vi2 provided by the second initialization voltage terminal to the first electrode of the light emitting element 40 under control of a third scan signal provided by the third scan line S3.

The data write circuit 43 is electrically connected with a fourth scan line S4, a data line D1, and a second terminal of the drive circuit 11 respectively, and configured to write a data voltage provided by the data line D1 to a second terminal of the drive circuit 11 under control of a fourth scan signal provided by the fourth scan line S4.

The light emitting control circuit 44 is electrically connected with a light emitting control line E1, a first voltage terminal V1, the second terminal of the drive circuit 11, a first terminal of the drive circuit 11, and a first electrode of the light emitting element 40 respectively, and configured to control communication between the first voltage terminal V1 and the second terminal of the drive circuit 11 and control communication between the first terminal of the drive circuit 11 and the first electrode of the light emitting element 40 under control of a light emitting control signal provided by the light emitting control line E1.

A second electrode of the light emitting element 40 is electrically connected with a second voltage terminal V2.

When the pixel circuit according to at least one embodiment of the present disclosure shown in FIG. 65 is working, a display period further includes a data write phase and a light emitting phase set after the initialization phase.

In the data write phase, the data write circuit 43 writes a data voltage Vdata provided by the data line D1 to the second terminal of the drive circuit 11 under control of the fourth scan signal. The compensation control circuit 12 controls communication between the control terminal of the drive circuit 11 and the first terminal of the drive circuit 11 under control of the first scan signal.

At beginning of the data write phase, the drive circuit 11 turns on a connection between the first terminal of the drive circuit 11 and the second terminal of the drive circuit 11 under control of the control terminal of the drive circuit 11, to charge the energy storage circuit 41 through the data voltage Vdata, thereby changing a potential of the control terminal of the drive circuit 11 until the potential of the control terminal of the drive circuit 11 becomes Vdata+Vth, wherein Vth is a threshold voltage of a drive transistor included in the drive circuit 11.

In the light emitting phase, the light emitting control circuit 44 controls communication between the first voltage terminal V1 and the second terminal of the drive circuit 11 and controls communication between the first terminal of the drive circuit 11 and the first electrode of the light emitting element 40 under control of the light emitting control signal, and the drive circuit 11 drives the light emitting element 40 to emit light.

In specific implementation, the reset phase may be set between the initialization phase and the data write phase, but not limited to this.

Figure 66:
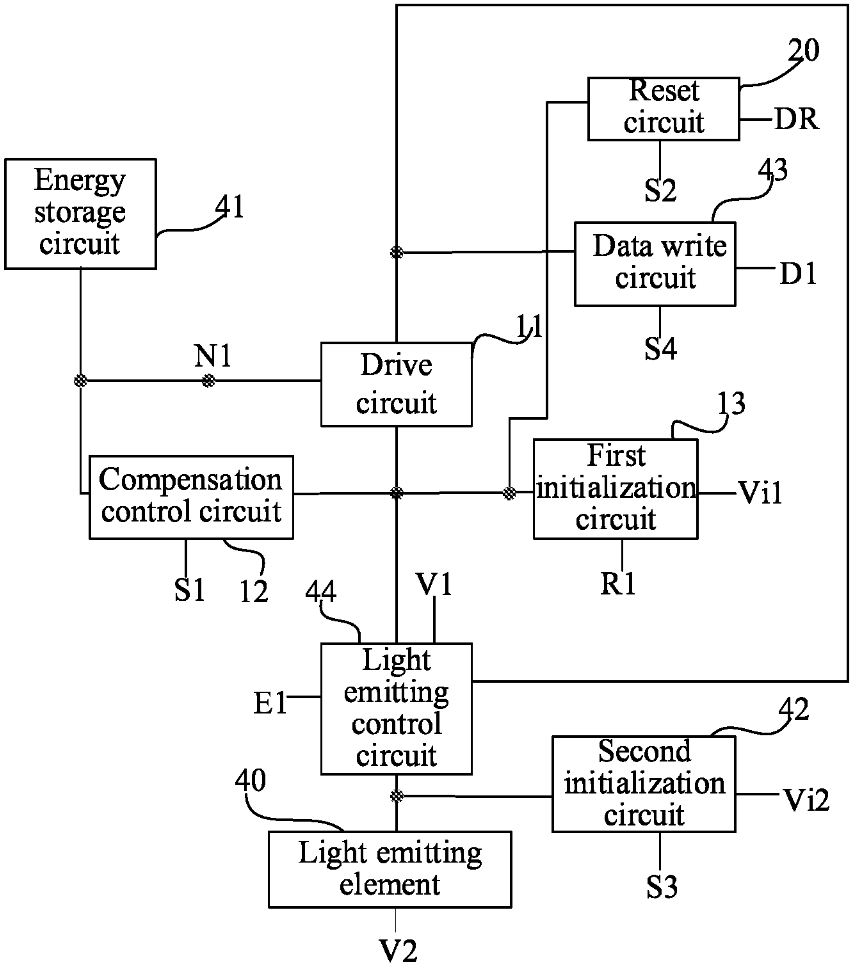
FIG. 66 is a schematic diagram of a structure of a pixel circuit according to at least yet another embodiment of the present disclosure.

As shown in FIG. 66, on a basis of at least one embodiment of the pixel circuit shown in FIG. 64, the pixel circuit described in at least one embodiment of the present disclosure may further include a light emitting element 40, an energy storage circuit 41, a second initialization circuit 42, a data write circuit 43, and a light emitting control circuit 44.

The energy storage circuit 41 is electrically connected with a control terminal of the drive circuit 11, and configured to store electrical energy.

The second initialization circuit 42 is electrically connected with a third scan line S3, a second initialization voltage terminal, and a first electrode of the light emitting element 40 respectively, and configured to write a second initialization voltage Vi2 provided by the second initialization voltage terminal to the first electrode of the light emitting element 40 under control of a third scan signal provided by the third scan line S3.

The data write circuit 43 is electrically connected with a fourth scan line S4, a data line D1, and a second terminal of the drive circuit 11 respectively, and configured to write a data voltage provided by the data line D1 to the second terminal of the drive circuit 11 under control of a fourth scan signal provided by the fourth scan line S4.

The light emitting control circuit 44 is electrically connected with a light emitting control line E1, a first voltage terminal V1, the second terminal of the drive circuit 11, the first terminal of the drive circuit 11, and the first electrode of the light emitting element 40 respectively, and configured to control communication between the first voltage terminal V1 and the second terminal of the drive circuit 11 and control communication between the first terminal of the drive circuit 11 and the first electrode of the light emitting element 40 under control of a light emitting control signal provided by the light emitting control line E1.

A second electrode of the light emitting element 40 is electrically connected with a second voltage terminal V2.

When the pixel circuit according to at least one embodiment of the present disclosure shown in FIG. 66 is working, a display period further includes a data write phase and a light emitting phase set after the initialization phase.

In the data write phase, the data write circuit 43 writes a data voltage Vdata provided by the data line D1 to the second terminal of the drive circuit 11 under control of the fourth scan signal. The compensation control circuit 12 controls communication between the control terminal of the drive circuit 11 and the first terminal of the drive circuit 11 under control of the first scan signal.

At beginning of the data write phase, the drive circuit 11 turns on a connection between the first terminal of the drive circuit 11 and the second terminal of the drive circuit 11 under control of the control terminal of the drive circuit 11, to charge the energy storage circuit 41 through the data voltage Vdata, thereby changing a potential of the control terminal of the drive circuit 11 until the potential of the control terminal of the drive circuit 11 becomes Vdata+Vth, wherein Vth is a threshold voltage of a drive transistor included in the drive circuit 11.

In the light emitting phase, the light emitting control circuit 44 controls communication between the first voltage terminal V1 and the second terminal of the drive circuit 11 and controls communication between the first terminal of the drive circuit 11 and the first electrode of the light emitting element 40 under control of the light emitting control signal, and the drive circuit 11 drives the light emitting element 40 to emit light.

Figure 67:
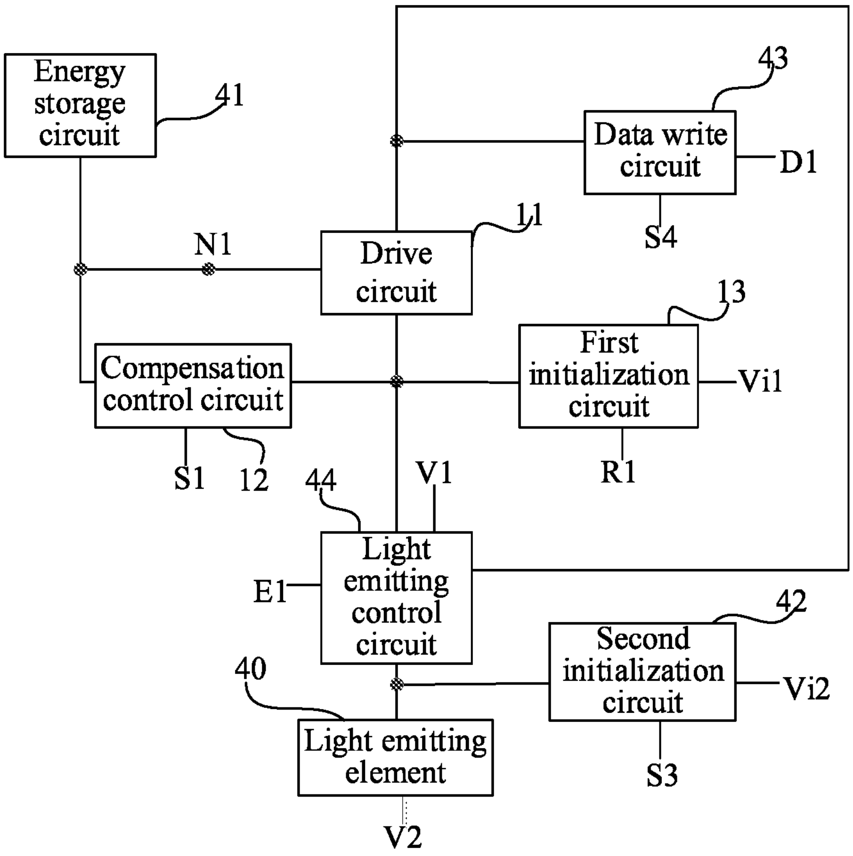
FIG. 67 is a schematic diagram of a structure of a pixel circuit according to at least yet another embodiment of the present disclosure.

As shown in FIG. 67, the pixel circuit described in at least one embodiment of the present disclosure may include a drive circuit 11, a compensation control circuit 12, a first initialization circuit 13, a light emitting element 40, an energy storage circuit 41, a second initialization circuit 42, a data write circuit 43, and a light emitting control circuit 44.

The compensation control circuit 12 is electrically connected with a first scan line S1, a control terminal of the drive circuit 11, and a first terminal of the drive circuit 11 respectively, and configured to control communication between the control terminal of the drive circuit 11 and the first terminal of the drive circuit 11 under control of a first scan signal provided by the first scan line S1.

The first initialization circuit 13 is electrically connected with an initialization control line R1, the first terminal of the drive circuit 11, and a first initialization voltage terminal respectively, and configured to write a first initialization voltage Vi1 provided by the first initialization voltage terminal to the first terminal of the drive circuit 11 under control of an initialization control signal provided by the initialization control line R1.

The drive circuit 11 is configured to control communication between the first terminal of the drive circuit 11 and the second terminal of the drive circuit 12 under control of a potential of the control terminal of the drive circuit 12.

The energy storage circuit 41 is electrically connected with the control terminal of the drive circuit 11, and configured to store electrical energy.

The second initialization circuit 42 is electrically connected with a third scan line S3, a second initialization voltage terminal, and the first electrode of the light emitting element 40 respectively, and configured to write a second initialization voltage Vi2 provided by the second initialization voltage terminal to the first electrode of the light emitting element 40 under control of a third scan signal provided by the third scan line S3.

The data write circuit 43 is electrically connected with a fourth scan line S4, a data line D1, and the second terminal of the drive circuit 11 respectively, and configured to write a data voltage provided by the data line D1 to the second terminal of the drive circuit 11 under control of a fourth scan signal provided by the fourth scan line S4.

The light emitting control circuit 44 is electrically connected with a light emitting control line E1, a first voltage terminal V1, the second terminal of the drive circuit 11, the first terminal of the drive circuit 11, and the first electrode of the light emitting element 40 respectively, and configured to control communication between the first voltage terminal V1 and the second terminal of the drive circuit 11 and control communication between the first terminal of the drive circuit 11 and the first electrode of the light emitting element 40 under control of a light emitting control signal provided by the light emitting control line E1.

A second electrode of the light emitting element is electrically connected with a second voltage terminal V2.

When the pixel circuit according to at least one embodiment of the present disclosure shown in FIG. 67 is working, a display period includes an initialization phase, a data write phase, and a light emitting phase which are set sequentially.

In the initialization phase, the first initialization circuit 13 writes a first initialization voltage Vi1 to the first terminal of the drive circuit 11 under control of an initialization control signal. The compensation control circuit 12 controls communication between the control terminal of the drive circuit 11 and the first terminal of the drive circuit 11 under control of a first scan signal, to write the first initialization voltage Vi1 to the control terminal of the drive circuit 11, so that the drive circuit 11 can control communication between the first terminal of the drive circuit 11 and the second terminal of the drive transistor 11 under control of a potential of the control terminal of the drive circuit 11 at beginning of the data write phase.

In the data write phase, the data write circuit 43 writes a data voltage Vdata provided by the data line D1 to the second terminal of the drive circuit 11 under control of a fourth scan signal. The compensation control circuit 12 controls communication between the control terminal of the drive circuit 11 and the first terminal of the drive circuit 11 under control of a first scan signal.

At beginning of the data write phase, the drive circuit 11 turns on a connection between the first terminal of the drive circuit 11 and the second terminal of the drive circuit 11 under control of the control terminal of the drive circuit 11, to charge the energy storage circuit 41 through the data voltage Vdata, thereby changing a potential of the control terminal of the drive circuit 11 until the potential of the control terminal of the drive circuit 11 becomes Vdata+Vth, wherein Vth is a threshold voltage of a drive transistor included in the drive circuit 11.

In the light emitting phase, the light emitting control circuit 44 controls communication between the first voltage terminal V1 and the second terminal of the drive circuit 11 and controls communication between the first terminal of the drive circuit 11 and the first electrode of the light emitting element 40 under control of a light emitting control signal, and the drive circuit 11 drives the light emitting element 40 to emit light.

In at least one embodiment of the pixel circuits shown in FIG. 65, FIG. 66, and FIG. 67, the third scan signal may be provided to the third scan line S3 through a separate third scan signal generation module, which facilitates a degree of freedom of switching a switch frequency (the switch frequency is a switch frequency of a transistor included in the second initialization circuit) under low frequency flicker, but not limited to this. In specific implementation, the third scan signal and the fourth scan signal may be a same scan signal.

When a display panel to which the pixel circuit is applied works at a low frequency, when the light emitting control circuit 44 controls the first voltage terminal V1 to disconnect from the second terminal of the drive circuit 11, and controls the first terminal of the drive circuit 11 to disconnect from the first electrode of the light emitting element 40, flicker can be reduced by increasing a frequency of the third scan signal.

In at least one embodiment of the present disclosure, the second scan signal and the third scan signal may be a same scan signal, and the second scan signal generation module and the third scan signal generation module may be a same module, but not limited to this. In specific implementation, the second scan signal may be a different scan signal from the third scan signal.

When the pixel circuit according to at least one embodiment of the present disclosure shown in FIG. 65, FIG. 66, and FIG. 67 is working, in a non-light-emitting period, before the data voltage is written to the second terminal of the drive circuit 11, the second initialization circuit 42 writes the second initialization voltage Vi2 provided by the second initialization voltage terminal to the first electrode of the light emitting element 40 under control of the third scan signal provided by the third scan line S3, so as to control the light emitting element 40 not to emit light and clear a residual charge of the first electrode of the light emitting element 40.

In at least one embodiment of the present disclosure, a time interval between the initialization phase and the data write phase is greater than a predetermined time interval to improve the hysteresis phenomenon of the drive transistor and reduce high and low frequency flicker of the pixel circuit by initializing a potential of a gate of the drive transistor in advance.

In specific implementation, the predetermined time interval may be selected according to an actual situation.

In at least one embodiment of the pixel circuits shown in FIG. 65, FIG. 66, and FIG. 67 of the present disclosure, the initialization control signal provided by the initialization control line R1 and the fourth scan signal may be generated by a same fourth scan signal generation module, the fourth scan signal may be a fourth scan signal of an N-th stage generated by the fourth scan signal generation module, and the initialization control signal may be a fourth scan signal of an (N−M)-th stage generated by the fourth scan signal generation module to initialize the potential of the gate of the drive transistor in advance, N is a positive integer, M may be a positive integer greater than 6, for example, M may be 14, but not limited to this.

Optionally, the data write circuit includes a fourth transistor.

A control electrode of the fourth transistor is electrically connected with the fourth scan signal line, a first electrode of the fourth transistor is electrically connected with the data line, and a second electrode of the fourth transistor is electrically connected with the second terminal of the drive circuit.

The light emitting control circuit includes a fifth transistor and a sixth transistor.

A control electrode of the fifth transistor is electrically connected with the light emitting control line, a first electrode of the fifth transistor is electrically connected with the first voltage terminal, and a second electrode of the fifth transistor is electrically connected with the second terminal of the drive circuit.

A control terminal of the sixth transistor is electrically connected with the light emitting control line, a first electrode of the sixth transistor is electrically connected with the first terminal of the drive circuit, and a second electrode of the sixth transistor is electrically connected with the first electrode of the light emitting element.

The second initialization circuit includes a seventh transistor.

A control electrode of the seventh transistor is electrically connected with the third scan line, a first electrode of the seventh transistor is electrically connected with the second initialization voltage terminal, and a second electrode of the seventh transistor is electrically connected with the first electrode of the light emitting element.

The drive circuit includes a drive transistor. A control electrode of the drive transistor is electrically connected with the control terminal of the drive circuit, a first electrode of the drive transistor is electrically connected with the first terminal of the drive circuit, and a second electrode of the drive transistor is electrically connected with the second terminal of the drive circuit.

The energy storage circuit includes a storage capacitor. A first terminal of the storage capacitor is electrically connected with the control terminal of the drive circuit, and a second terminal of the storage capacitor is connected with the first voltage terminal.

Figure 68:
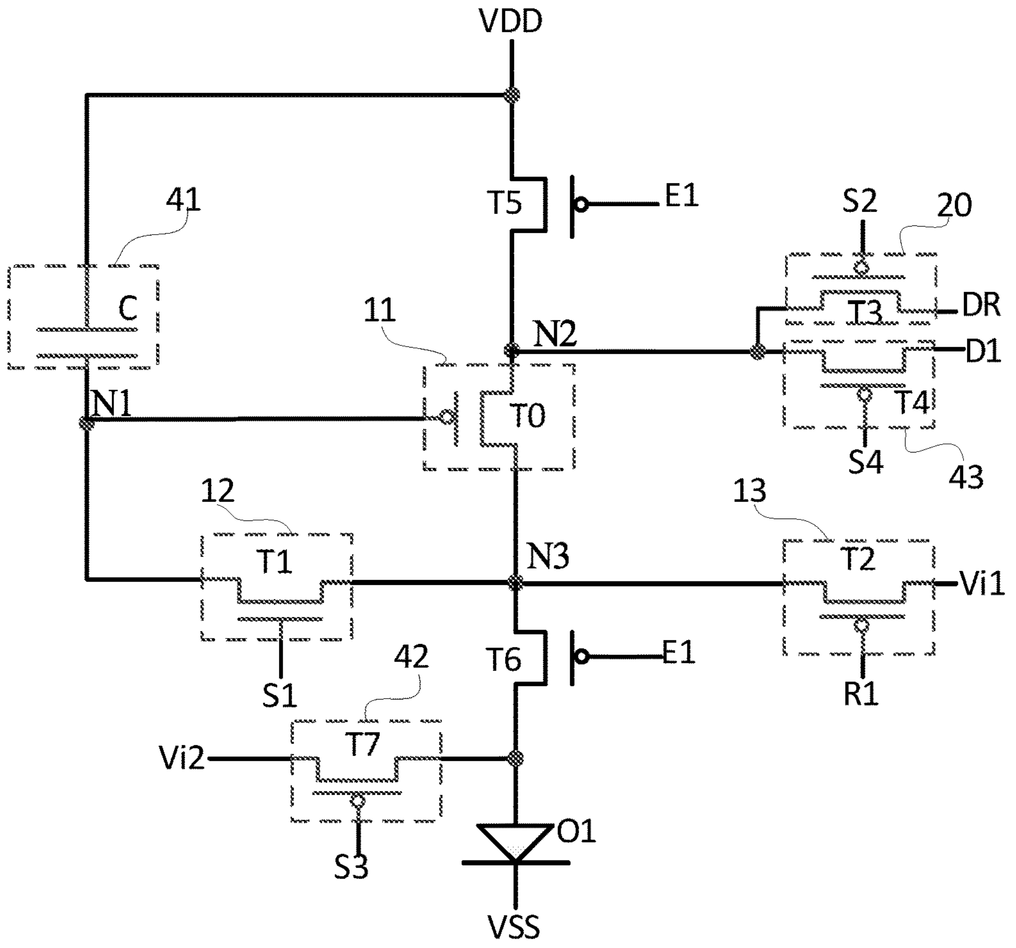
FIG. 68 is a circuit diagram of a pixel circuit according to at least yet another embodiment of the present disclosure.

As shown in FIG. 68, on a basis of at least one embodiment of the pixel circuit shown in FIG. 65, the light emitting element is an organic light emitting diode O1. The compensation control circuit 12 includes a first transistor T1. The drive circuit 11 includes a drive transistor T0.

A gate of the first transistor T1 is electrically connected with the first scan line S1, a drain of the first transistor T1 is electrically connected with a gate of the drive transistor T0, and a source of the first transistor T1 is electrically connected with a drain of the drive transistor T0.

The first initialization circuit 13 includes a second transistor T2.

A gate of the second transistor T2 is electrically connected with the initialization control line R1, a drain of the second transistor T2 is electrically connected with the first initialization voltage terminal, and a source of the second transistor T2 is electrically connected with the drain of the drive transistor T0. The first initialization voltage terminal is used for providing the first initialization voltage Vi1.

The reset circuit 20 includes a third transistor T3.

A gate of the third transistor T3 is electrically connected with the second scan line S2, a drain of the third transistor T3 is electrically connected with the reset voltage terminal DR, and a source of the third transistor T3 is electrically connected with the source of the drive transistor T0.

The data write circuit 43 includes a fourth transistor T4.

A gate of the fourth transistor T4 is electrically connected with the fourth scan line S4, a drain of the fourth transistor T4 is electrically connected with the data line D1, and a source of the fourth transistor T4 is electrically connected with the source of the drive transistor T0.

The light emitting control circuit includes a fifth transistor T5 and a sixth transistor T6.

A gate of the fifth transistor T5 is electrically connected with the light emitting control line E1, a drain of the fifth transistor T5 is electrically connected with a high voltage terminal, and a source of the fifth transistor T5 is electrically connected with the source of the drive transistor T0. The high voltage terminal is used for providing a high voltage signal VDD.

A gate of the sixth transistor T6 is electrically connected with the light emitting control line E1, a drain of the sixth transistor T6 is electrically connected with the drain of the drive transistor T0, and a source of the sixth transistor T6 is electrically connected with an anode of the organic light emitting diode O1. A cathode of O1 is electrically connected with a low voltage terminal, and the low voltage terminal is used for providing a low voltage signal VSS.

The second initialization circuit 42 includes a seventh transistor T7.

A gate of the seventh transistor T7 is electrically connected with the third scan line S3, a drain of the seventh transistor T7 is electrically connected with the second initialization voltage terminal, and a source of the seventh transistor T7 is electrically connected with the anode of the organic light emitting diode O1. The second initialization voltage terminal is used for providing a second initialization voltage Vi2.

The energy storage circuit 41 includes a storage capacitor C. A first terminal of the storage capacitor C is electrically connected with the gate of the drive transistor T0, and a second terminal of the storage capacitor C is connected with the high voltage terminal.

In at least one embodiment of the pixel circuit shown in FIG. 68, T1 is an oxide thin film transistor, T2, T3, T4, T5, T6, and T7 are low temperature poly silicon thin film transistors, T1 is an n-type transistor, and T2, T3, T4, T5, T6, and T7 are p-type transistors.

In at least one embodiment of the pixel circuit shown in FIG. 68, N1 is a first node electrically connected with the gate of T0, N2 is a second node electrically connected with the source of T0, and N3 is a third node electrically connected with the drain of T0.

In at least one embodiment of the pixel circuit shown in FIG. 68, the initialization control signal and the fourth scan signal may be provided by a same fourth scan signal generation module.

In specific implementation, when a reset voltage provided by DR is a high voltage, a reset phase and an initialization phase are different phases to avoid a gate-source short circuit of T0. When the reset voltage provided by DR is a low voltage, the reset phase and the initialization phase may be a same phase.

Figure 69:
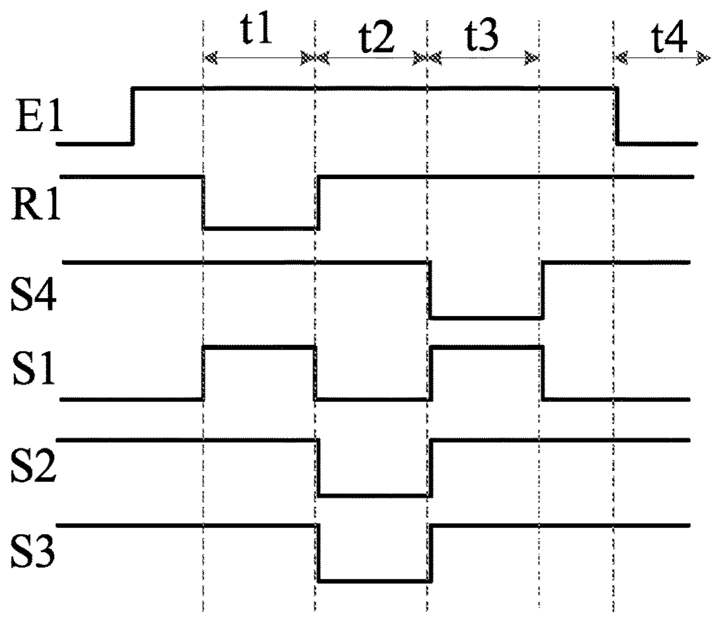
FIG. 69 is a working timing diagram of the pixel circuit shown in FIG. 68 according to at least one embodiment.

As shown in FIG. 69, when the pixel circuit according to at least one embodiment of the present disclosure shown in FIG. 68 is working, when a reset voltage provided by DR is a high voltage, a display period may include an initialization phase t1, a reset phase t2, a data write phase t3, and a light emitting phase t4 set sequentially.

In the initialization phase t1, E1 provides a high voltage signal, R1 provides a low voltage signal, S4 provides a high voltage signal, S1 provides a high voltage signal, both S2 and S3 provide high voltage signals, T1 and T2 are turned on to write Vi1 to N1, and a potential of the gate of T0 is initialized, so that T0 can be turned on at beginning of the data write phase t3.

In the reset phase t2, E1 provides a high voltage signal, R1 provides a high voltage signal, S4 provides a high voltage signal, S1 provides a low voltage signal, both S2 and S3 provide low voltage signals, T3 and T7 are turned on to initialize a potential of N2 through a high voltage provided by DR, so as to reset a gate-source voltage of T0, which is beneficial to accelerate a recovery speed of T0, thus improving a hysteresis phenomenon of T0 and improving a recovery speed of hysteresis. Vi2 is written to the anode of O1 so that O1 does not emit light and a residual charge of the anode of O1 is removed.

In the data write phase t3, E1 provides a high voltage signal, R1 provides a high voltage signal, S4 provides a low voltage signal, S1 provides a high voltage signal, both S2 and S3 provide high voltage signals, T1 is turned on, and T4 is turned on.

At beginning of the data write phase t3, T0 is turned on, and C is charged through a data voltage Vdata provided by D1 to raise a potential of N1 until T0 is turned off and the potential of N1 is Vdata+Vth, wherein Vth is a threshold voltage of T0.

In the light emitting phase, E1 provides a low voltage signal, R1 provides a high voltage signal, S4 provides a high voltage signal, S1 provides a low voltage signal, both S2 and S3 provide high voltage signals, T5, T0, and T6 are turned on, and T0 drives O1 to emit light.

Figure 70:
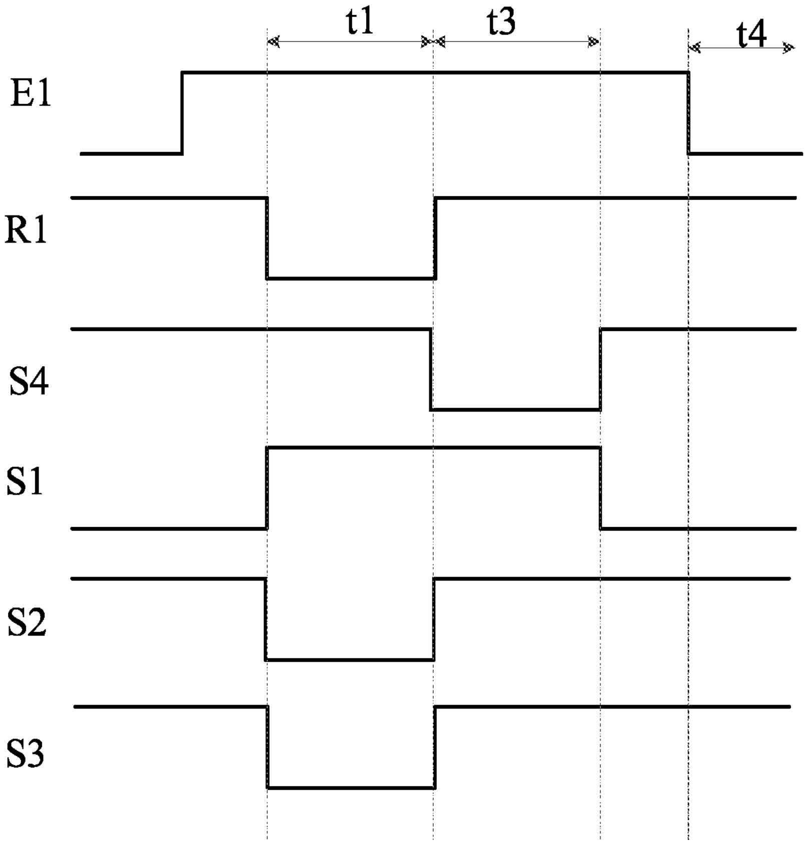
FIG. 70 is a working timing diagram of the pixel circuit shown in FIG. 68 according to at least another embodiment.

As shown in FIG. 70, when the pixel circuit according to at least one embodiment of the present disclosure as shown in FIG. 68 is working, when a reset voltage provided by DR is a low voltage, a display period may include an initialization phase t1, a data write phase t3, and a light emitting phase T4 set sequentially.

In the initialization phase t1, E1 provides a high voltage signal, R1 provides a low voltage signal, S4 provides a high voltage signal, S1 provides a high voltage signal, both S2 and S3 provide low voltage signals, T1 and T2 are turned on to write Vi1 to N1, so that T0 can be turned on at beginning of the data write phase t3. T3 and T7 are turned on, the reset voltage provided by DR is written to N2, and Vi2 is written to the anode of O1 to reset a gate-source voltage of T0, which is beneficial to accelerate a recovery speed of T0, thereby improving a hysteresis phenomenon of T0 and increasing a recovery speed of hysteresis. Vi2 is written to the anode of O1, so that O1 does not emit light and a residual charge of the anode of O1 is removed.

In the data write phase t3, E1 provides a high voltage signal, R1 provides a high voltage signal, S4 provides a low voltage signal, S1 provides a high voltage signal, both S2 and S3 provide high voltage signals, T1 is turned on, and T4 is turned on.

At beginning of the data write phase t3, T0 is turned on, and C is charged through a data voltage Vdata provided by D1 to raise a potential of N1 until T0 is turned off and the potential of N1 is Vdata+Vth, wherein Vth is a threshold voltage of T0.

In the light emitting phase, E1 provides a low voltage signal, R1 provides a high voltage signal, S4 provides a high voltage signal, S1 provides a low voltage signal, both S2 and S3 provide high voltage signals, T5, T0, and T6 are turned on, and T0 drives O1 to emit light.

Figure 71:
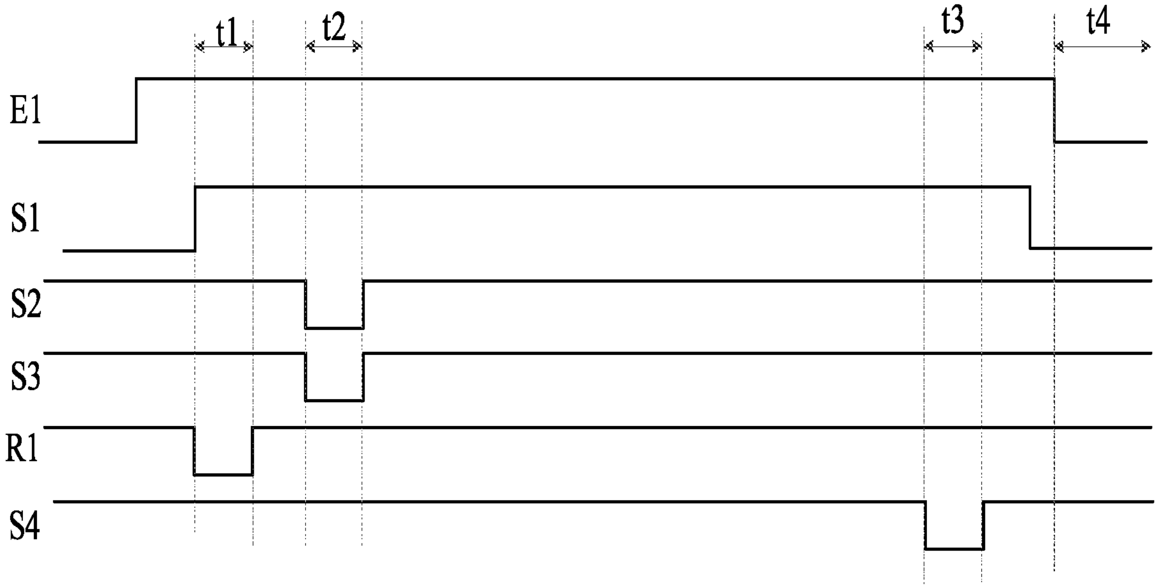
FIG. 71 is a working timing diagram of the pixel circuit shown in FIG. 68 according to at least yet another embodiment.

As shown in FIG. 71, when the pixel circuit according to at least one embodiment shown in FIG. 68 is working, when the initialization control signal provided by R1 is a fourth scan signal of an (N-14)-th stage and the fourth scan signal provided by S4 is a fourth scan signal of an N-th stage, a display period may include an initialization phase t1, a reset phase t2, a data write phase t3, and a light emitting phase t4 set sequentially. In the initialization phase t1, E1 provides a high voltage signal, S1 provides a high voltage signal, R1 provides a low voltage signal, both S2 and S3 provide high voltage signals, S4 provides a high voltage signal, T1 and T2 are turned on to write Vi1 to N1, so that T0 can be turned on at beginning of the data write phase t3.

In the reset phase t2, E1 provides a high voltage signal, S1 provides a high voltage signal, R1 provides a high voltage signal, both S2 and S3 provide low voltage signals, S4 provides a high voltage signal, T3 and T7 are turned on to initialize a potential of N2 through a high voltage provided by DR, so as to reset a gate-source voltage of T0, which is beneficial to accelerate a recovery speed of T0, thus improving a hysteresis phenomenon of T0 and improving a recovery speed of hysteresis. Vi2 is written to the anode of O1, so that O1 does not emit light and a residual charge of the anode of O1 is removed. T1 is turned on, T2 is turned off, and T5 and T6 are turned off.

In the data write phase t3, E1 provides a high voltage signal, S1 provides a high voltage signal, R1 provides a high voltage signal, both S2 and S3 provide high voltage signals, S4 provides a low voltage signal, T1 and T4 are turned on to write Vdata to N2, and N1 and N3 are connected, so that C is charged through a data voltage Vdata on D1, and a potential of N1 is raised until T0 is turned off, at this time, a potential of the gate of T0 is Vdata+Vth.

In the light emitting phase t4, E1 provides a low voltage signal, S1 provides a low voltage signal, R1 provides a high voltage signal, both S2 and S3 provide high voltage signals, S4 provides a high voltage signal, T5, T6, and T0 are turned on, and T0 drives O1 to emit light.

In at least one embodiment of the pixel circuit shown in FIG. 68, the reset voltage provided by DR may be VDD, or DR may be a same signal terminal as E1; or, the reset voltage provided by D4 may be a third initialization voltage, but not limited to this.

Figure 72:
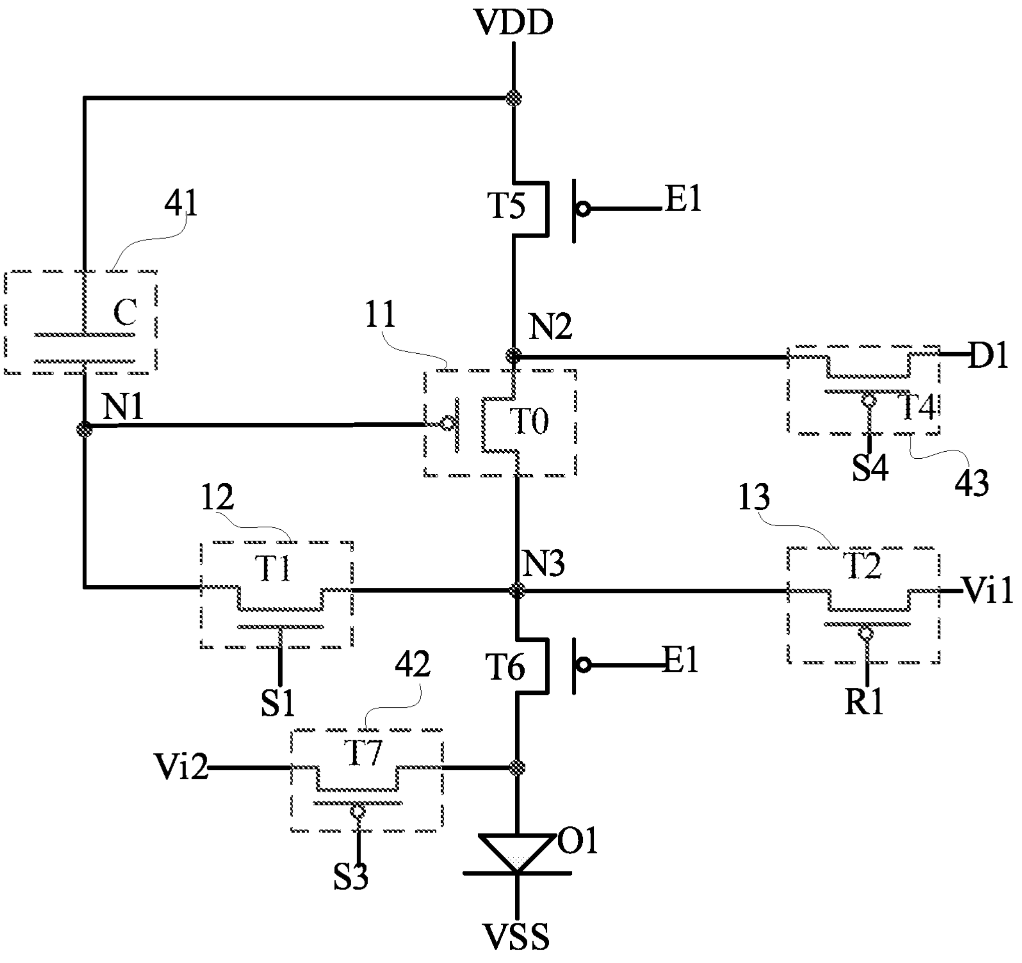
FIG. 72 is a schematic diagram of a structure of a pixel circuit according to at least one embodiment of the present disclosure.

As shown in FIG. 72, based on at least one embodiment of the pixel circuit shown in FIG. 67, the light emitting element is an organic light emitting diode O1. The compensation control circuit 12 includes a first transistor T1. The drive circuit 11 includes a drive transistor T0.

A gate of the first transistor T1 is electrically connected with the first scan line S1, a drain of the first transistor T1 is electrically connected with a gate of the drive transistor T0, and a source of the first transistor T1 is electrically connected with a drain of the drive transistor T0.

The first initialization circuit 13 includes a second transistor T2.

A gate of the second transistor T2 is electrically connected with the initialization control line R1, a drain of the second transistor T2 is electrically connected with the first initialization voltage terminal, and a source of the second transistor T2 is electrically connected with the drain of the drive transistor T0. The first initialization voltage terminal is used for providing the first initialization voltage Vi1.

The data write circuit includes a fourth transistor T4.

A gate of the fourth transistor T4 is electrically connected with the fourth scan line S4, a drain of the fourth transistor T4 is electrically connected with the data line D1, and a source of the fourth transistor T4 is electrically connected with a source of the drive transistor T0.

The light emitting control circuit includes a fifth transistor T5 and a sixth transistor T6.

A gate of the fifth transistor T5 is electrically connected with the light emitting control line E1, a drain of the fifth transistor T5 is electrically connected with a high voltage terminal, and a source of the fifth transistor T5 is electrically connected with the source of the drive transistor T0. The high voltage terminal is used for providing a high voltage signal VDD.

A gate of the sixth transistor T6 is electrically connected with the light emitting control line E1, a drain of the sixth transistor T6 is electrically connected with the drain of the drive transistor T0, and a source of the sixth transistor T6 is electrically connected with an anode of an organic light emitting diode O1. A cathode of O1 is electrically connected with a low voltage terminal, and the low voltage terminal is used for providing a low voltage signal VSS.

The second initialization circuit 42 includes a seventh transistor T7.

A gate of the seventh transistor T7 is electrically connected with the third scan line S3, a drain of the seventh transistor T7 is electrically connected with the second initialization voltage terminal, and a source of the seventh transistor T7 is electrically connected with the anode of the organic light emitting diode O1. The second initialization voltage terminal is used for providing the second initialization voltage Vi2.

The energy storage circuit 41 includes a storage capacitor C. A first terminal of the storage capacitor C is electrically connected with the gate of the drive transistor T0, and a second terminal of the storage capacitor C is connected with the high voltage terminal.

In at least one embodiment of the pixel circuit shown in FIG. 72, T1 is an oxide thin film transistor, T2, T4, T5, T6, and T7 are low temperature poly silicon thin film transistors, T1 is an n-type transistor, and T2, T4, T5, T6, and T7 are p-type transistors.

In at least one embodiment of the pixel circuit shown in FIG. 72, N1 is a first node electrically connected with the gate of T0, N2 is a second node electrically connected with the source of T0, and N3 is a third node electrically connected with the drain of T0.

In at least one embodiment of the pixel circuit shown in FIG. 72, a third scan signal and a fourth scan signal are a same scan signal, but not limited this.

Figure 73:
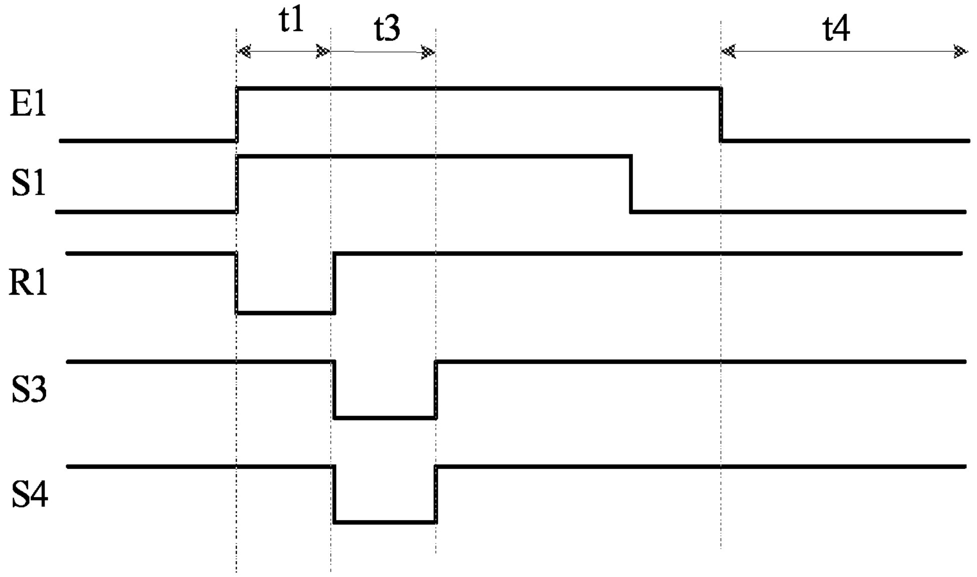
FIG. 73 is a working timing diagram of the pixel circuit shown in FIG. 72 according to at least one embodiment.

As shown in FIG. 73, when the pixel circuit according to at least one embodiment of the present disclosure shown in FIG. 72 is working, a display period may include an initialization phase t1, a data write phase t3, and a light emitting phase t4 set sequentially.

In the initialization phase t1, E1 provides a high voltage signal, R1 provides a low voltage signal, both S3 and S4 provide high voltage signals, S1 provides a high voltage signal, and T1 and T2 are turned on to write Vi1 to N1, so that T0 can be turned on at beginning of the data write phase t3.

In the data write phase t3, E1 provides a high voltage signal, R1 provides a high voltage signal, both S3 and S4 provide low voltage signals, S1 provides a high voltage signal, T7 is turned on to write Vi2 to the anode of O1, T1 and T4 are turned on to write a data voltage Vdata on D1 to N2, and N1 and N3 are connected.

At beginning of the data write phase t3, T0 is turned on, and C is charged through Vdata to raise a potential of the gate of T0 until the potential of the gate of T0 becomes Vdata+Vth, wherein Vth is a threshold voltage of T0, and T0 is turned off.

In the light emitting phase t4, E1 provides a low voltage signal, R1 provides a high voltage signal, both S3 and S4 provide high voltage signals, S1 provides a low voltage signal, T5, T6 and T0 are turned on, and T0 drives O1 to emit light.

Figure 74:
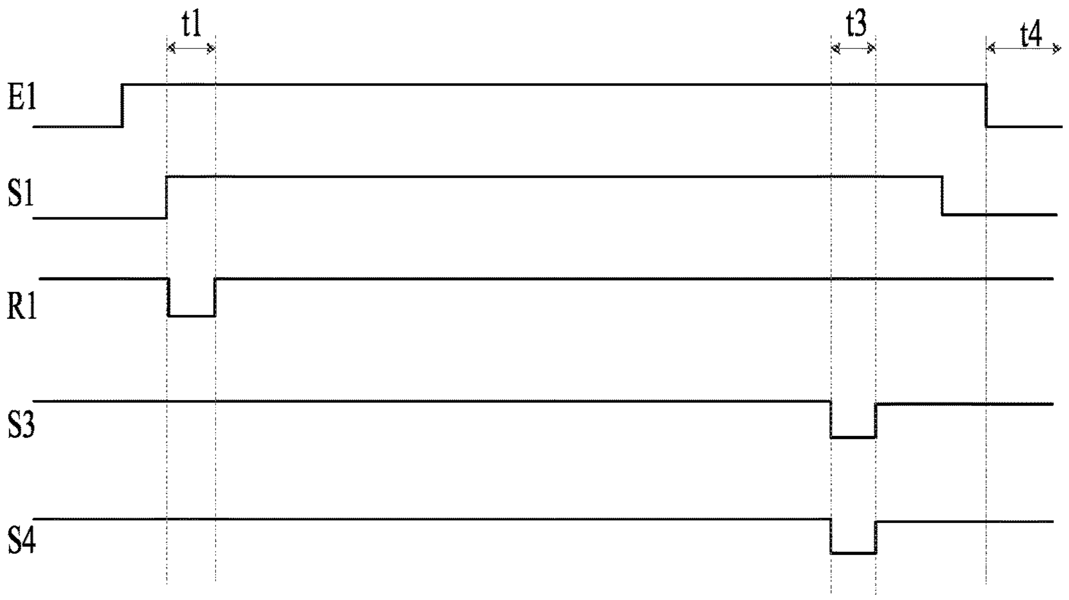
FIG. 74 is a working timing diagram of the pixel circuit shown in FIG. 72 according to at least another embodiment.

As shown in FIG. 74, when the pixel circuit according to at least one embodiment shown in FIG. 72 is working, when the initialization control signal provided by R1 is a fourth scan signal of an (N-14)-th stage and the fourth scan signal provided by S4 is a fourth scan signal of an N-th stage, a display period may include an initialization phase t1, a data write phase t3, and a light emitting phase t4 set sequentially.

In the initialization phase t1, E1 provides a high voltage signal, R1 provides a low voltage signal, both S3 and S4 provide high voltage signals, S1 provides a high voltage signal, and T1 and T2 are turned on to write Vi1 to N1, so that T0 can be turned on at beginning of the data write phase t3.

In the data write phase t3, E1 provides a high voltage signal, R1 provides a high voltage signal, both S3 and S4 provide low voltage signals, S1 provides a high voltage signal, T7 is turned on to write Vi2 to the anode of O1, T1 and T4 are turned on to write a data voltage Vdata on D1 to N2, and N1 and N3 are connected.

At beginning of the data write phase t3, T0 is turned on, and C is charged through Vdata to raise a potential of the gate of T0 until the potential of the gate of T0 becomes Vdata+Vth, wherein Vth is a threshold voltage of T0, and T0 is turned off.

In the light emitting phase t4, E1 provides a low voltage signal, R1 provides a high voltage signal, both S3 and S4 provide high voltage signals, S1 provides a low voltage signal, T5, T6, and T0 are turned on, and T0 drives O1 to emit light.

As shown in FIG. 74, a time interval between the initialization phase t1 and the data write phase t3 is relatively large, so that the potential of N1 can be reset in advance, which is beneficial to improve a hysteresis phenomenon of T0.

Figure 75:
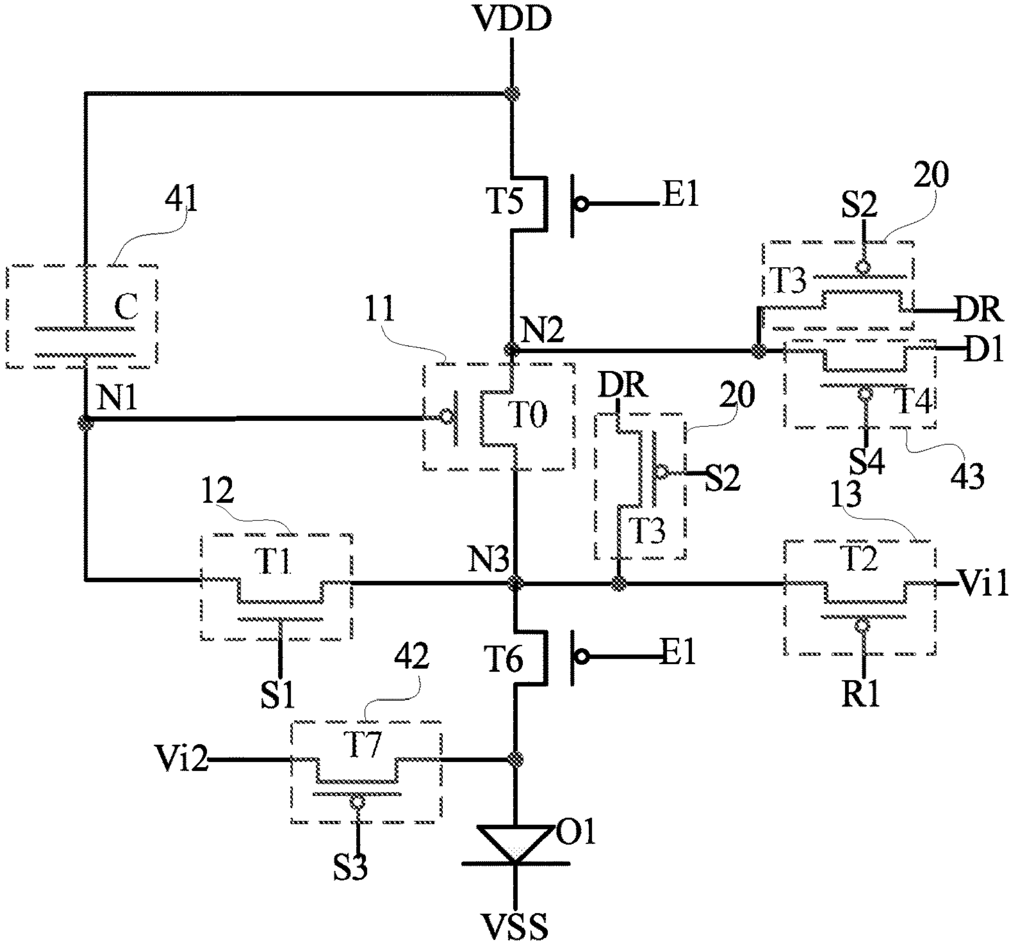
FIG. 75 is a schematic diagram of a structure of a pixel circuit according to at least yet another embodiment of the present disclosure.

As shown in FIG. 75, on a basis of at least one embodiment of the pixel circuit shown in FIG. 66, the light emitting element is an organic light emitting diode O1. The compensation control circuit 12 includes a first transistor T1. The drive circuit 11 includes a drive transistor T0.

A gate of the first transistor T1 is electrically connected with the first scan line S1, a drain of the first transistor T1 is electrically connected with a gate of the drive transistor T0, and a source of the first transistor T1 is electrically connected with a drain of the drive transistor T0.

The first initialization circuit 13 includes a second transistor T2.

A gate of the second transistor T2 is electrically connected with the initialization control line R1, a drain of the second transistor T2 is electrically connected with the first initialization voltage terminal, and a source of the second transistor T2 is electrically connected with a first electrode of the drive transistor T0. The first initialization voltage terminal is used for providing the first initialization voltage Vi1.

The reset circuit 20 includes a third transistor T3.

A gate of the third transistor T3 is electrically connected with the second scan line S2, a drain of the third transistor T3 is electrically connected with the reset voltage terminal DR, and a source of the third transistor T3 is electrically connected with a second electrode of the drive transistor T0.

The data write circuit 43 includes a fourth transistor T4.

A gate of the fourth transistor T4 is electrically connected with the fourth scan line S4, a drain of the fourth transistor T4 is electrically connected with the data line D1, and a source of the fourth transistor T4 is electrically connected with the second electrode of the drive transistor T0.

The light emitting control circuit 44 includes a fifth transistor T5 and a sixth transistor T6.

A gate of the fifth transistor T5 is electrically connected with the light emitting control line E1, a drain of the fifth transistor T5 is electrically connected with a high voltage terminal, and a source of the fifth transistor T5 is electrically connected with the second electrode of the drive transistor T0. The high voltage terminal is used for providing a high voltage signal VDD.

A gate of the sixth transistor T6 is electrically connected with the light emitting control line E1, a drain of the sixth transistor T6 is electrically connected with the first electrode of the drive transistor T0, and a source of the sixth transistor T6 is electrically connected with an anode of an organic light emitting diode O1. A cathode of O1 is electrically connected with a low voltage terminal, and the low voltage terminal is used for providing a low voltage signal VSS.

The second initialization circuit 42 includes a seventh transistor T7.

A gate of the seventh transistor T7 is electrically connected with the third scan line S3, a drain of the seventh transistor T7 is electrically connected with the second initialization voltage terminal, and a source of the seventh transistor T7 is electrically connected with the anode of the organic light emitting diode O1. The second initialization voltage terminal is used for providing the second initialization voltage Vi2.

The energy storage circuit 41 includes a storage capacitor C. A first terminal of the storage capacitor C is electrically connected with the gate of the drive transistor T0, and a second terminal of the storage capacitor C is connected with the high voltage terminal.

In at least one embodiment of the pixel circuit shown in FIG. 75, T1 is an oxide thin film transistor, T2, T3, T4, T5, T6, and T7 are low temperature poly silicon thin film transistors, T1 is an n-type transistor, and T2, T3, T4, T5, T6, and T7 are p-type transistors.

In at least one embodiment of the pixel circuit shown in FIG. 75, N1 is a first node electrically connected with the gate of T0, N2 is a second node electrically connected with the second electrode of T0, and N3 is a third node electrically connected with the first electrode of T0.

In at least one embodiment of the pixel circuit shown in FIG. 75, the first electrode of T0 may be a drain and the second electrode of T0 may be a source. Or, the first electrode of T0 may be a source and the second electrode of T0 may be a drain.

In at least one embodiment of the pixel circuit shown in FIG. 75 of the present disclosure, the initialization control signal provided by R1 may be a fourth scan signal of an (N-14)-th stage, and the fourth scan signal provided by S4 may be a fourth scan signal of an N-th stage, but not limited this.

Figure 76:
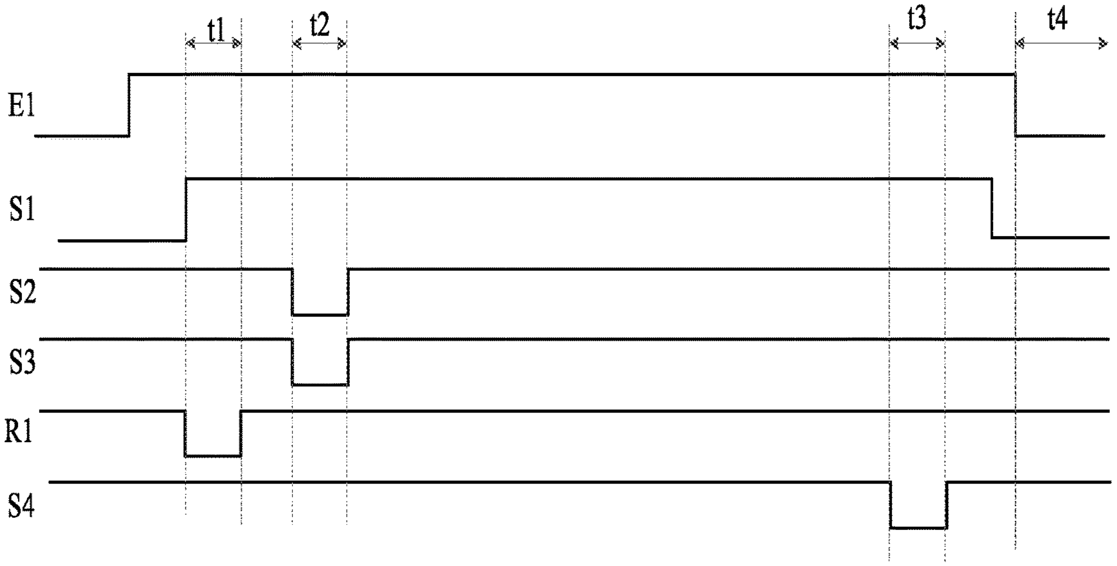
FIG. 76 is a working timing diagram of the pixel circuit shown in FIG. 75 according to at least one embodiment.

As shown in FIG. 76, when the pixel circuit according to at least one embodiment of the present disclosure shown in FIG. 75 is working, a display period may include an initialization phase t1, a reset phase t2, a data write phase t3, and a light emitting phase t4 set sequentially.

In the initialization phase t1, E1 provides a high voltage signal, S1 provides a high voltage signal, R1 provides a low voltage signal, both S2 and S3 provide high voltage signals, S4 provides a high voltage signal, T1 and T2 are turned on to write Vi1 to N1, so that T0 can be turned on at beginning of the data write phase t3.

In the reset phase t2, E1 provides a high voltage signal, S1 provides a high voltage signal, R1 provides high voltage signal, both S2 and S3 provide low voltage signals, S4 provides a high voltage signal, T3 and T7 are turned on to initialize a potential of N2 through a high voltage provided by DR, so as to reset a gate-source voltage of T0, which is beneficial to accelerate a recovery speed of T0, thus improving a hysteresis phenomenon of T0 and improving a recovery speed of hysteresis. Vi2 is written to the anode of O1, so that O1 does not emit light and a residual charge of the anode of O1 is removed. T1 is turned on, T2 is turned off, and T5 and T6 are turned off.

In the data write phase t3, E1 provides a high voltage signal, S1 provides a high voltage signal, R1 provides a high voltage signal, both S2 and S3 provide high voltage signals, S4 provides a low voltage signal, T1 and T4 are turned on to write Vdata to N2. N1 and N3 are connected, so that C is charged through a data voltage Vdata on D1, a potential of N1 is raised until T0 is turned off, at this time, a potential of the gate of T0 is Vdata+Vth.

In the light emitting phase t4, E1 provides a low voltage signal, S1 provides a low voltage signal, R1 provides a high voltage signal, both S2 and S3 provide high voltage signals, S4 provides a high voltage signal, T5, T6, and T0 are turned on, and T0 drives O1 to emit light.

A driving method described in at least one embodiment of the present disclosure is applied to the above pixel circuit, and a display period includes an initialization phase and a reset phase. The driving method includes following contents.

In the initialization phase, a first initialization circuit writes a first initialization voltage to a first terminal of a drive circuit under control of an initialization control signal.

In the reset phase, a reset circuit writes a reset voltage to a second terminal of the drive circuit or the first terminal of the drive circuit under control of a second scan signal.

In at least one embodiment of the driving method described in the present disclosure, a reset circuit writes a reset voltage to a second terminal of a drive circuit or a first terminal of the drive circuit under control of a second scan signal in a non-light-emitting period, before a data voltage is written to the second terminal of the drive circuit, to provide a bias voltage to a drive transistor in the drive circuit (at this time, a potential of a gate of the drive transistor is also initialized to Vi1), so that the drive transistor remains in a reset state to improve hysteresis of the drive transistor and facilitate First Frame Response time (FFR) of a display screen.

In at least one embodiment of the present disclosure, when the reset circuit writes the reset voltage to the second terminal of the drive circuit under control of the second scan signal in the reset phase, the reset voltage is a high potential constant voltage, the first initialization voltage is a low potential constant voltage, and the initialization phase and the reset phase are different time periods; or, the reset voltage and the first initialization voltage are low potential constant voltages, and the initialization phase and the reset phase are a same time period or different time periods.

Optionally, when the reset circuit writes the reset voltage to the first terminal of the drive circuit under control of the second scan signal in the reset phase, the reset phase and the initialization phase are different time periods, so that the first initialization voltage is written to the first terminal of the drive circuit in the initialization phase, and the reset voltage is written to the first terminal of the drive circuit in the reset phase.

In specific implementation, the pixel circuit may further include a compensation control circuit, and the driving method may further include following contents.

In the initialization phase, the compensation control circuit controls communication between the control terminal of the drive circuit and the first terminal of the drive circuit under control of the first scan signal to write the first initialization voltage to the control terminal of the drive circuit.

In the driving method described in the embodiment of the present disclosure, the compensation control circuit controls communication between the control terminal of the drive circuit and the first terminal of the drive circuit under control of the first scan signal, the control terminal of the drive circuit is only directly electrically connected with the compensation control circuit. The first initialization circuit writes the first initialization voltage to the first terminal of the drive circuit under control of the initialization control signal, the first initialization circuit is directly electrically connected with the first terminal of the drive circuit, so as to initialize a potential of the control terminal of the drive circuit through the compensation control circuit and the first initialization circuit and to reduce a leakage path of the control terminal of the drive circuit. Under a condition that design complexity of the pixel circuit is not obviously increased, stability of a voltage of a first node may be ensured, which is beneficial to improve display quality, improve display uniformity, and reduce flicker.

In specific implementation, the pixel circuit further includes a data write circuit and an energy storage circuit. The display period further includes a data write phase set after the initialization phase. The driving method further includes following contents.

In the data write phase, the data write circuit writes the data voltage Vdata provided by the data line to the second terminal of the drive circuit under control of the fourth scan signal. The compensation control circuit controls communication between the control terminal of the drive circuit and the first terminal of the drive circuit under control of the first scan signal.

At beginning of the data write phase, the drive circuit turns on a connection between the first terminal of the drive circuit and the second terminal of the drive circuit under control of the control terminal of the drive circuit to charge the energy storage circuit through the data voltage Vdata, thereby changing a potential of the control terminal of the drive circuit until the potential of the control terminal of the drive circuit becomes Vdata+Vth, wherein Vth is a threshold voltage of a drive transistor included in the drive circuit.

In specific implementation, the data write phase may be set after the reset phase.

Optionally, a time interval between the initialization phase and the data write phase is greater than a predetermined time interval to improve a hysteresis phenomenon of the drive transistor and reduce high and low frequency flicker of the pixel circuit by initializing a potential of a gate of the drive transistor in advance.

In at least one embodiment of the present disclosure, the pixel circuit further includes a light emitting control circuit, and the display period further includes a light emitting phase set after the data write phase. The driving method includes following contents.

In the light emitting phase, the light emitting control circuit controls communication between a first voltage terminal and the second terminal of the drive circuit under control of a light emitting control signal, controls communication between the first terminal of the drive circuit and the first electrode of the light emitting element, and the drive circuit drives the light emitting element to emit light.

The display apparatus according to at least one embodiment of the present disclosure includes the above pixel circuit.

Optionally, the pixel circuit includes a reset circuit and a second initialization circuit. The display apparatus further includes a second scan signal generation module and a third scan signal generation module.

The reset circuit is electrically connected with a second scan line, and the second initialization circuit is electrically connected with a third scan line.

The second scan signal generation module is electrically connected with the second scan line, and configured to provide a second scan signal to the second scan line.

The third scan signal generation module is electrically connected with the third scan line, and configured to provide a third scan signal to the third scan line.

Optionally, the second scan signal and the third scan signal are a same control signal.

The second scan signal generation module and the third scan signal generation module are a same module.

Figure 77:
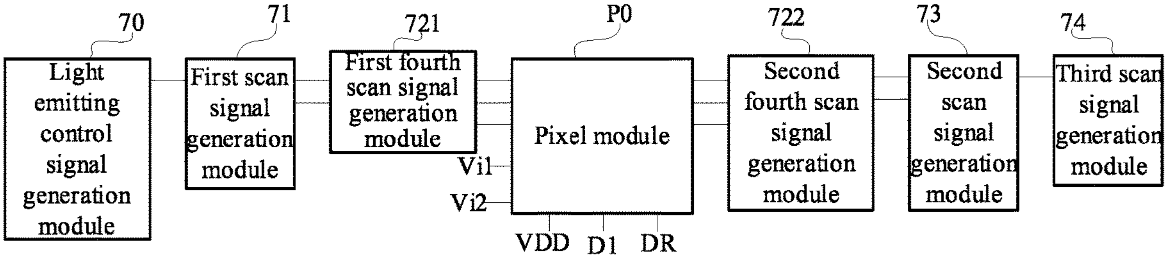
FIG. 77 is a schematic diagram of a structure of a display apparatus according to at least yet another embodiment of the present disclosure.

As shown in FIG. 77, the display apparatus described in at least one embodiment of the present disclosure includes a display panel, the display panel includes a pixel module P0, and the pixel module P0 includes multiple rows and multiple columns of the above pixel circuits. The pixel module P0 is disposed in a valid display region of the display panel.

The display panel further includes a light emitting control signal generation module 70, a first scan signal generation module 71, a first fourth scan signal generation module 721, a second fourth scan signal generation module 722, a second scan signal generation module 73, and a third scan signal generation module 74.

The light emitting control signal generation module 70 is multiple to provide a light emitting control signal, the first scan signal generation module 71 is multiple to provide a first scan signal, the first fourth scan signal generation module 721 and the second fourth scan signal generation module 722 are multiple to provide a fourth scan signal, the second scan signal generation module 73 is multiple to provide a second scan signal, and the third scan signal generation module 74 is multiple to provide a third scan signal.

The light emitting control signal generation module 70, the first scan signal generation module 71, and the first fourth scan signal generation module 721 are disposed on a left side of the display panel.

The second fourth scan signal generation module 722, the second scan signal generation module 73, and the third scan signal generation module 74 are disposed on a right side of the display panel.

Figure 78:
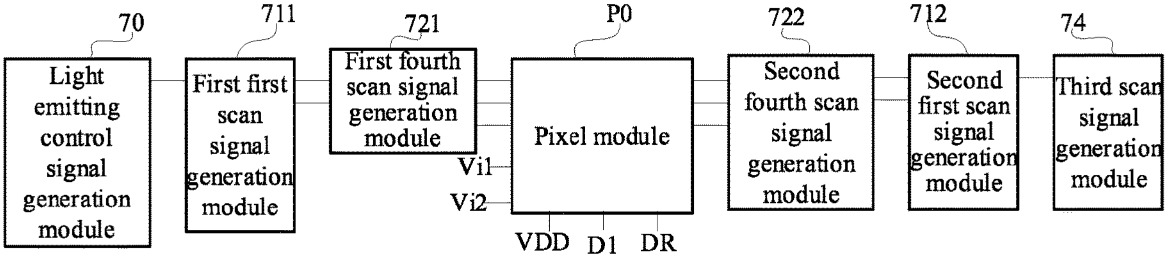
FIG. 78 is a schematic diagram of a structure of a display apparatus according to at least yet another embodiment of the present disclosure.

As shown in FIG. 78, the display apparatus described in at least one embodiment of the present disclosure includes a display panel, the display panel includes a pixel module P0, and the pixel module P0 includes multiple rows and multiple columns of the above pixel circuits. The pixel module P0 is disposed in a valid display region of the display panel.

The display panel further includes a light emitting control signal generation module 70, a first first scan signal generation module 711, a second first scan signal generation module 712, a first fourth scan signal generation module 721, a second fourth scan signal generation module 722, and a third scan signal generation module 74.

The light emitting control signal generation module 70 is configured to provide a light emitting control signal, the first scan signal generation module 71 is configured to provide a first scan signal, the first fourth scan signal generation module 721 and the second fourth scan signal generation module 722 are configured to provide a fourth scan signal, and the third scan signal generation module 74 is configured to provide a second scan signal and a third scan signal.

The light emitting control signal generation module 70, the first first scan signal generation module 711, and the first fourth scan signal generation module 721 are disposed on a left side of the display panel.

The second fourth scan signal generation module 722, the second first scan signal generation module 712, and the third scan signal generation module 74 are disposed on a right side of the display panel.

In FIG. 77 and FIG. 78, a first initialization voltage is labeled Vi1, a second initialization voltage is labeled Vi2, a high voltage signal is labeled VDD, a data line is labeled D1, and a reset voltage terminal is labeled DR.

In an embodiment of the present disclosure, referring to FIG. 6, FIG. 7, FIG. 12, and FIG. 14, etc., a width-to-length ratio W/L of the eighth transistor T8 may be approximately equal to a width-to-length ratio W/L of the seventh transistor T7. For another example, the width-to-length ratio W/L of the eighth transistor T8 may be greater than the width-to-length ratio of the seventh transistor T7, that is, the width-to-length ratio W/L of T8 may be slightly larger, so that the N2 node may be quickly reset.

In an embodiment of the present disclosure, referring to FIG. 6, FIG. 7, FIG. 12, and FIG. 14, etc., the eighth transistor T8 has a channel width W of 1.5 to 3.5, for example, 1.6, 1.8, 1.9, 2.0, 2.2, 2.5, 3.0, etc., and a channel length L of 2.0 to 4.5, for example, 2.5, 2.7, 3.0, 3.2, 3.5, 4.0, etc. The seventh transistor T7 has a channel width W of 1.5 to 3.5, for example, 1.6, 1.8, 1.9, 2.0, 2.2, 2.5, 3.0, etc., and a channel length L of 2.0 to 4.5, for example, 2.5, 2.7, 3.0, 3.2, 3.5, 4.0, etc.

It should be noted that, referring to FIG. 38*a*, and FIG. 50, etc., designs of the above transistors are also applicable to the seventh transistor T7 and the first transistor T1 in the embodiments of FIG. 38*a*, etc., and the fourth transistor T4 and the seventh transistor T7 in the embodiments of FIG. 50, etc.

In an embodiment of the present disclosure, referring to FIG. 6, FIG. 7, FIG. 12, and FIG. 14, etc., a width-to-length ratio W/L of the eighth transistor T8 may be approximately equal to a width-to-length ratio W/L of the first transistor T1. For another example, the width-to-length ratio W/L of the eighth transistor T8 may be less than the width-to-length ratio W/L of the first transistor T1, so that reset capabilities of the N1 node and the N2 node may be balanced.

In an embodiment of the present disclosure, referring to FIG. 6, FIG. 7, FIG. 12, and FIG. 14, etc., a width-to-length ratio W/L of the eighth transistor T8 may be greater than a width-to-length ratio W/L of the first transistor T1, so that a reset capability of the N2 node may be improved.

In an embodiment of the present disclosure, referring to FIG. 6, FIG. 7, FIG. 12, and FIG. 14, etc., the eighth transistor T8 has a channel width W of 1.5 to 3.5, for example, 1.6, 1.8, 1.9, 2.0, 2.2, 2.5, 3.0, etc., and a channel length L of 2.0 to 4.5, for example, 2.5, 2.7, 3.0, 3.2, 3.5, 4.0, etc. The first transistor T1 has a channel width W of 1.5 to 3.5, for example, 1.6, 1.8, 1.9, 2.0, 2.2, 2.5, 3.0, etc., and a channel length L of 2.0 to 4.5, for example, 2.5, 2.7, 3.0, 3.2, 3.5, 4.0, etc.

It should be noted that, referring to FIG. 50, etc., designs of the above transistors are also applicable to the fourth transistor T4 and the third transistor T3 in the embodiments of FIG. 50, etc.

The display apparatus provided by the embodiment of the present disclosure may be a mobile phone, a tablet computer, a television, a display, a notebook computer, a digital photo frame, a navigator, or any product or component with a display function.

It should be noted that, in all embodiments shown in FIG. 1 to FIG. 78, names and reference numerals of functional modules/electrical devices do not limit specific functions of the functional modules/electrical devices. For example, the drive circuit 1 in FIG. 3 to FIG. 26, the drive sub-circuit in FIG. 27 to FIG. 45, the drive circuit 11 in FIG. 46 to FIG. 60, and the drive circuit 11 in FIG. 61 to FIG. 78 all have a same function. For another example, the second reset circuit 3 in FIG. 3 to FIG. 26, the second reset sub-circuit in FIG. 27 to FIG. 45, the reset circuit 20 in FIG. 46 to FIG. 60, and the reset circuit 20 in FIG. 61 to FIG. 78 all have a same function. For another example, the third reset circuit 4 in FIG. 3 to FIG. 26, the first reset sub-circuit in FIG. 27 to FIG. 45, the second initialization circuit 32 in FIG. 46 to FIG. 60, and the second initialization circuit 42 in FIG. 60 to FIG. 78 all have a same function. For another example, the threshold compensation circuit 8 in FIG. 3 to FIG. 26, the second transistor T2 in FIG. 27 to FIG. 45, and the compensation control circuit 13 and the compensation control circuit 12 in FIG. 46 to FIG. 60 all have a same function. For another example, the data write circuit 7 in FIG. 3 to FIG. 26, the write sub-circuit in FIG. 27 to FIG. 45, the data write circuit 41 in FIG. 46 to FIG. 60, and the data write circuit 43 in FIG. 60 to FIG. 78 all have a same function. For another example, the control circuit 5 in FIG. 3 to FIG. 26, the first light emitting control sub-circuit and the second light emitting control sub-circuit in FIG. 27 to FIG. 45, the light emitting control circuit 31 in FIG. 46 to FIG. 60, and the light emitting control circuit 44 in FIG. 61 to FIG. 78 all have a same function. For another example, the coupling circuit 6 in FIG. 3 to FIG. 26, the first capacitor C1 in FIG. 27 to FIG. 45, the energy storage circuit 42 in FIG. 46 to FIG. 60, and the energy storage circuit 41 in FIG. 61 to FIG. 78 all have a same function. For another example, the drive transistor T3 in FIG. 3 to FIG. 26, the drive transistor T3 in FIG. 27 to FIG. 45, the drive transistor T0 in FIG. 46 to FIG. 60, and the drive transistor T0 in FIG. 61 to FIG. 78 all have a same function. The above functional modules/electrical devices having a same function may be replaced with each other to form a new embodiment, replacement of the functional modules/electrical devices may include replacement of structures of the functional modules/electrical devices themselves, and replacement of voltage states of signal terminals to which the functional modules/electrical devices are connected.

Other embodiments of the present disclosure will readily occur to those of skills in the art upon consideration of the specification and practice of the contents disclosed herein. The present application is intended to cover any variations, uses, or adaptations of the present disclosure that follow general principles of the present disclosure and include common knowledge or conventional techniques in the art that are not disclosed in the present disclosure. The specification and embodiments are to be considered exemplary only and the true scope and spirit of the present disclosure are indicated by the claims.

It should be understood that the present disclosure is not limited to the precise structures already described above and shown in the drawings and various modifications and changes may be made without departing from its scope. The scope of the present disclosure is limited only by the appended claims.

The invention claimed is:

1. A pixel circuit comprising a drive sub-circuit, a compensation sub-circuit, a first reset sub-circuit, a second reset sub-circuit, and a light emitting element, wherein the drive sub-circuit is configured to generate a drive current between a first electrode and a second electrode of the drive sub-circuit in response to a control signal of a first node;

the first reset sub-circuit is configured to write a first reset signal to an anode terminal of the light emitting element in response to a signal of a first light emitting control signal line or a second reset control signal line;

the second reset sub-circuit is configured to write a second reset signal to the first electrode or the second electrode of the drive sub-circuit in response to a signal of a first reset control signal line; and a voltage of the second reset signal is greater than a voltage of the first reset signal, wherein the compensation sub-circuit is configured to write the first reset signal or the second reset signal of a third node to the first node in response to a signal of a first scan signal line, and is further configured to compensate the first node in response to the signal of the first scan signal line, and a pulse width of the signal of the first reset control signal line is less than a pulse width of the signal of the first scan signal line.

2. The pixel circuit according to claim 1, wherein an absolute value of the second reset signal is greater than 1.5 times of a threshold voltage of the drive sub-circuit.

3. The pixel circuit according to claim 1, wherein an amplitude of the second reset signal is greater than 0.

4. The pixel circuit according to claim 1, further comprising: a write sub-circuit, a first light emitting control sub-circuit, and a second light emitting control sub-circuit, wherein the write sub-circuit is configured to write a data signal to a second node in response to a signal of a second scan signal line;

the first light emitting control sub-circuit is configured to provide a signal of a first power supply line to the second node in response to the signal of the first light emitting control signal line; and the second light emitting control sub-circuit is configured to write a first reset signal of a fourth node to the third node in response to a signal of a second light emitting control signal line, and is further configured to allow a drive current to flow between the third node and the fourth node in response to the signal of the second light emitting control signal line.

5. The pixel circuit according to claim 4, wherein the second reset signal is derived from at least one of following signal lines: the first power supply line, the first light emitting control signal line, the second light emitting control signal line, or a third power supply line.

6. The pixel circuit according to claim 4, wherein a pulse width of the signal of the first reset control signal line is substantially the same as a pulse width of the signal of the second scan signal line.

7. The pixel circuit according to claim 4, wherein a signal pulse of the first light emitting control signal line differs from a signal pulse of the second light emitting control signal line by one or two time units, and one of the time units is scan time of one row of sub-pixels.

8. The pixel circuit according to claim 4, wherein the first reset sub-circuit comprises a first transistor, wherein a control electrode of the first transistor is connected with the first light emitting control signal line or the second reset control signal line, a first electrode of the first transistor is connected with a first reset signal line, and a second electrode of the first transistor is connected with the fourth node.

9. The pixel circuit according to claim 4, wherein the compensation sub-circuit comprises a second transistor and a first capacitor, wherein a control electrode of the second transistor is connected with the first scan signal line, a first electrode of the second transistor is connected with the third node, and a second electrode of the second transistor is connected with the first node; and one terminal of the first capacitor is connected with the first node, and the other terminal of the first capacitor is connected with the first power supply line.

10. The pixel circuit according to claim 4, wherein the drive sub-circuit comprises a third transistor, wherein a control electrode of the third transistor is connected with the first node, a first electrode of the third transistor is connected with the second node, and a second electrode of the third transistor is connected with the third node.

11. The pixel circuit according to claim 4, wherein the write sub-circuit comprises a fourth transistor, wherein a control electrode of the fourth transistor is connected with the second scan signal line, a first electrode of the fourth transistor is connected with a data signal line, and a second electrode of the fourth transistor is connected with the second node.

12. The pixel circuit according to claim 4, wherein the first light emitting control sub-circuit comprises a fifth transistor, wherein a control electrode of the fifth transistor is connected with the first light emitting control signal line, a first electrode of the fifth transistor is connected with the first power supply line, and a second electrode of the fifth transistor is connected with the second node.

13. The pixel circuit according to claim 4, wherein the second light emitting control sub-circuit comprises a sixth transistor, wherein a control electrode of the sixth transistor is connected with the second light emitting control signal line, a first electrode of the sixth transistor is connected with the third node, and a second electrode of the sixth transistor is connected with the fourth node.

14. The pixel circuit according to claim 4, wherein the second reset sub-circuit comprises a seventh transistor, wherein a control electrode of the seventh transistor is connected with the first reset control signal line, a first electrode of the seventh transistor is connected with a second reset signal line, and a second electrode of the seventh transistor is connected with the second node or the third node.

15. The pixel circuit according to claim 4, wherein the first reset sub-circuit comprises a first transistor, the compensation sub-circuit comprises a second transistor and a first capacitor, the drive sub-circuit comprises a third transistor, the write sub-circuit comprises a fourth transistor, the first light emitting control sub-circuit comprises a fifth transistor, the second light emitting control sub-circuit comprises a sixth transistor, and the second reset sub-circuit comprises a seventh transistor, wherein a control electrode of the first transistor is connected with the first light emitting control signal line or the second reset control signal line, a first electrode of the first transistor is connected with a first reset signal line, and a second electrode of the first transistor is connected with the fourth node;

a control electrode of the second transistor is connected with the first scan signal line, a first electrode of the second transistor is connected with the third node, and a second electrode of the second transistor is connected with the first node;

one terminal of the first capacitor is connected with the first node, and the other terminal of the first capacitor is connected with the first power supply line;

a control electrode of the third transistor is connected with the first node, a first electrode of the third transistor is connected with the second node, and a second electrode of the third transistor is connected with the third node;

a control electrode of the fourth transistor is connected with the second scan signal line, a first electrode of the fourth transistor is connected with a data signal line, and a second electrode of the fourth transistor is connected with the second node;

a control electrode of the fifth transistor is connected with the first light emitting control signal line, a first electrode of the fifth transistor is connected with the first power supply line, and a second electrode of the fifth transistor is connected with the second node;

a control electrode of the sixth transistor is connected with the second light emitting control signal line, a first electrode of the sixth transistor is connected with the third node, and a second electrode of the sixth transistor is connected with the fourth node; and a control electrode of the seventh transistor is connected with the first reset control signal line, a first electrode of the seventh transistor is connected with a second reset signal line, and a second electrode of the seventh transistor is connected with the second node or the third node.

16. The pixel circuit according to claim 15, wherein at least one of the first transistor, the second transistor, and the seventh transistor is a first-type transistor, the third transistor to the sixth transistor are all second-type transistors, and the first-type transistor has a different transistor type from a second-type transistor.

17. The pixel circuit according to claim 16, wherein the first-type transistor is an N-type transistor and the second-type transistor is a P-type transistor.

18. The pixel circuit according to claim 15, wherein at least one of the first transistor, the second transistor, and the seventh transistor is an indium gallium zinc oxide thin film transistor, and the third transistor to the sixth transistor are all low temperature poly silicon thin film transistors.

19. A display apparatus, comprising the pixel circuit according to claim 1.

20. A driving method of a pixel circuit, for driving the pixel circuit according to claim 1, wherein the pixel circuit has a plurality of scan periods, and in one scan period, the driving method comprises:

in a reset phase, writing, by a first reset sub-circuit, a first reset signal to an anode terminal of a light emitting element in response to a signal of a first light emitting control signal line or a second reset control signal line;

in a reposition phase, writing, by a second reset sub-circuit, a second reset signal to a first electrode or a second electrode of a drive sub-circuit in response to a signal of a first reset control signal line; wherein a voltage of the second reset signal is greater than a voltage of the first reset signal; and in a light emitting phase, generating, by the drive sub-circuit, a drive current between the first electrode and the second electrode of the drive sub-circuit in response to a control signal of a first node, wherein the driving method further comprises:

writing, by a compensation sub-circuit, the first reset signal or the second reset signal of a third node to the first node in response to a signal of a first scan signal line, and compensating, by the compensation sub-circuit, the first node in response to the signal of the first scan signal line, and wherein a pulse width of the signal of the first reset control signal line is less than a pulse width of the signal of the first scan signal line.

* * * * *